(12) United States Patent
Suematsu et al.

(10) Patent No.: US 8,831,391 B2
(45) Date of Patent: Sep. 9, 2014

(54) OPTICAL FIBER CUTTING BLADE, OPTICAL FIBER CUTTING DEVICE AND METHOD OF CUTTING OFF THE OPTICAL FIBER, AS WELL AS COMPONENT FOR PEELING THE COATING AND BREAKING THE OPTICAL FIBER AND METHOD OF PEELING THE COATING AND BREAKING THE OPTICAL FIBER

(75) Inventors: Katsuki Suematsu, Tokyo (JP); Kazuyou Mizuno, Tokyo (JP); Hiroshi Tajima, Tokyo (JP)

(73) Assignee: Furukawa Electric Co., Ltd, Tokyo (JP)

( * ) Notice: Subject to any disclaimer, the term of this patent is extended or adjusted under 35 U.S.C. 154(b) by 1250 days.

(21) Appl. No.: 12/597,318

(22) PCT Filed: Apr. 25, 2007

(86) PCT No.: PCT/JP2007/058911
§ 371 (c)(1),
(2), (4) Date: Apr. 14, 2010

(87) PCT Pub. No.: WO2008/136100
PCT Pub. Date: Nov. 13, 2008

(65) Prior Publication Data
US 2010/0215318 A1    Aug. 26, 2010

(51) Int. Cl.
*G02B 6/02* (2006.01)
*B21F 13/00* (2006.01)
*G02B 6/25* (2006.01)
*G02B 6/38* (2006.01)
*G02B 6/245* (2006.01)

(52) U.S. Cl.
CPC ............... *G02B 6/25* (2013.01); *G02B 6/3825* (2013.01); *G02B 6/3833* (2013.01); *G02B 6/3869* (2013.01); *G02B 6/245* (2013.01); *G02B 6/3838* (2013.01); *G02B 6/3877* (2013.01); *G02B 6/387* (2013.01)
USPC .......................................... 385/123; 385/137

(58) Field of Classification Search
USPC ............... 385/38, 43, 123, 134, 137, 124; 30/90.1–90.2; 81/9.51; 83/679
See application file for complete search history.

(56) References Cited

U.S. PATENT DOCUMENTS 4,059,892 A * 11/1977 Siden ........................... 30/90.1
4,711,517 A    12/1987 Fentress et al.
(Continued)

FOREIGN PATENT DOCUMENTS

| CN | 1382264 | 11/2002 |
|---|---|---|
| JP | 62231203 A2 | 10/1987 |

(Continued)

OTHER PUBLICATIONS

European Search Report dated May 27, 2011 for European Application No. 07742346.5, 9 pages.

(Continued)

*Primary Examiner* — Charlie Peng
*Assistant Examiner* — Mary El Shammaa
(74) *Attorney, Agent, or Firm* — Amin, Turocy & Watson, LLP

(57) ABSTRACT

A component for peeling the coating and breaking the optical fiber, which comprises the first member made of resin material including a groove portion enabling to receive a coated optical fiber, an optical fiber cutting blade and a coat removing blade integrally formed within the groove portion, and a breaking portion in an intermediate portion, and the second member made of resin material including a groove portion corresponding to the groove portion in the first member enabling to receive a coated optical fiber, a coat removing blade corresponding to the coat removing blade in the first member, and a breaking portion in an intermediate portion corresponding to the breaking portion in the first member.

35 Claims, 42 Drawing Sheets

(56) References Cited

U.S. PATENT DOCUMENTS

| | | | |
|---|---|---|---|
| 4,748,871 A * | 6/1988 | Zdzislaw | 81/9.4 |
| 5,134,676 A | 7/1992 | Boillot et al. | |
| 5,179,608 A | 1/1993 | Ziebol et al. | |
| 6,264,374 B1 | 7/2001 | Selfridge et al. | |
| 6,273,990 B1 | 8/2001 | Bookbinder et al. | |
| 6,517,254 B1 | 2/2003 | Hata et al. | |
| 6,754,960 B1 | 6/2004 | Shiraishi et al. | |
| 2002/0100552 A1 | 8/2002 | McLeod | |
| 2004/0008951 A1* | 1/2004 | Endo | 385/78 |
| 2005/0220424 A1 | 10/2005 | Asano et al. | |

FOREIGN PATENT DOCUMENTS

| | | | |
|---|---|---|---|
| JP | 63204204 A | 8/1988 | |
| JP | 1112206 A2 | 4/1989 | |
| JP | 1126601 A2 | 5/1989 | |
| JP | 8294871 A | 11/1996 | |
| JP | 11104367 A | 4/1999 | |
| JP | 2002118922 A | 4/2002 | |
| JP | 2004347832 A | 12/2004 | |
| JP | 2007127741 A | 5/2007 | |
| WO | 0129589 A1 | 4/2001 | |

OTHER PUBLICATIONS

Chinese Office Action (with translation) dated Apr. 6, 2012 for Chinese Application No. 200780052711.1, 7 pages.

Microfilm of the specification and drawings annexed to the request of Japanese Utility Model Application No. 51528/1989 (Laid-open No. 142803/1990).

International Search Report mailed Aug. 14, 2007 for PCT Application No. PCT/JP2007/058911, 7 pages.

Extended European Search Report dated Jul. 30, 2013 for European Patent Application No. 13162787.9-1553, 8 pages.

Chinese Office Action (with translation) dated Dec. 14, 2012 for Chinese Application No. 200780052711.1, 4 pages.

* cited by examiner

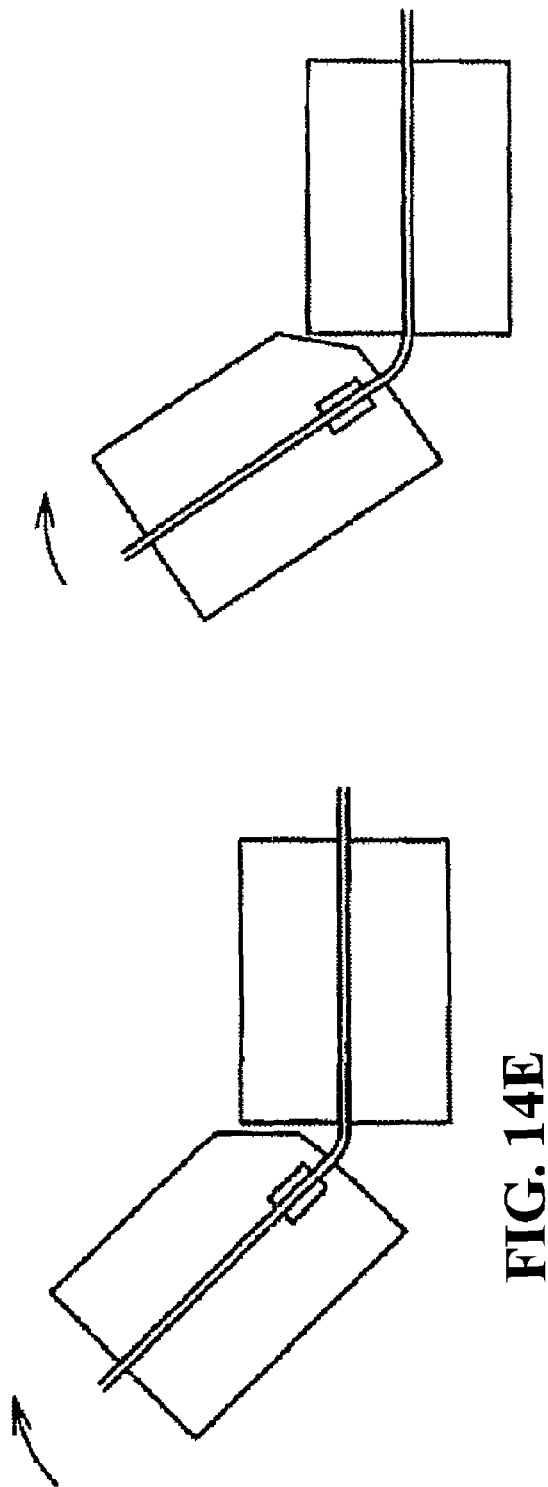
FIG. 14E
FIG. 14F
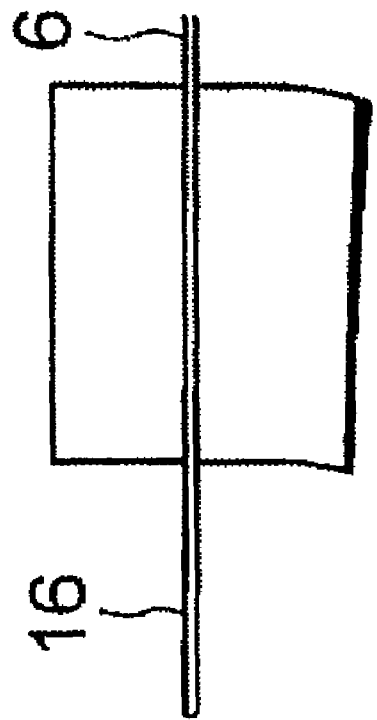
FIG. 14G

US 8,831,391 B2

OPTICAL FIBER CUTTING BLADE, OPTICAL FIBER CUTTING DEVICE AND METHOD OF CUTTING OFF THE OPTICAL FIBER, AS WELL AS COMPONENT FOR PEELING THE COATING AND BREAKING THE OPTICAL FIBER AND METHOD OF PEELING THE COATING AND BREAKING THE OPTICAL FIBER

CROSS-REFERENCE TO RELATED APPLICATION

This application is a US national stage filing of patent cooperation treaty (PCT) Appln. No. PCT/JP2007/058911 (WO 2008/136100), filed Apr. 25, 2007, the entire content of which is incorporated herein by reference.

FIELD OF THE INVENTION

The present invention relates to an optical fiber cutting blade, an optical fiber cutting device and a method of cutting off the optical fiber, as well as a component for peeling the coating and breaking the optical fiber and a method of peeling the coating and breaking the optical fiber, in particular relates to an optical fiber cutting blade, an optical fiber cutting device and a method of cutting off the optical fiber, as well as a component for peeling the coating and breaking the optical fiber and a method of peeling the coating and breaking the optical fiber which can cut off the optical fiber by means of simple operation to obtain a cleavage plane, in addition to remove the coating of the optical fiber.

BACKGROUND OF THE INVENTION

As an optical fiber cutting device, there are two types of device, i.e., a high performance type and a simple type. The simple type device has a structure in which an optical fiber is mounted on a bending plate, the end portion of the optical fiber is clamped and a portion to be cut off is scratched, and then the optical fiber is bent with the bending plate to obtain the cleavage. In the simple type, the operator is required to have a high level of proficiency to obtain an excellent cutting angle, however the cost thereof is low, thus widely used. To connect the optical fiber with a low connecting loss, it is necessary to cut off the optical fiber with an excellent cutting end (i.e., angle to be cut, roughness in the cross section or the like) in all cases including a fusion splicing, mechanical splicing to connect by a connector or the like. Accordingly, the high performance type has been the main stream which can obtain the excellent cutting end without high level of proficiency.

Along with a widespread of a FTTH (Fiber To The Home) to lay the optical fiber to each customer, a simple type of a fusion splicing device to easily handle on the electric pole or in the customer's house or the like appears. However, a required level for the optical fiber cutting device to obtain a desired connecting loss in the fusion splicing or the mechanical splicing becomes higher, thus the high performance type is mainly used. The high performance type optical fiber cutting device can obtain the excellent cutting end of the optical fiber without depending on the high level of proficiency of the operator, and is disclosed for example, in the Japanese Patent Application Publication No. Hei 1 (1989)-112206, or Hei 1 (1989)-126601.

A laying operation of the optical fiber to each of the customer increases, and a large number of the optical fiber cutting devices are required in many sites of laying operation. Since the high performance type optical fiber cutting device is very expensive, the cost becomes remarkably large when a large number of the high performance type optical fiber cutting devices are allocated in each site of the laying operation. It therefore comes to be desired that an excellent cutting end of the optical fiber is to be obtained even for the simple type optical fiber cutting device, which is low cost in comparison with the high performance type optical fiber cutting device, without depending on the high level of proficiency of the operator.

For example, a cutter with a metal blade provided has been conventionally applied, when the optical fiber is cut off in arranging the connecting portion like an optical fiber connector or the like in the end portion of the optical fiber received in the closure placed in the vicinity of the electric pole.

According to the above described cutter, first of all the scratch is made in the optical fiber in a perpendicular direction to the longitudinal axis of the optical fiber, and then the cleavage is implemented. This requires a certain level of high proficiency so that some operator does not cut off the optical fiber in good manner.

Japanese Patent Application Publication Shou 62 (1987)-231203 discloses the conventional simple type optical fiber cutting device. FIG. 33 is a schematic perspective view to show the conventional optical fiber cutting device. The glass portion of the optical fiber is places on the optical fiber cutting device along the longitudinal direction thereof (not shown). The conventional optical fiber cutting device includes a clamp lever 114 supported with axis by a bracket 112*a* of a support plate 112 to hold an optical fiber (not shown), a bite arm 146 supported with axis by the bracket 112*a* and provided with a bite block 116, and a tensile bending stress imparting means 120 attached to the support plate 112. The optical fiber is cut off by the optical fiber cutting device, as described hereunder.

The optical fiber with a portion to be cut exposed by removing the coating is placed in an engaging groove 152. The clamp lever 114 is brought upward in resisting to a spring, and the exposed optical fiber is pinched between a rubber plate 124 of the clamp lever 114 and a rubber plat 122 of the support plate 112. Then, the bite arm 146 is pushed down in resisting to a spring 128 so that a bite (blade) of the bite block 116 is pressed through the optical fiber on a rubber layer 142. This causes a cut into the exposed optical fiber. Then, a fiber receiving member 136 together with the optical fiber is rotated downward around a support axis 132 in resisting to a spring 138. The exposed optical fiber is bent at a roller 140 as a fulcrum and imparted a tensile stress to be cut off.

Patent document 1: Japanese Patent Application Publication Shou 62 (1987)-231203;

Patent document 2: Japanese Patent Application Publication Hei 1 (1989)-112206;

Patent document 3: Japanese Patent Application Publication Hei 1 (1989)-126601

DISCLOSURE OF THE INVENTION

Problem to be Solved

As described above, the laying operation of the optical fiber increases, and It comes to be desired that an excellent cutting end of the optical fiber is to be obtained even for the simple type optical fiber cutting device without depending on the high level of proficiency of the operator. Along with the above, a metal blade or diamond blade is attached to the conventional simple type optical fiber cutting device to form a cut on the exposed optical fiber. However, there are problems in which an excess cut is imparted on the optical fiber with the metal blade or diamond blade not to be applicable in use, in addition, when operated in the dark, it is difficult to operate.

The optical fiber cannot be cutting off together with removing the coating thereof at the same time.

An object of the invention is therefore to provide an optical fiber cutting blade, an optical fiber cutting device and a method of cutting off the optical fiber, as well as a component for peeling the coating and breaking the optical fiber and a method of peeling the coating and breaking the optical fiber which can stably operate and obtain an excellent cutting end of the optical fiber without depending on a high level of the proficiency of the operator.

Inventors of the invention have intensively studied to overcome the above described problems in the conventional art. As a result, it has been found that when a blade made of resin material in place of the metal or diamond blade is pressed on the optical fiber, the blade itself is deformed to impart a prescribed scratch on the surface of the cladding of the optical fiber. Then the optical fiber with the scratch is bent in an opposite direction to the scratch, the optical fiber can be cut off with an excellent cutting face which can be connected with a prescribed connecting loss in stable manner without depending on the high level of the proficiency of the operator.

Furthermore, it has been found that when two coat removing blades facing each other so as to sandwich the coated optical fiber are made of resin material separately from the optical fiber cutting blade, and the coat removing blades are placed apart from the optical fiber cutting blade for a prescribed distance, a part of the coating of the coated optical fiber is cut off together with the operation of the above described optical fiber cutting blade, so that the optical fiber is cut off and the coating is removed when the scratched portion of the optical fiber is bent in the opposite direction to the scratched portion.

Furthermore, it has been found that when two pairs of coat removing blades with each pair arranged in the respective first member and the second member facing in contact each other so as to sandwich the coated optical fiber received in the groove portion are made of resin material separately from the optical fiber cutting blade, and the coat removing blades are placed apart from the optical fiber cutting blade for a prescribed distance, a part of the coating of the coated optical fiber is cut off together with the operation of the above described optical fiber cutting blade, so that the optical fiber is cut off and the coating is removed when the scratched portion of the optical fiber is bent in the opposite direction to the scratched portion.

It has been found that an optical fiber connector can be easily obtained in the following manner in which the component for peeling the coating and breaking the optical fiber including the hollow portion to receive the ferrule is used, and the component is broken and separated at the breaking portion to cut off the optical fiber and to remove the coating, and then the ferrule is inserted into the hollow portion and fitted therein.

It has been found that when the pressure generating mechanism, which comprises a protruding portion and a recessed portion with the center positions thereof slightly displaced is provided in the optical fiber adaptor, the ferrules of the pair of the optical fiber connecters are facing each other with a prescribed pressure force so that the naked optical fibers are connected with the pressure.

The invention was made based on the above study results. The first aspect of the optical fiber cutting blade comprises a base made of resin material, and a blade made of resin material integrally formed with said base.

In the second aspect of the optical fiber cutting blade, an angle of a tip portion of said blade is within a range of from 10 to 45 degrees.

In the third aspect of the optical fiber cutting blade, said resin material comprises epoxy or pps (polyphenylene sulfide) based synthetic-resin containing at least 60% of glass filler.

The first aspect of the optical fiber cutting device includes a rectangular base made of resin material having a groove portion formed in a longitudinal direction thereof which receives an optical fiber, and a blade made of resin material integrally formed with the base in perpendicular to the groove portion.

In the second aspect of the optical fiber cutting device, the groove portion comprises a flat bottom face, and both slanted side faces which become wide from the bottom face toward a surface of the base, and the blade is positioned within the groove portion and a tip end of the blade is formed to be approximately same height as the surface of the base.

In the third aspect of the optical fiber cutting device, an angle of a tip portion of the blade is within a range of from 10 to 45 degrees.

The first aspect of the method of cutting off an optical fiber comprises the steps of pressing a blade of resin material integrally formed with the base of the resin material onto the optical fiber until the blade itself is deformed to scratch the optical fiber; and adding a tensile force to a prescribed portion of a scratched optical fiber; and bending in an opposite direction to a scratch to cut off the optical fiber.

In the second aspect of the method of cutting off an optical fiber, the optical fiber comprises a coated optical fiber.

In the third aspect of the method of cutting off an optical fiber, the optical fiber comprises an optical fiber with a coating removed.

The first aspect of the component for peeling the coating and breaking the optical fiber comprises: a first member made of resin material including a groove portion extending in a longitudinal direction and enabling to receive a coated optical fiber, an optical fiber cutting blade made of resin material integrally formed within the groove portion, a coat removing blade made of resin material integrally formed within the groove portion apart from the optical fiber cutting blade, and a breaking portion in a middle thereof; and a second member made of resin material, which is placed face to face to the first member, including a groove portion corresponding to the groove portion in the first member enabling to receive a coated optical fiber, a coat removing blade corresponding to the coat removing blade in the first member, and a breaking portion in a middle thereof corresponding to the breaking portion in the first member.

In the second aspect of the component for peeling the coating and breaking the optical fiber, each breaking portion in a middle portion comprises a connecting portion with a small thickness, the connecting portion connects one member and other member in the first member, as well as one member and other member in the second member.

In the third aspect of the component for peeling the coating and breaking the optical fiber, a thickness of the connecting portion is within a range of from 0.4 mm to 2.0 mm.

In the fourth aspect of the component for peeling the coating and breaking the optical fiber, a prescribe hollow portion is formed between the optical fiber cutting blade and the coat removing blade in each of the one member in the first member and the second member, when the first member and the second member are arranged face to face.

In the fifth aspect of the component for peeling the coating and breaking the optical fiber, the optical fiber cutting blade has such a height that the optical fiber cutting blade is pressed on the optical fiber received in the groove portion until the blade itself is deformed to scratch the optical fiber, and a clearance between each of the coat removing blade in the first member and the second member is identical to a diameter of a glass portion of the optical fiber, when the first member and the second member are contacted face to face.

In the sixth aspect of the component for peeling the coating and breaking the optical fiber, the groove portion comprises a flat bottom face, and both slanted side faces which become wide from the bottom face toward the surface of the base, and a tip end of the blade is formed to protrude into the groove portion in the second member.

In the seventh aspect of the component for peeling the coating and breaking the optical fiber, the clearance between the coat removing blades is within a range of from 0.128 to 0.140 mm.

In the eighth aspect of the component for peeling the coating and breaking the optical fiber, the one member of the second member includes a tapered portion on a surface facing other member.

In the ninth aspect of the component for peeling the coating and breaking the optical fiber, the first member and the second member have respective convex portions to support the coated optical fiber on at least one corresponding position within the groove portion, where neither the optical fiber cutting blade nor the coat removing blade is formed.

In the tenth aspect of the component for peeling the coating and breaking the optical fiber, a height of the convex portion is within a range of from 0.01 mm to 0.05 mm.

In the eleventh aspect of the component for peeling the coating and breaking the optical fiber, a stage is formed within the groove portion of the second member at a position corresponding to the optical fiber cutting blade.

The first aspect of the method of peeling a coating and breaking an optical fiber comprises the steps of arranging to face a first member and a second member, the first member made of resin material including a groove portion enabling to receive a coated optical fiber, an optical fiber cutting blade and a coat removing blade integrally formed within the groove portion, and a breaking portion in an intermediate portion, the second member made of resin material including a groove portion corresponding to the groove portion in the first member enabling to receive a coated optical fiber, a coat removing blade corresponding to the coat removing blade in the first member, and a breaking portion in an intermediate portion corresponding to the breaking portion in the first member; receiving a coated optical fiber in the groove portion; pressing the first member and the second member in the intermediate portion with a prescribed force to press the optical fiber cutting blade on the optical fiber until the blade itself is deformed, thus scratching the optical fiber; and applying a tensile force to a portion where the optical fiber is scratched by the optical fiber cutting blade, and bending the breaking portion in a reverse direction to a scratch to cut off the optical fiber, at a same time to peel off the coating of the coated optical fiber by the coat removing blade.

Twelfth aspect of the component for peeling the coating and breaking the optical fiber comprises a first member made of resin material including a groove portion extending in a longitudinal direction and enabling to receive a coated optical fiber, an optical fiber cutting blade made of resin material integrally formed within the groove portion, a pair of coat removing blades made of resin material integrally formed within the groove apart from the optical fiber cutting blade, which are arranged face to face apart from each other in a direction perpendicular to a longitudinal direction, and a breaking portion in a middle thereof; and a second member made of resin material, which is placed face to face to the first member, including a groove portion corresponding to the groove in the first member enabling to receive a coated optical fiber, a pair of coat removing blades corresponding to the pair of coat removing blades in the first member, and a breaking portion in a middle thereof corresponding to the breaking portion in the first member.

In the thirteenth aspect of the component for peeling the coating and breaking the optical fiber, the pair of the coat removing blades in the first member has a tapered portion at an end portion thereof, and the pair of the coat removing blades in the second member has a tapered portion at a corresponding end portion to the tapered portion in the first member.

In the fourteenth aspect of the component for peeling the coating and breaking the optical fiber, the breaking portion in the intermediate portions comprises a connecting portion with a small thickness, and the connecting portion connects one member and other member in the first member, as well as one member and other member in the second member.

In the fifteenth aspect of the component for peeling the coating and breaking the optical fiber, the hollow portion is formed across the first member and the second member.

In the sixteenth aspect of the component for peeling the coating and breaking the optical fiber, the hollow portion is formed in only the second member.

In the seventeenth aspect of the component for peeling the coating and breaking the optical fiber, the hollow portion formed in the second member has a tapered portion rising upwardly from the optical fiber cutting blade toward the coat removing blade.

In the eighteenth aspect of the component for peeling the coating and breaking the optical fiber, the hollow portion formed in the first member has a tapered portion rising upwardly from the optical fiber cutting blade toward the coat removing blade.

In the nineteenth aspect of the component for peeling the coating and breaking the optical fiber, one member of the second member has a tapered portion on a side facing other member.

The second aspect of the method of peeling a coating and breaking an optical fiber comprises the steps of arranging to face a first member and a second member, the first member made of resin material including a groove portion enabling to receive a coated optical fiber, an optical fiber cutting blade and a pair of coat removing blades made of resin material integrally formed within the groove apart from the optical fiber cutting blade, which are arranged face to face apart from each other in a direction perpendicular to a longitudinal direction, and a breaking portion in an intermediate portion, the second member made of resin material including a groove portion corresponding to the groove portion in the first member enabling to receive a coated optical fiber, a pair of coat removing blades corresponding to the pair of coat removing blades in the first member, which are arranged face to face apart from each other in a direction perpendicular to a longitudinal direction, and a breaking portion in an intermediate portion corresponding to the breaking portion in the first member; receiving a coated optical fiber in the groove portion; pressing the first member and the second member in the intermediate portion with a prescribed force to press the optical fiber cutting blade on the optical fiber until the blade itself is deformed, thus scratching the optical fiber; and applying a tensile force to a portion where the optical fiber is scratched by the optical fiber cutting blade, and bending the breaking portion in a reverse direction to a scratch to cut off the optical fiber, at a same time to peel off the coating of the coated optical fiber by the pair of the coat removing blade.

The first aspect of the optical fiber connector comprises an optical fiber component with the optical fiber cut off and a coating removed, which is formed by bending a component for peeling the coating and breaking the optical fiber at a breaking portion to cut off the optical fiber and removing the coating, which component includes: a first member made of resin material including a groove portion enabling to receive a coated optical fiber, an optical fiber cutting blade and a coat removing blade made of resin material integrally formed within the groove, a breaking portion comprising a connecting portion with thin thickness in an intermediate portion and a hollow portion; and a second member made of resin material, which is placed face to face to the first member, including a groove portion corresponding to the groove portion in the first member enabling to receive a coated optical fiber, a coat removing blade corresponding to the coat removing blade in the first member, a breaking portion in an intermediate portion corresponding to the breaking portion in the first member and a hollow portion corresponding to the hollow portion in the first member; and a ferrule received in the thus formed hollow portion in the optical fiber component, ferrule receiving a portion with the coating removed and a coated portion therein.

In the second aspect of the optical fiber connector, the first member and the second member in the component for peeling the coating and breaking the optical fiber respectively comprise one member and other member combined with a connecting portion, and the member without the optical fiber cutting blade and the coat removing blade includes the hollow portion in contact with the breaking portion.

In the third aspect of the optical fiber connector, the ferrule comprises a head portion and a leg portion, the leg portion has a ring-shaped groove portion, the hollow portion in the optical fiber component is formed by the wall of approximately cylindrical shape, and an annular protruding portion corresponding to the ring-shaped groove portion of the leg portion is formed on a part of the cylindrical shaped wall face.

In the fourth aspect of the optical fiber connector, the ferrule includes a through hole to receive a portion of the optical fiber with the coating removed and the coated optical fiber, and the optical fiber is received in the through hole with a portion of the optical fiber with the coating removed which protrudes only for a prescribed length from the head portion.

In the fifth aspect of the optical fiber connector, the head portion of the ferrule is provisionally engaged to a ferrule holding jig, and when the leg portion is inserted in the hollow portion, the annular protruding portion is fit into the ring-shaped groove portion to be attached to the optical fiber component through one-touch operation with the ferrule holding jig released from the head portion.

The first aspect of the optical fiber adaptor comprises a pair of optical fiber connectors facing each other comprising: an optical fiber component made of resin material receiving a coated optical fiber in a groove portion provided therein and having a hollow portion, which is formed by bending a component for peeling a coating and breaking an optical fiber including a breaking portion to cut off and to remove the coating, and separated; and the ferrule, which receives a naked portion of the optical fiber with the coating removed and a coated portion and is received in the hollow portion in the optical fiber component, wherein the optical fiber adaptor includes a center portion to hold respective head portions of the ferrule having a head portion and a leg portion at a prescribed position, a pressure generating mechanism to press the pair of the optical fiber connectors toward a center portion and hold there, and respective ferrules are held face to face of the pair of the optical fiber connectors under a condition in which tip ends of the naked portion of the optical fiber protruded from the ferrule are contacted with a force.

In the second aspect of the optical fiber adaptor, the optical fiber adaptor comprises a rectangular cylindrical box in which the optical fiber connectors are inserted from the respective ends, the center portion is formed in a center of the box, and has a cylindrical shaped portion to hold the head portion of the ferrule by squeezing from a peripheral portion thereof, and the pressure generating mechanism includes a protruding portion formed on an inner wall of the optical fiber and a recessed portion corresponding to the protruding portion, formed on an peripheral portion of the optical fiber connector.

In the third aspect of the optical fiber adaptor, the pressure generating mechanism is formed in symmetric manner to the center portion, and a center position of the protruding portion in the optical fiber adaptor and a center position of the recessed portion in the optical fiber connecter are formed as displaced each other so as to press the pair of the optical fiber connectors toward the center portion.

In the fourth aspect of the optical fiber adaptor, the adaptor satisfies the followings: at room temperature, D2>D1, at high temperature environment (room temperature+70 degrees C.), $D2+D2\times\alpha2\times70$ degrees C.$<D1+D1\times\alpha1\times70$ degrees C. at low temperature environment (room temperature−70 degrees C.), $D2-D2\times\alpha2\times70$ degrees C.$<D1-D1\times\alpha1\times70$ degrees C. where, D2 is a distance between the center portions of two protruding portions symmetrically formed on the wall face of the optical fiber adaptor, D1 is a distance between the center portions of two recessed portions symmetrically formed on the optical fiber connecters arranged facing each other within the optical fiber adaptor, $\alpha2$ is an expansion coefficient of a material of the optical fiber adaptor, and $\alpha1$ is an expansion coefficient of a material of the optical fiber connecter.

In the fifth aspect of the optical fiber adaptor, the center portion has a refractive index matching agent between the tip ends of the respective naked portions of the optical fibers protruded from the ferrule.

In the sixth aspect of the optical fiber adaptor, the component for peeling the coating and breaking the optical fiber includes a first member made of resin material including a groove portion enabling to receive a coated optical fiber, an optical fiber cutting blade and a coat removing blade made of resin material integrally formed within the groove, a breaking portion comprising a connecting portion with thin thickness in an intermediate portion and a hollow portion; and a second member made of resin material, which is placed face to face to the first member, including a groove portion corresponding to the groove portion in the first member enabling to receive a coated optical fiber, a coat removing blade corresponding to the coat removing blade in the first member, a breaking portion in an intermediate portion corresponding to the breaking portion in the first member and a hollow portion corresponding to the hollow portion in the first member.

In the seventh aspect of the optical fiber adaptor, the first member and the second member in the component for peeling the coating and breaking the optical fiber respectively comprise one member and other member combined with a connecting portion, and the member without the optical fiber cutting blade and the coat removing blade includes the hollow portion in contact with the breaking portion.

In the eighth aspect of the optical fiber adaptor, the leg portion in the ferrule has a ring-shaped groove portion, the hollow portion in the optical fiber component is formed by a wall of approximately cylindrical shape, and an annular protruding portion corresponding to the ring-shaped groove portion of the leg portion is formed on a part of a cylindrical shaped wall face.

In the ninth aspect of the optical fiber adaptor, the ferrule includes a through hole to receive a portion of the optical fiber with the coating removed and the coated optical fiber, and the optical fiber is received in the through hole with a portion of the optical fiber with the coating removed which protrudes only for a prescribed length from the head portion.

In the tenth aspect of the optical fiber adaptor, the optical fiber cutting blade has such a height that the optical fiber cutting blade is pressed on the optical fiber received in the groove portion until the blade itself is deformed to scratch the optical fiber, and a clearance between each of the coat removing blade in the first member and the second member is identical to a diameter of a glass portion of the optical fiber, when the first member and the second member are contacted face to face.

The eleventh aspect of optical fiber adaptor made of resin material holding face to face a pair of an optical fiber connectors includes a ferrule receiving an optical fiber an end of which a coating is removed and a naked optical fiber is exposed, wherein the optical fiber adaptor includes a center portion to hold respective head portions of the ferrule having a head portion and a leg portion at a prescribed position, a pressure generating mechanism to press the pair of the optical fiber connectors toward a center portion and hold there, and respective ferrules are held face to face of the pair of the optical fiber connectors under a condition in which tip ends of the naked portion of the optical fiber protruded from the ferrule are contacted with a force.

Effect of the Invention

When the optical fiber is cut off with the use of the optical fiber cutting blade of the invention, and an optical connecter is assembled, and then thus assembled optical connectors are connected with a refractive index matching agent applied to the respective connecting ends, the connecting loss of up to 1.0 dB has been realized. In addition, the coating of the coated optical fiber can be removed for a prescribed length.

According to the component of the invention for peeling the coating and breaking the optical fiber, the coating of the coated optical fiber can be surely removed for a prescribed length and cut off the optical fiber. When the optical fiber is cut off with the use of the component of the invention for peeling the coating and breaking the optical fiber, and an optical connecter is assembled, and then thus assembled optical connectors are connected with a refractive index matching agent applied to the respective connecting ends, the connecting loss of up to 1.0 dB was realized.

Since the ferrule is inserted in the hollow portion of the optical fiber component formed by using the component for peeling the coating and breaking the optical fiber including the hollow portion to receive the ferrule, breaking at the breaking portion to cut off the optical fiber, and separating as the coating removed, the optical fiber connector, which can realize the connecting loss of up to 1.0 dB, can be simply obtained.

BRIEF DESCRIPTION OF THE DRAWINGS

FIG. 1 is a schematic view to describe an optical fiber cutting blade integrally formed with a base.

FIG. 8 is a view showing disintegrated first member (namely lower member) and second member (namely upper member) as depicted in FIG. 7.

FIGS. 14(a), 14(b), 14(c), 14(d), 14(e), 14(f) and 14(g) are views to explain the method of peeling the coating and breaking the optical fiber.

Figure 1B:
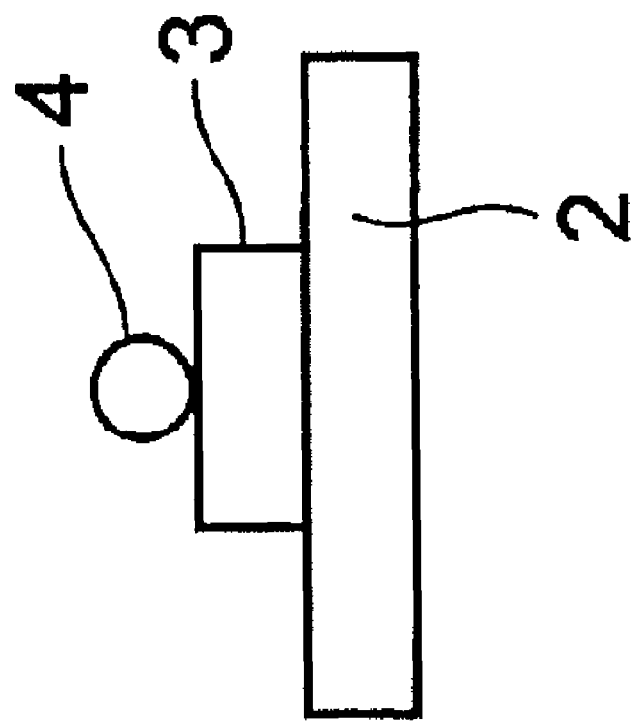
FIG. 1(b) is a front view of the optical fiber cutting blade.

DESCRIPTION OF THE REFERENCE NUMERALS 1 optical fiber cutting blade, component for peeling the coating and breaking the optical fiber
2 base, lower member
3 blade made of resin material, upper member
4 optical fiber inserting portion
4-1 groove portion
4-1a, 4-2a optical fiber inserting portion
5 deformed portion of the blade, broken portion
6 optical fiber
7 connecting portion
8 hollow portion
9 optical fiber cutting blade
10 optical fiber cutting blade, coat removing blade
11 convex portion
12 stage
13 blade made of resin material, tapered portion
13a tip end portion of the blade
14 bottom face of the groove portion
15 side face of the groove portion

BEST MODE FOR CARRYING OUT THE INVENTION

An optical fiber cutting blade, an apparatus and method for cutting optical fiber of the present invention are described in detail with reference to the drawings.

FIG. 1 is a schematic view to describe an optical fiber cutting blade integrally formed with a base. FIG. 1(a) is a side view of the optical fiber cutting blade, and FIG. 1(b) is a front view of the optical fiber cutting blade. FIG. 1(c) is a view to depict the state in which the optical fiber cutting blade is pressed into the optical fiber, and FIG. 1(d) is a view to depict the state in which the optical fiber cutting blade is deformed when the cutting blade is pressed into the optical fiber.

Figure 1A:
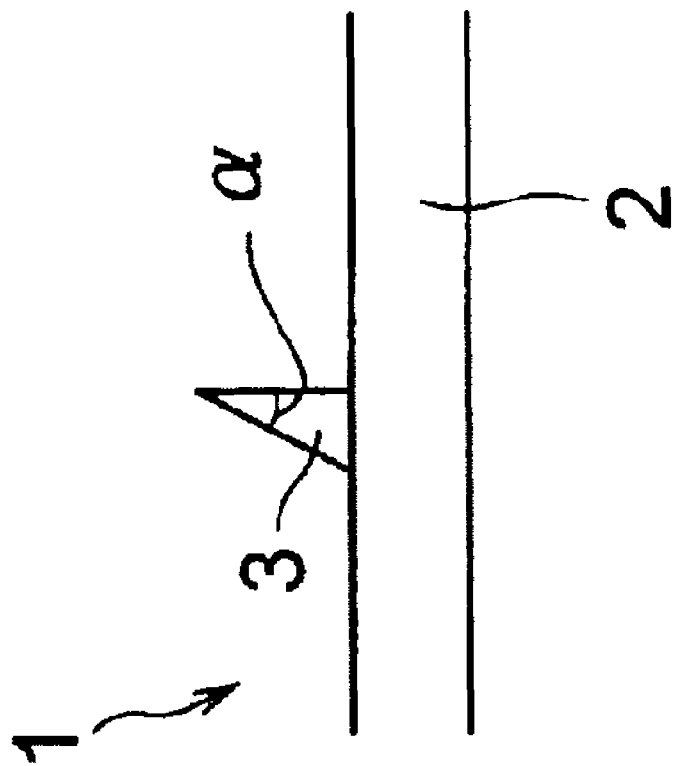
FIG. 1(a) is a side view of the optical fiber cutting blade.

As depicted in FIG. 1(a) and FIG. 1(b), the optical fiber cutting blade 1 has a blade 3 which is made of resin material and integrally formed with the base 2 made of resin material. As depicted in FIG. 1(b), the blade of resin material thus made is attached in perpendicular to an axis direction of the optical fiber 4.

The resin material forming the base and the blade comprises epoxy or pps (polyphenylene sulfide) based synthetic-resin containing at least 60% of glass filler. For example, a widely used synthetic-resin for a ferrule with the glass filler mixed therein can be used.

The angle α at the tip end of the blade as depicted in FIG. 1(a) is within a range of from 10 to 45 degrees. With the angle α of the tip end of the blade to be less than 10 degrees, it is difficult to obtain necessary strength for the optical fiber cutting blade, in addition to that the blade is easily broken or it is hard to form. On the other hand, with the angle α of the tip end of the blade to be over 45 degrees, even though the blade is pushed onto the optical fiber, the optical fiber is hardly damaged and cut off.

Figure 1C:
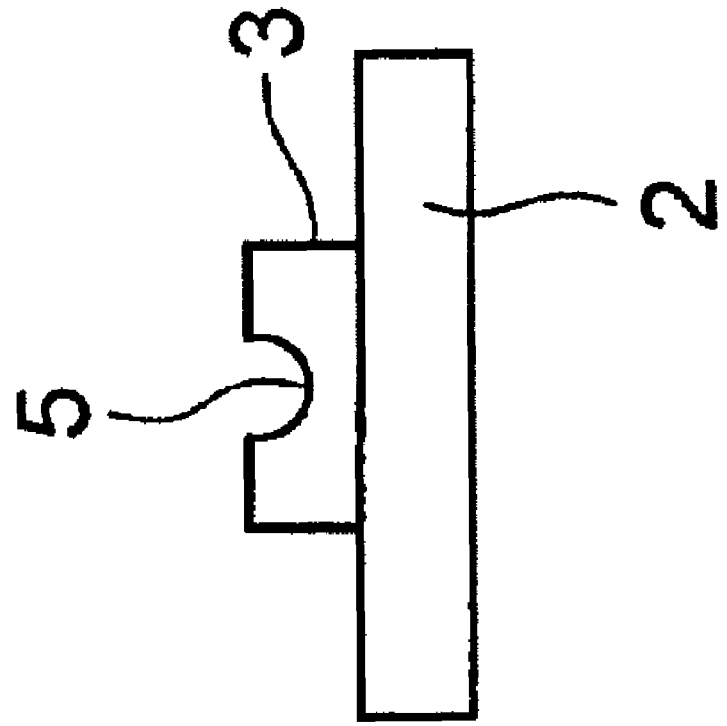
FIG. 1(c) is a view to depict the state in which the optical fiber cutting blade is pressed into the optical fiber.

When the blade made of the resin material with the angle of the above described range is applied to the optical fiber as depicted in FIG. 1(b) and pressed onto the optical fiber with a prescribed strength, the blade itself is deformed and pressed onto the optical fiber as depicted in FIG. 1(c), since the resin material is soft. When the blade is pressed, the glass filler mixed into the resin material is pressed on the surface of the optical fiber 4 so that the optical fiber is scratched. As described above, the blade of resin material is only pressed onto the optical fiber so that the blade is not pushed or pulled in the horizontal direction nor rotated.

Figure 1D:
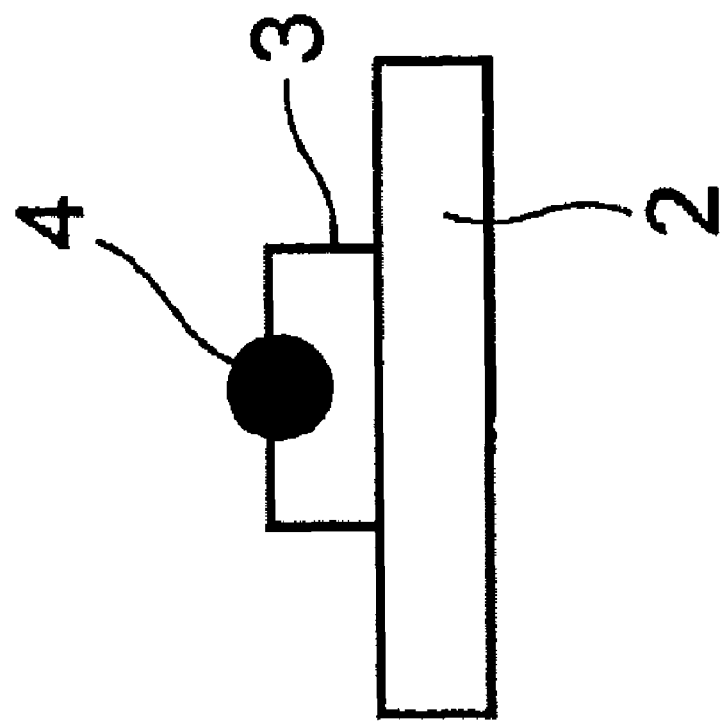
FIG. 1(d) is a view to depict the state in which the optical fiber cutting blade is deformed when the cutting blade is pressed into the optical fiber.

FIG. 1(d) shows the condition of the blade of the resin material after the blade is pressed onto the optical fiber. As depicted in FIG. 1(d), the blade 3 of the resin material itself is deformed in such a recessed shape as fitting to the outer surface of the optical fiber in the portion represented by the numeral reference 5 which is pressed on the optical fiber.

Figure 2:
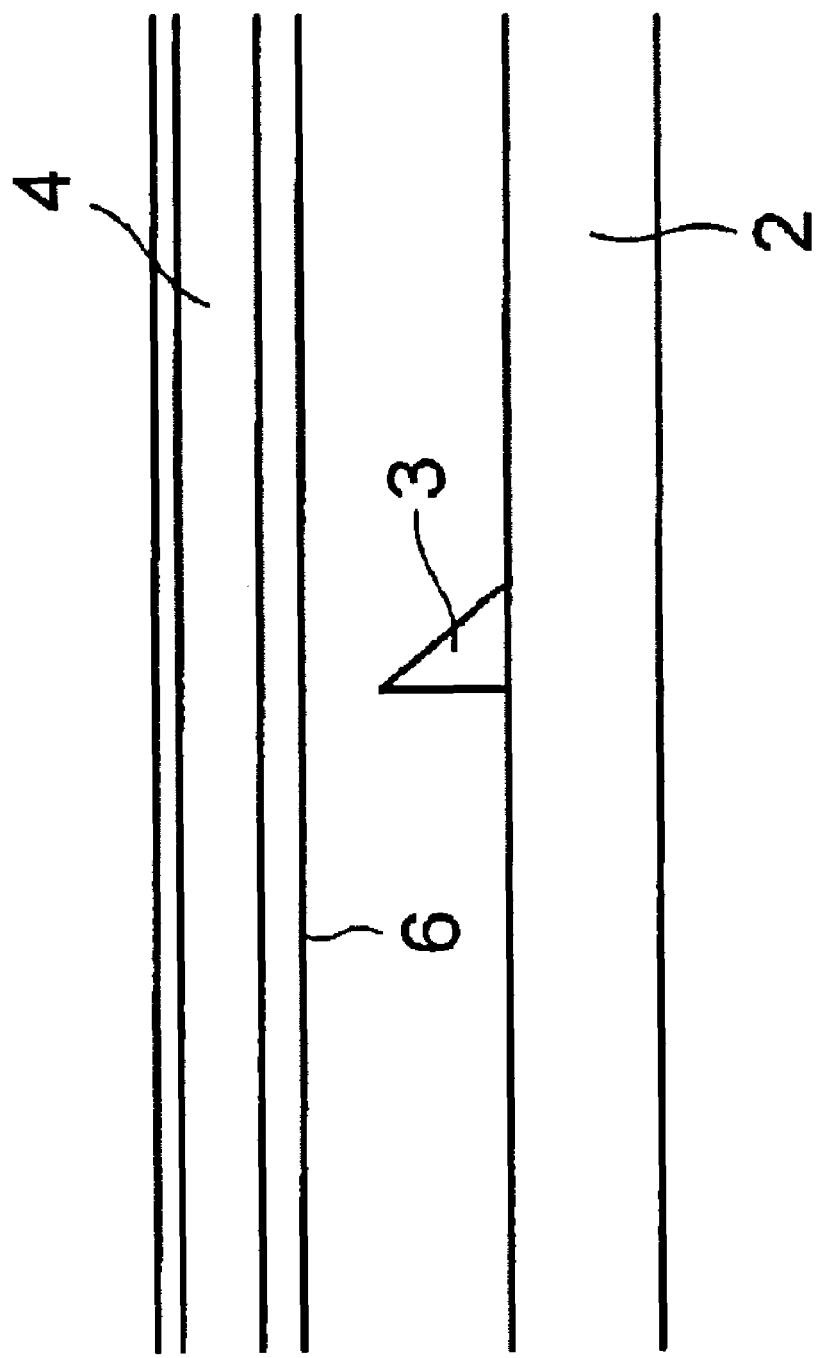
FIG. 2 is a view to explain the state in which the optical fiber is scratched by the optical fiber cutting blade of the resin material integrally formed with the base of the resin material.

FIG. 2 is a view to explain the state in which the optical fiber is scratched by the optical fiber cutting blade of the resin material integrally formed with the base of the resin material. As depicted in FIG. 2, the optical fiber cutting blade has the blade of the resin material integrally formed with the base 2 of the resin material. The blade 3 of the resin material is pressed onto the prescribed portion of the optical fiber 4. As a result, the desirable scratch is formed on the surface of the optical fiber, as depicted in FIG. 1.

Figure 3:
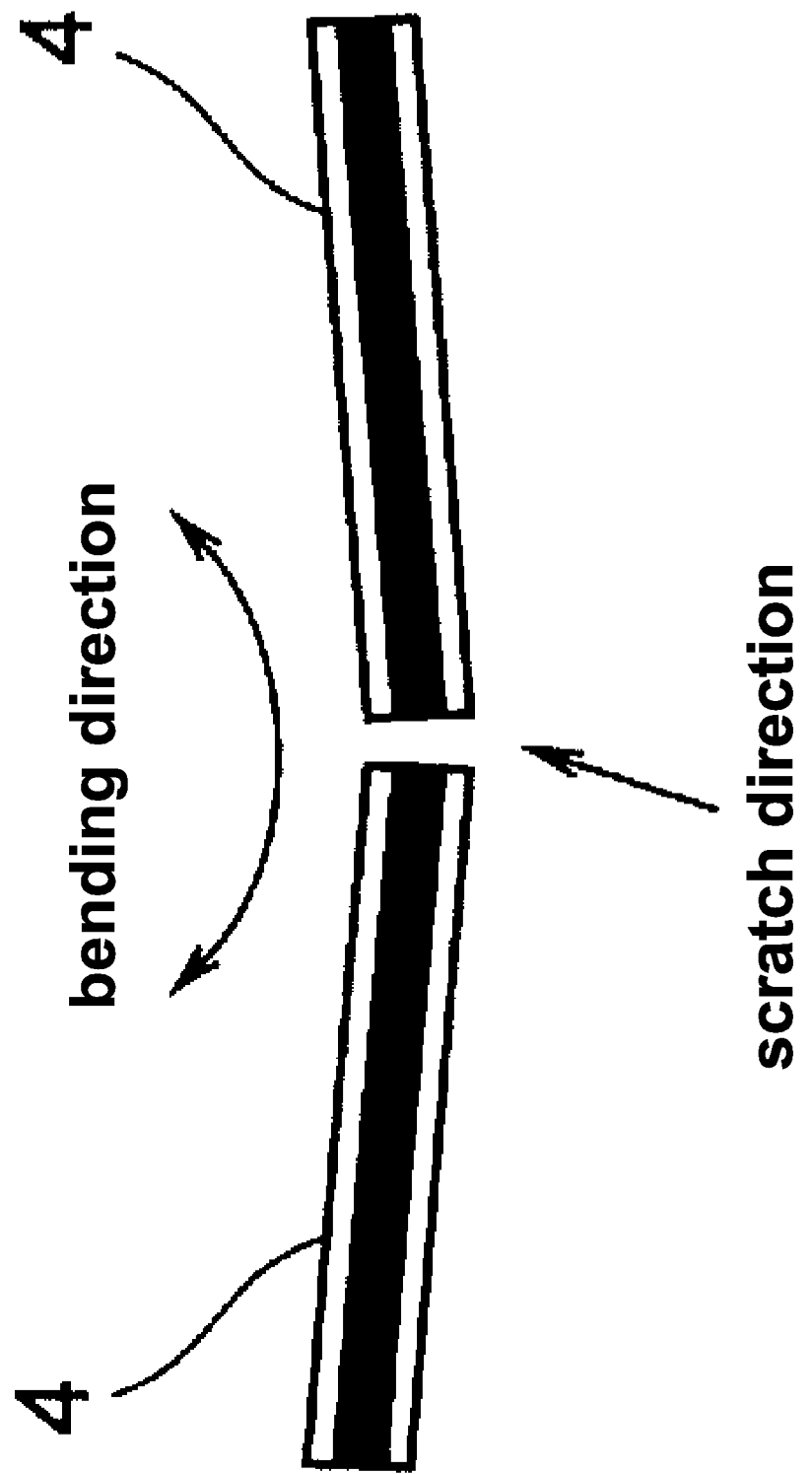
FIG. 3 shows the scratch formed on the surface of the optical fiber and the direction of bending the optical fiber to be cut off.

FIG. 3 shows the scratch formed on the surface of the optical fiber and the direction of bending the optical fiber to be cut off. As depicted in FIG. 3, the optical fiber 4 is bent in a reverse direction to the portion of getting scratched to result in the cleavage.

Then, optical fiber cutting device of the invention is described, the optical fiber cutting device of the invention includes a rectangular base made of resin material having a groove portion formed in the longitudinal direction thereof which receives the optical fiber, and a blade made of resin material integrally formed with the base in perpendicular to the groove.

Figure 4:
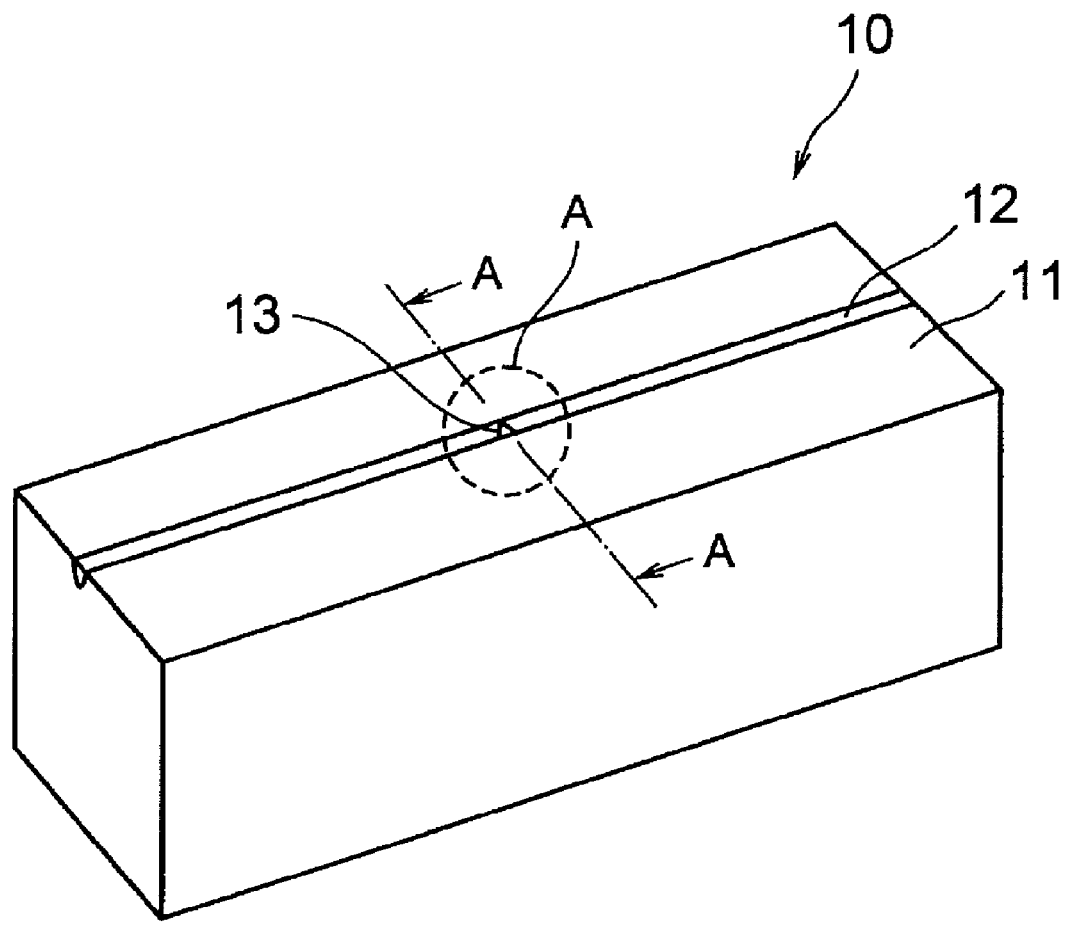
FIG. 4 is a schematic perspective view to explain one of the embodiments of the optical fiber cutting device of the invention.

FIG. 4 is a schematic perspective view to explain one of the embodiments of the optical fiber cutting device of the invention. As depicted in FIG. 4, the optical fiber cutting device 10 includes the rectangular base 11 made of resin material having the groove portion 12 formed in the longitudinal direction thereof which receives the optical fiber, and the blade 13 made of resin material integrally formed with the base 11 in perpendicular to the groove portion 12.

Figure 5:
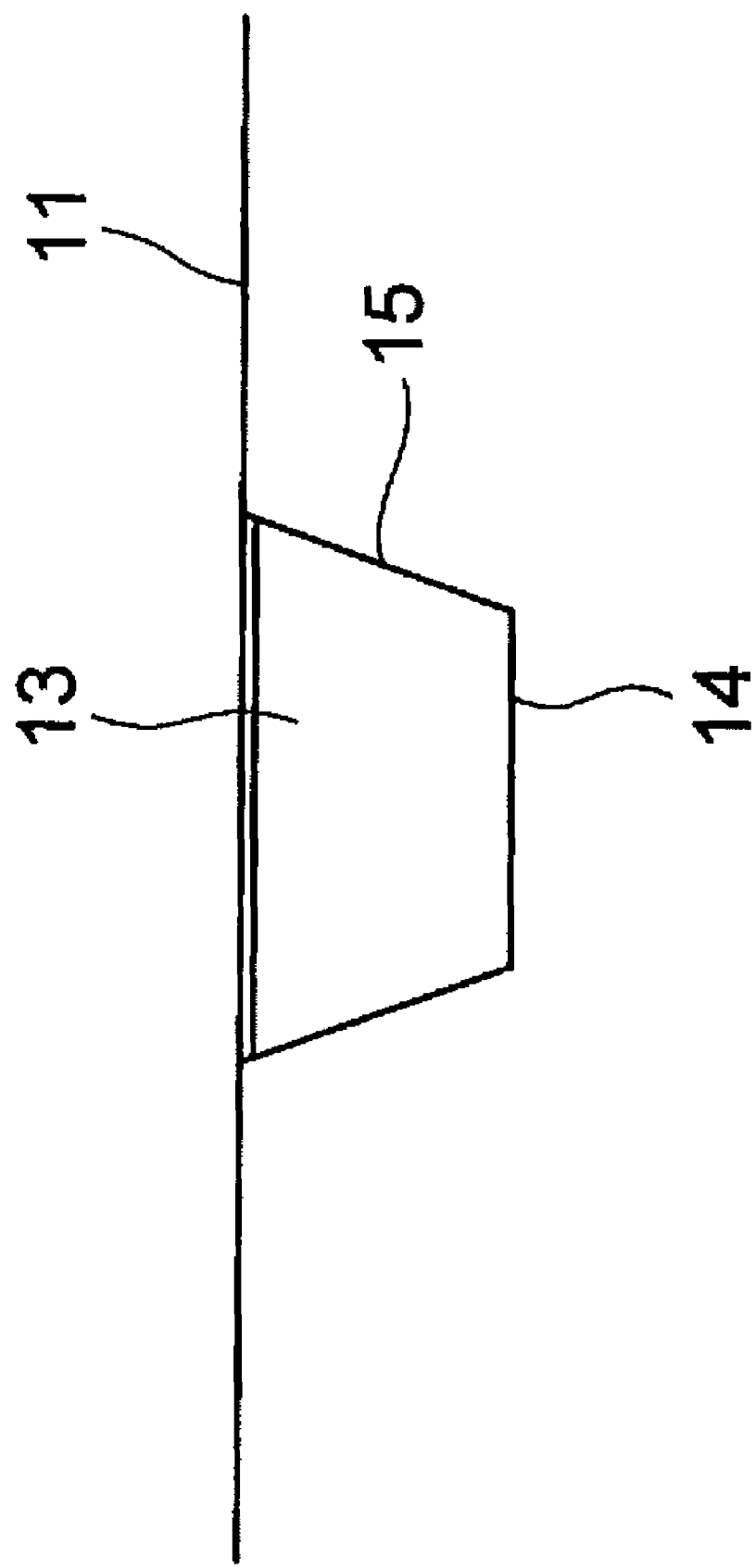
FIG. 5 is a cross sectional view along A-A line in FIG. 4.
Figure 6:
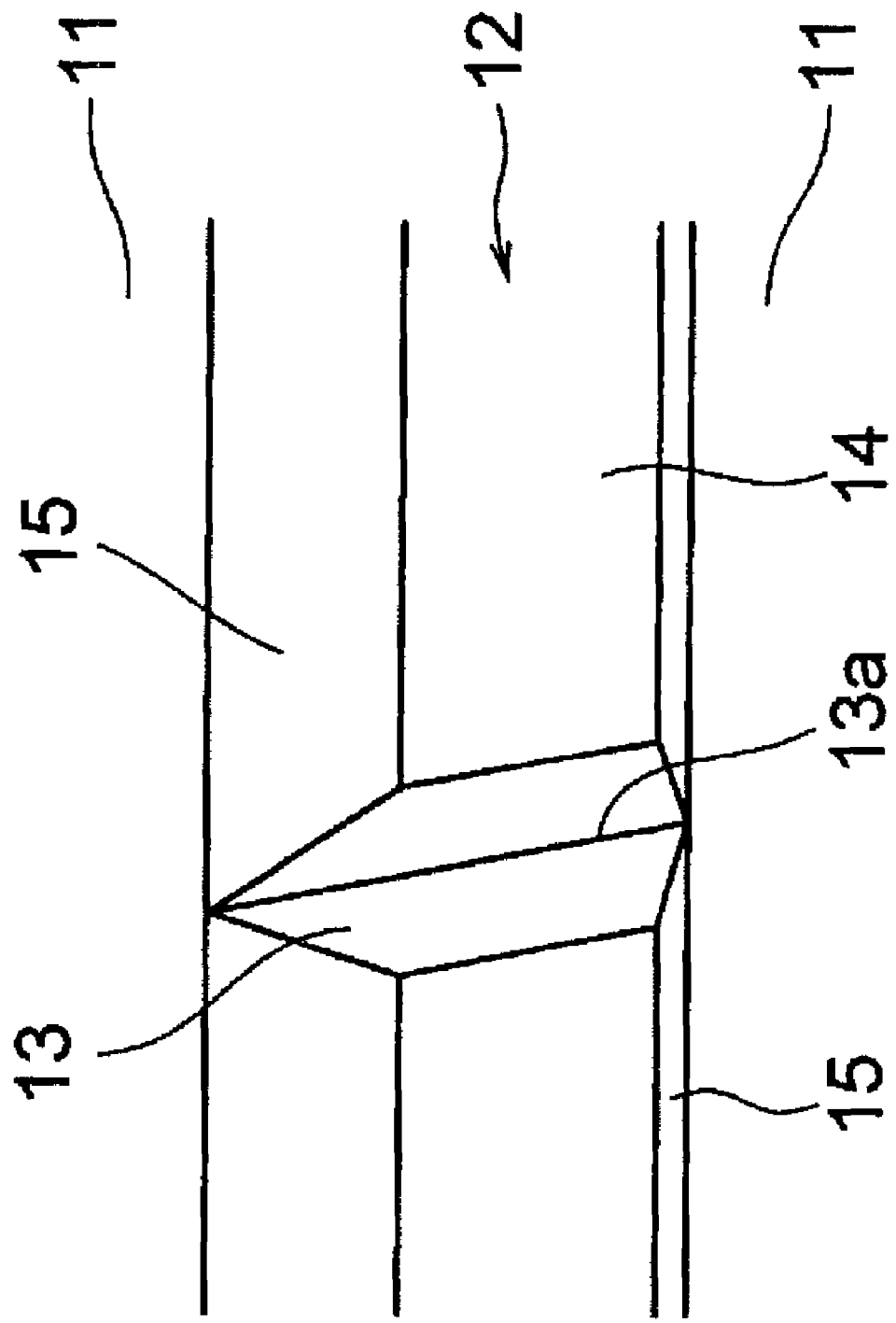
FIG. 6 is an enlarged portion encircled by the dotted line in FIG. 4.

FIG. 5 is a cross sectional view along A-A line in FIG. 4. FIG. 6 is an enlarged portion encircled by the dotted line in FIG. 4. As depicted in FIG. 6, in the optical fiber cutting device of the invention, the groove portion 12 comprises a flat bottom face 14, and both slanted side faces 15 which become wide from the bottom face toward the surface of the base. The blade 13 is positioned within the groove portion and the tip end 13a of the blade is formed to be approximately the same height as the surface of the base.

As depicted in FIG. 5, in one of the embodiments, the groove portion has a substantially a reverse trapezoidal shaped cross section comprising the bottom face 14 and the slanted side faces 15. The integrally formed blade 13 of the resin material is positioned within the groove portion. In this embodiment, the angle of the tip portion of the blade is within a range of from 10 to 45 degrees. The resin material comprises epoxy or pps (polyphenylene sulfide) based synthetic-resin containing at least 60% of glass filler.

The method of cutting off the optical fiber of the invention comprises pressing the blade of the resin material integrally formed with the base of the resin material onto the optical fiber until the blade itself is deformed to scratch the optical fiber, adding a tensile force to the prescribed portion of the scratched optical fiber, and bending in the opposite direction to the scratch to cut off the optical fiber.

The cutting method can be applied to the coated optical fiber, or the optical fiber with the coating removed. The optical fiber is cut off with the use of the optical fiber cutting blade of the invention, and an optical connecter is assembled. Then thus assembled optical connectors are connected with a refractive index matching agent applied to the respective connecting ends to have realized the connecting loss of up to 1.0 dB.

According to the present invention, since the blade made of resin material is integrally formed, the cost thereof can be reduced. In addition, since the blade is made of resin material, and the cost thereof is low, the blade can be discarded.

Furthermore, since the blade is not moved in a direction perpendicular to the longitudinal direction of the optical fiber, any body can easily scratch and cut off the optical fiber. In addition, since the present invention can be applied to the coated optical fiber, and then the cut off optical fiber which is not used anymore is the coated optical fiber, it can be prevented that the invisible glass body of the optical fiber with the coating removed damages the hand by sticking.

A component of the invention for peeling the coating and breaking the optical fiber, and a method for peeling the coating and breaking the optical fiber are described with reference to the drawings.

One of the embodiments of the component of the invention for peeling the coating and breaking the optical fiber comprises: a lower member made of resin material including a groove portion extending in a longitudinal direction and enabling to receive a coated optical fiber, an optical fiber cutting blade made of resin material integrally formed within the groove portion, a coat removing blade made of resin material integrally formed within the groove apart from the optical fiber cutting blade, and a breaking portion in a middle thereof; and an upper member made of resin material, which is placed face to face to the lower member, including a groove portion corresponding to the groove in the lower member enabling to receive a coated optical fiber, a coat removing blade corresponding to the coat removing blade in the lower member, and a breaking portion in a middle thereof corresponding to the breaking portion in the lower member. Incidentally, the respective blades formed on the lower and upper members are integrally formed when each of the lower and upper members is made of resin material.

Figure 7:
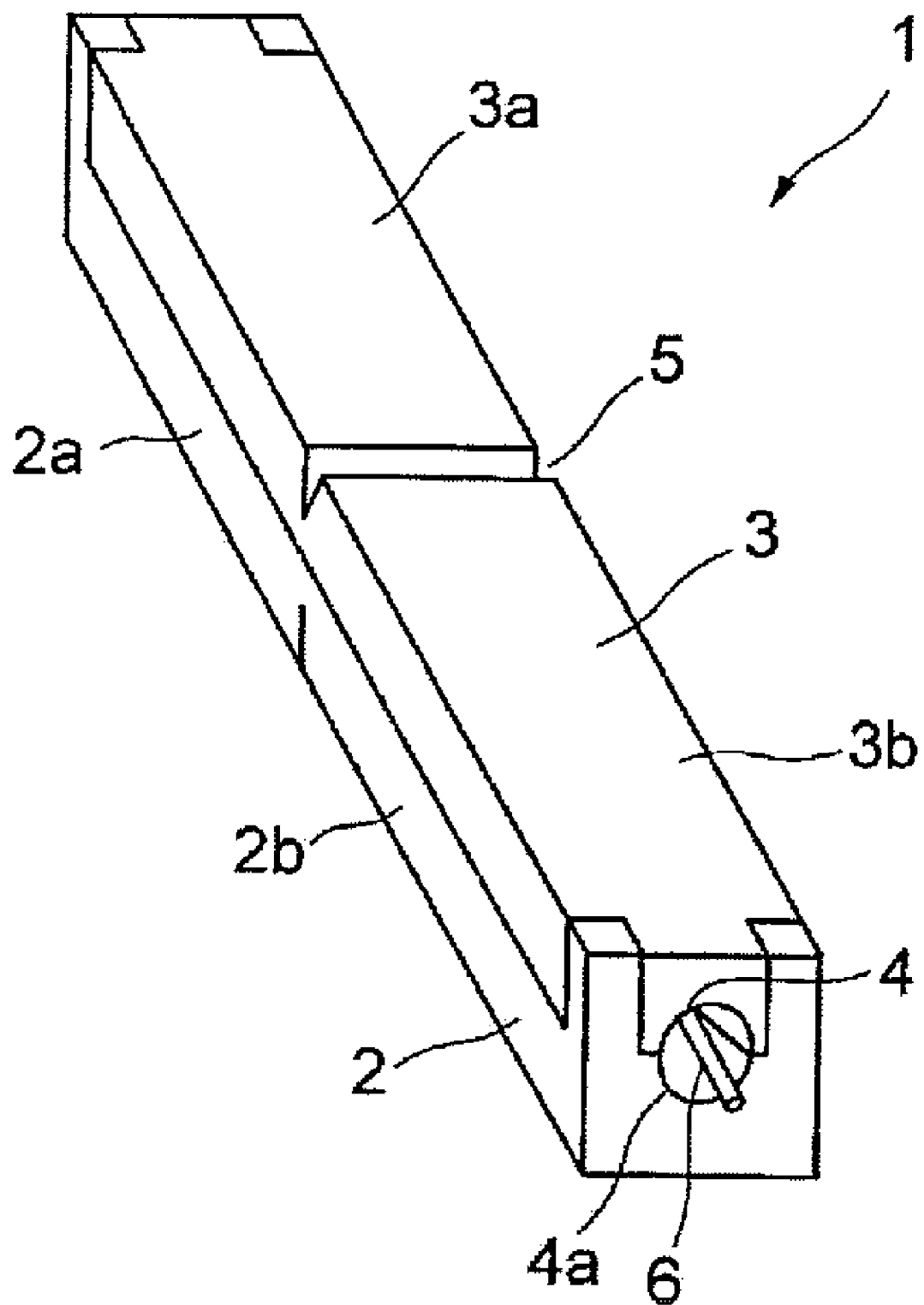
FIG. 7 is a perspective view showing the component of the invention for peeling the coating and breaking the optical fiber.
Figure 8A:
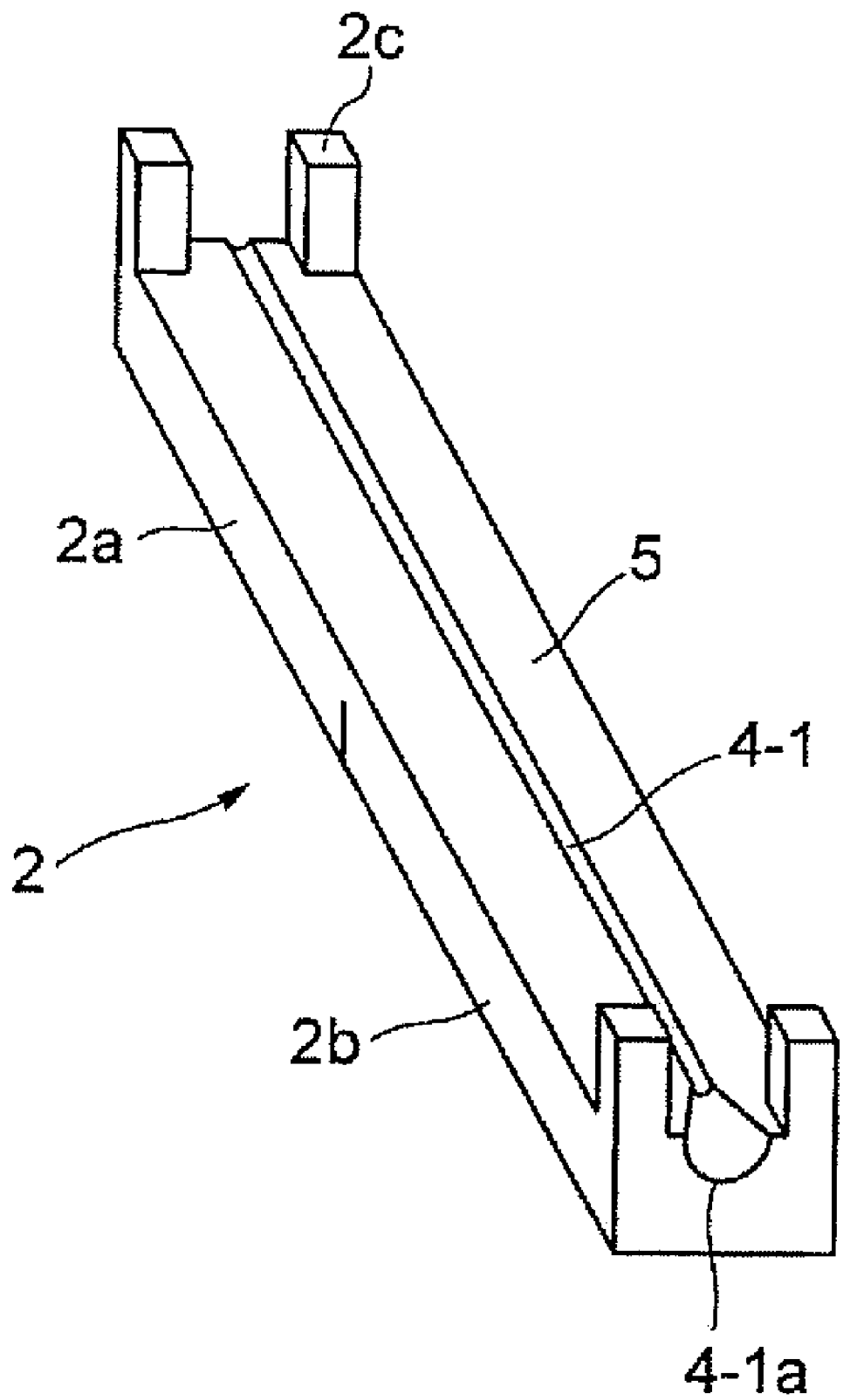
FIG. 8(a) is a perspective view showing the lower member.
Figure 8B:
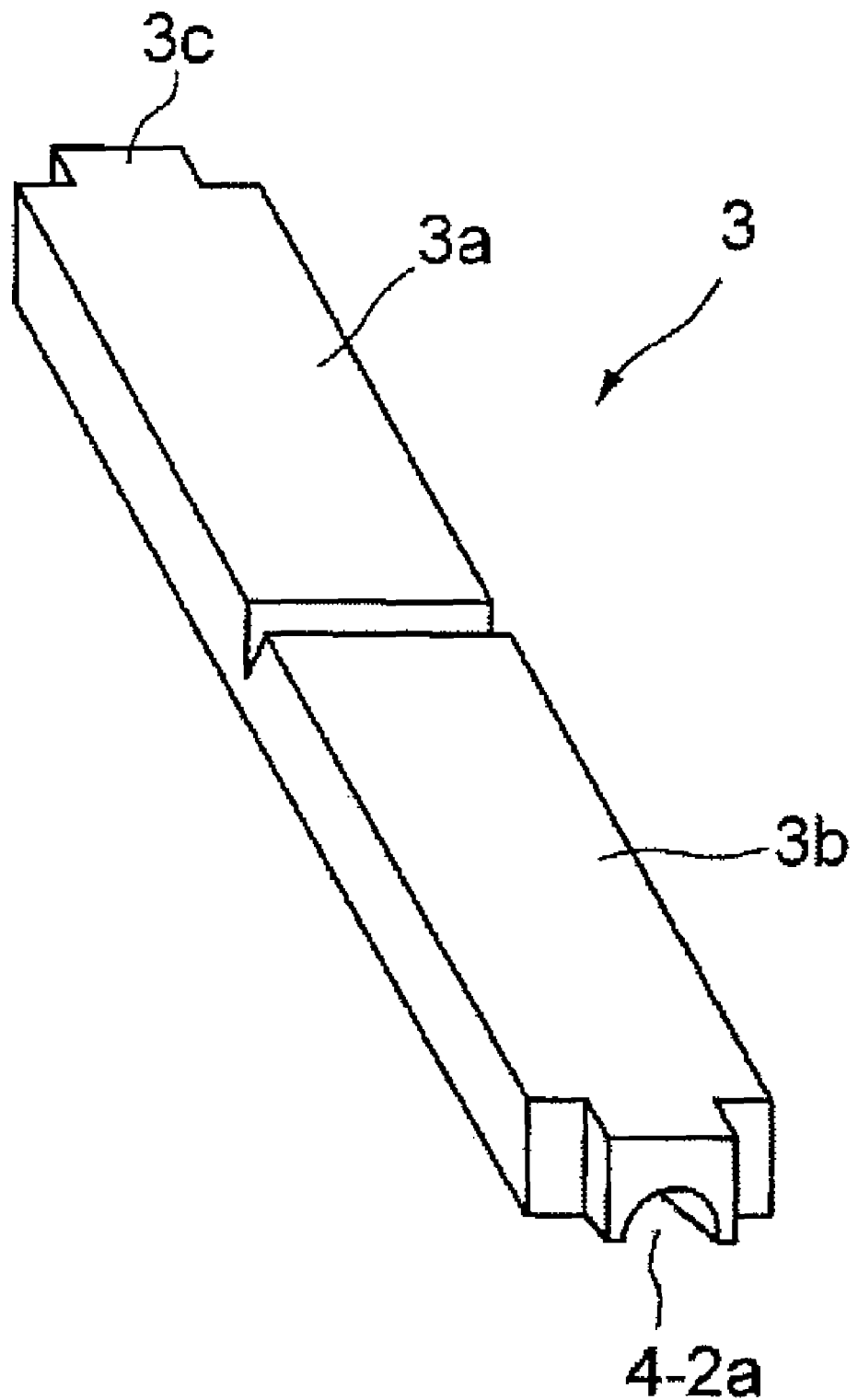
FIG. 8(b) is a perspective view showing the upper member.
Figure 8C:
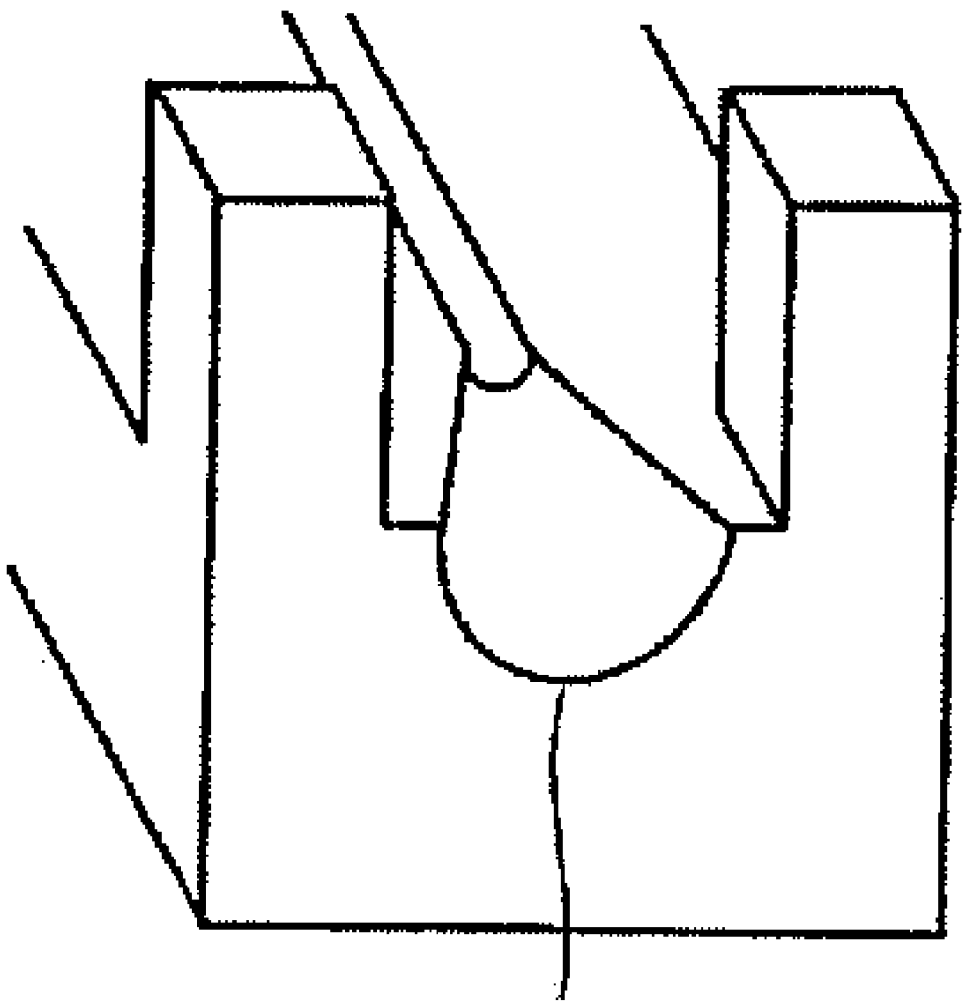
FIG. 8(c) is a partially enlarged view of an end portion in FIG. 8(a).

FIG. 7 is a perspective view showing the component of the invention for peeling the coating and breaking the optical fiber. FIG. 8 is a view showing disintegrated first member (namely lower member) and second member (namely upper member) as depicted in FIG. 7. FIG. 8(a) is a perspective view showing the lower member. FIG. 8(b) is a perspective view showing the upper member. FIG. 8(c) is a partially enlarged view of an end portion in FIG. 8(a).

As depicted in FIG. 7, the component 1 of the invention for peeling the coating and breaking the optical fiber includes the lower member 2 made of resin material, and the upper member 3 made of resin material. The lower member 2 comprises one member (namely left side lower member) 2a and the other member (namely right side lower member) 2b, and the upper member 3 comprises one member (namely left side upper member) 3a and the other member (namely right side upper member) 3b. Each of the upper member and the lower member has corresponding groove portion 4 on the facing surface and corresponding optical fiber inserting portion 4-1a, 4-1b formed as a half cut circular cone at the end portion of the groove portion 4.

As depicted in FIG. 8(c) in enlarged manner, each of the optical fiber inserting portion 4-1a, 4-1b is provided at the end portion of the right lower member and right upper member to form the substantially circular cone when both members are arranged to face each other. In addition, the breaking portion 5 having a tapered portion is provided in the middle portion of the upper member. The tapered portion facilitates to operate the breaking of the left side members, as described later.

As depicted in FIG. 8(a), a groove portion 4-1 is formed in the middle portion on the upper surface of the lower member in a longitudinal direction to receive the coated optical fiber. The optical fiber cutting blade made of resin material to scratch the surface of the cladding (not shown) of the optical fiber and the coat removing blade to remove the coating of the coated optical fiber are integrally formed within the groove portion in the middle portion of the lower member. As depicted in FIG. 8(b), the upper member made of resin material includes a breaking portion having a tapered portion on the surface in the middle portion thereof. The corresponding groove portion 4-2 to the groove portion on the facing surface in the lower member as depicted in FIG. 8(a) is formed in the upper member. The coat removing blade made of resin material to remove the coat of the coated optical fiber (not shown) is integrally formed within the groove portion of the upper member.

Both of the optical fiber cutting blade and the coat removing blade with the blades made of resin material are pressed on to the coated optical fiber in the direction perpendicular to the axis of the coated optical fiber 4. A protruded portion 3c is formed on the respective ends of the upper member 3, and an engaging column 2c which is engaged with the protruded portion of the upper member 3 is formed on each of the four corners of the lower member 2, each of which is extended toward the upper member 3. When each of the protruded portion is engaged with the pair of the corresponding engaging columns so that the upper member 3 is arranged face to face with the lower member 2, the upper member and the lower member can be freely moved within the height of the engaging column in such manner that both members come relatively close or come off.

All of the lower member, upper member, optical fiber cutting blade and coat removing blade are made of resin material which comprises epoxy or pps (polyphenylene sulfide) based synthetic-resin. For example, a widely used synthetic-resin for a ferrule can be used. Furthermore, the above described synthetic-resin for a ferrule with the glass filler mixed therein can be used. When the optical fiber cutting blade is pressed on the optical fiber with the coating removed and deformed, the glass filler mixed into the resin material is pressed on the surface of the cladding of the optical fiber so that the prescribed portion of the optical fiber is scratched. When the glass filler is contained at least 60% in the resin material, satisfactory scratch is formed without fail on the surface of the cladding of the optical fiber, so that the condition of the cut face (i.e., cleavage plane) of the optical fiber is excellent and the optical connection is made with the connection loss further reduced.

Figure 9:
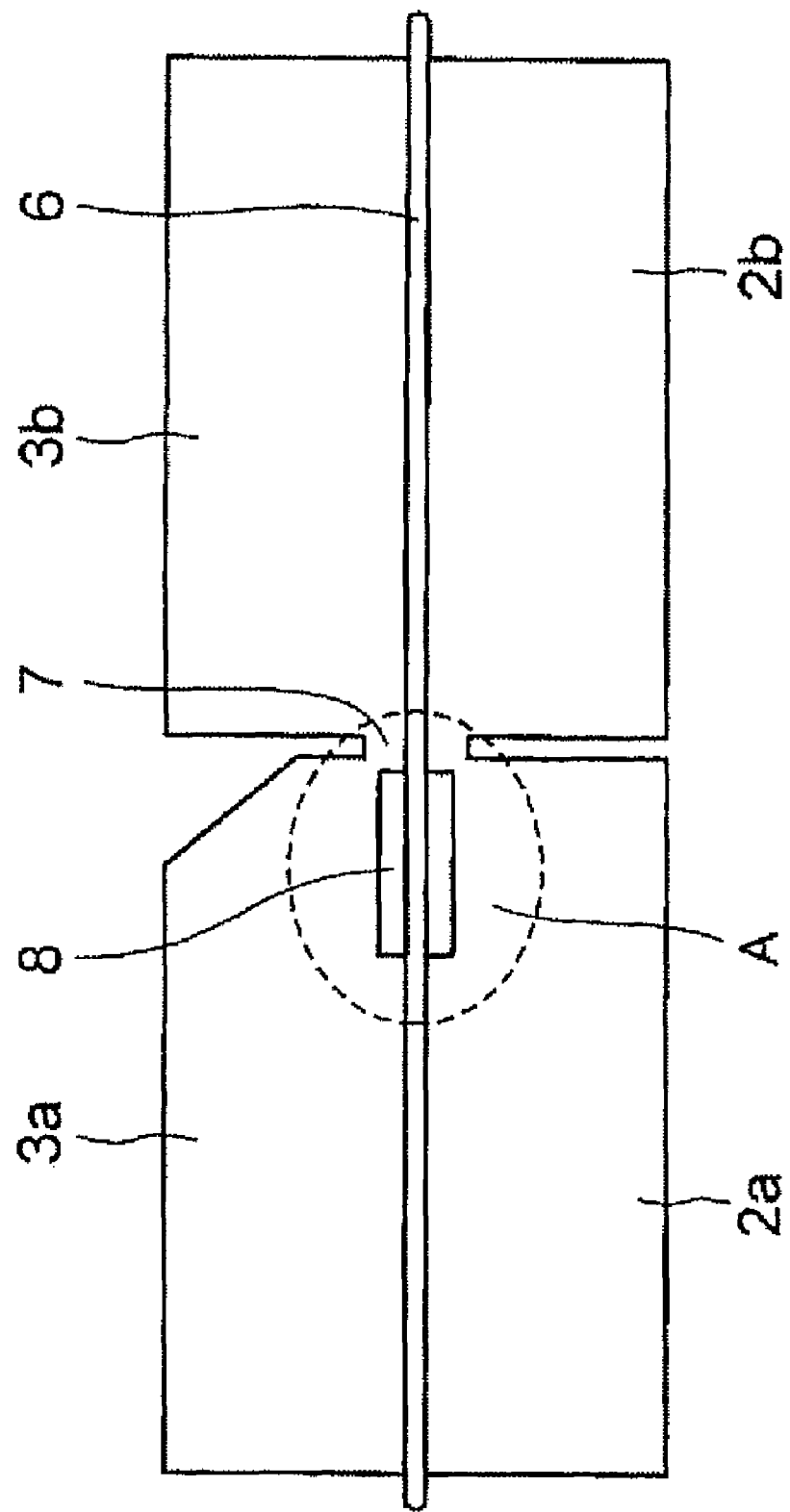
FIG. 9 is a schematic cross sectional view to explain one embodiment of the component of the invention for peeling the coating and breaking the optical fiber.
Figure 10:
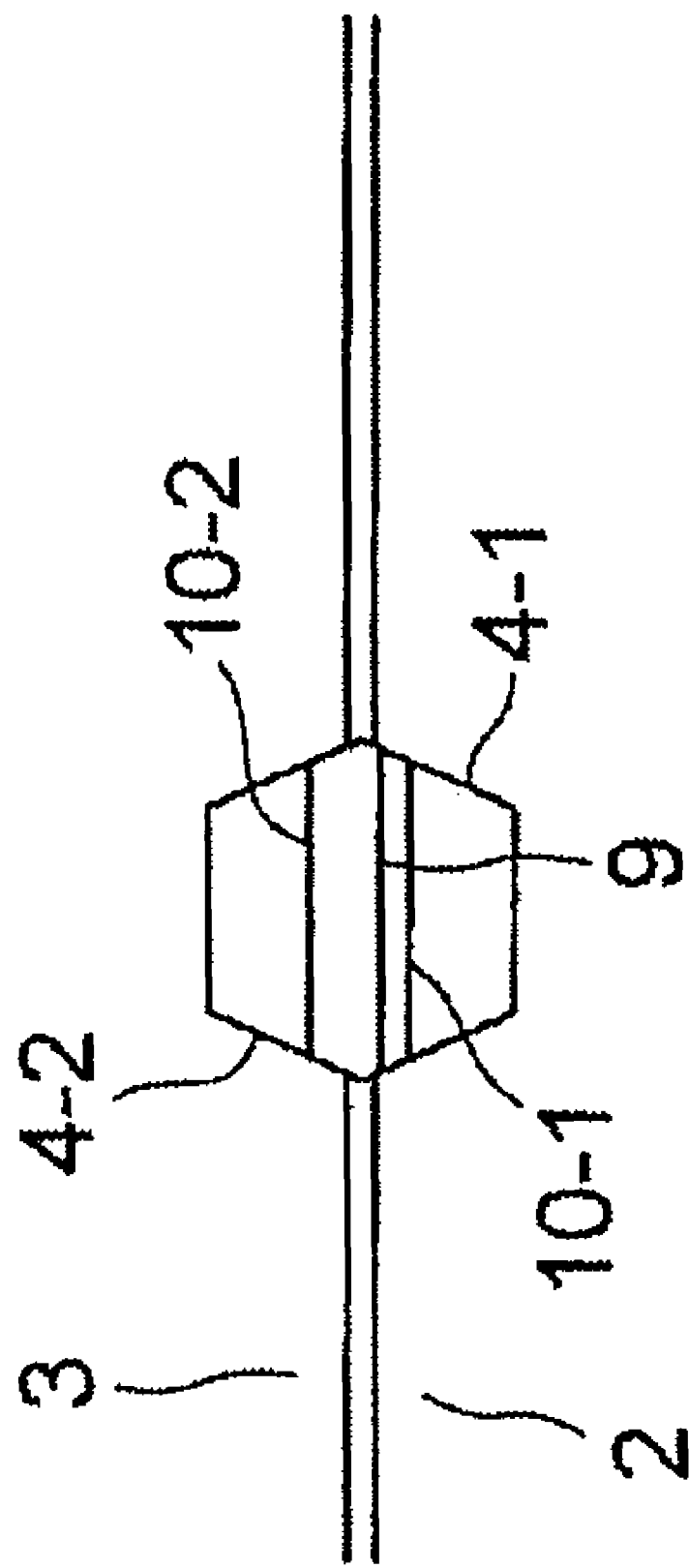
FIG. 10 is a cross sectional view to explain the relationship between the groove portion, the optical fiber cutting blade and the coat removing blade formed in the lower member and upper member.

FIG. 9 is a schematic cross sectional view to explain one embodiment of the component of the invention for peeling the coating and breaking the optical fiber. FIG. 10 is a cross sectional view to explain the relationship between the groove portion, the optical fiber cutting blade and the coat removing blade formed in the lower member and upper member.

As depicted in FIG. 9, the breaking portion formed in the middle portions of the lower member and the upper member comprises a connecting portion 7 with a small thickness. The connecting portion 7 connects the left side lower member 2a and the right side lower member 2b, as well as the left side upper member 3a and the right side upper member 3b. Furthermore, the hollow portion 8 is formed in the left side lower member 2a and the left side upper member 3a in such manner that the optical fiber runs in the middle of the hollow portion. The hollow portion is formed approximately between the optical fiber cutting blade and the coat removing blade.

Figure 11:
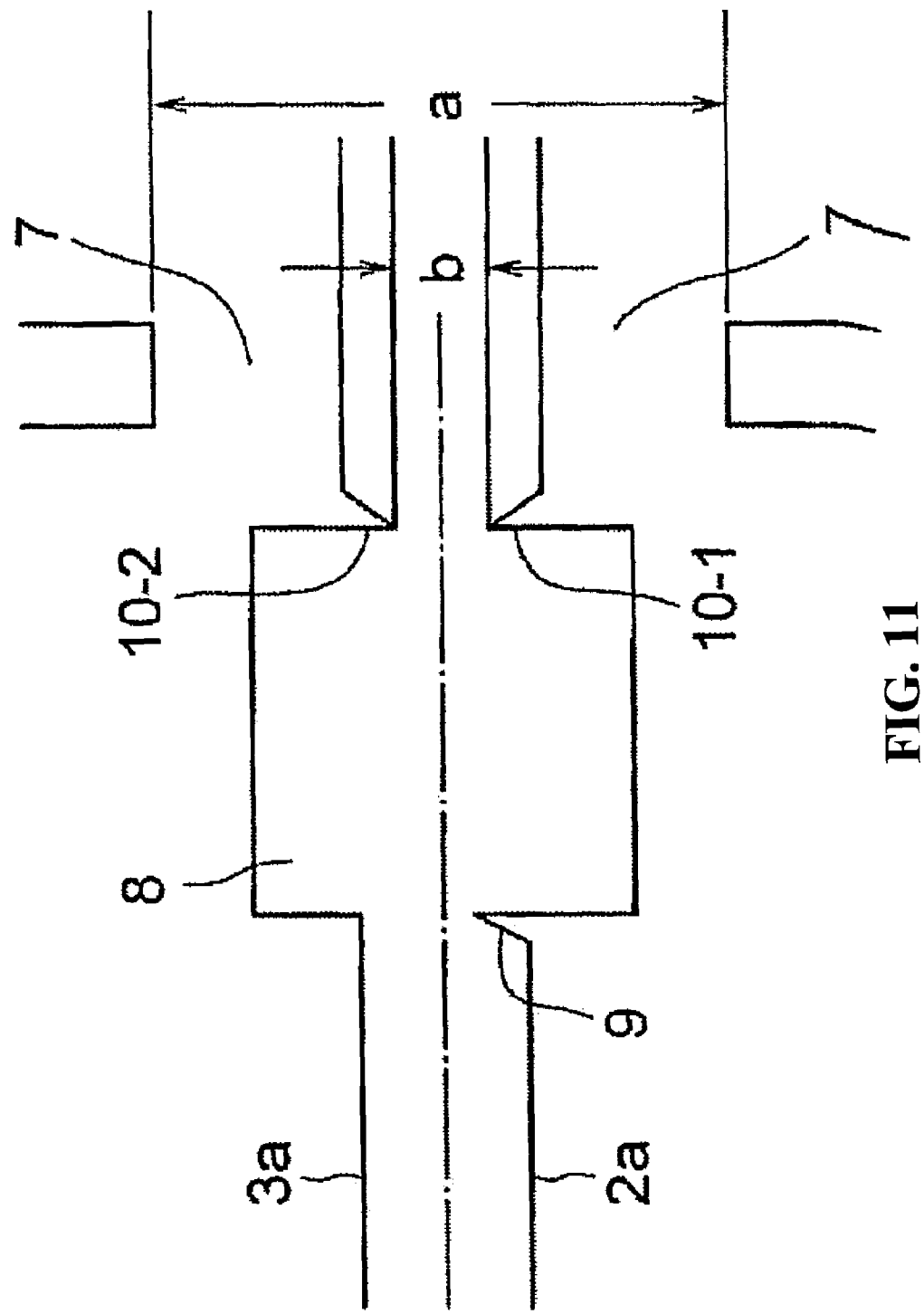
FIG. 11 is a partially enlarged view of the portion encircled with dotted line and represented by the reference A in FIG. 9.

FIG. 11 is a partially enlarged view of the portion encircled with dotted line and represented by the reference A in FIG. 9. The optical fiber cutting blade and the coat removing blade are described in detail with reference to FIG. 11. As depicted in FIG. 11, the optical fiber cutting blade 9 and the coat removing blade 10-1 are formed in the left side lower member 2a. The coat removing blade 10-2 is formed at the corresponding position to the coat removing blade 10-1 in the left side upper member 3a. More specifically, the optical fiber cutting blade 9 is formed only in the left side lower member, and the optical fiber cutting blade is formed in such manner as to protrude deeper than the coat removing blade toward the center of the optical fiber.

On the other hand, the coat removing blade is respectively formed in the left side lower member and the left side upper member at the corresponding positions so as to sandwich the coated optical fiber. As described above, the hollow portion 8 is formed in the left side lower member and the left side upper member between the optical fiber cutting blade and the coat removing blade. The hollow portion has a function in which after the surface of the cladding of the optical fiber is scratched by the optical fiber cutting blade and the coating of the coated optical fiber is cut by the coat removing blade, the position of the optical fiber to be bent is displaced so that the optical fiber is prevented from being broken at the connecting portion between the left side member and the right side member.

The clearance b between the upper and lower coat removing blades is within a range of from 0.128 to 0.140 mm, when the upper member 3 and the lower member 2 are placed to be contacted each other. With the clearance b being less than 0.128 mm, the cladding of the optical fiber may be possibly damaged. With the clearance b being over 0.140 mm, the removing of the coating may be possibly failed. The thickness a of the connecting portion 7 is within a range of from 0.4 mm to 2.0 mm. With the thickness a of the connecting portion being less than 0.4 mm, the connecting portion may be possibly broken in the process of operation. With the thickness a of the connecting portion being over 2.0 mm, the connecting portion comes to be hardly broken to damage the operation.

As depicted in FIG. 10, the lower member and the upper member are arranged in such manner that the groove portion 4-1 formed in the lower member faces to the groove portion 4-2 formed in the upper member. The coat removing blade 10-1 and the optical fiber cutting blade 9 are integrally formed within the groove portion 4-1 with the lower member. In addition, the coat removing blade 10-2 is integrally formed with the upper member. When the optical fiber cutting blade 9 is pressed on the coated optical fiber, the blade breaks through the coating, and then the tip portion of the blade itself made of resin material is deformed and pressed on the surface of the cladding in the optical fiber, since the resin material is softer than the optical fiber made of silica glass, for example. When the blade 9 is pressed on the surface of the cladding, the surface of the cladding is scratched. Thus, the surface of the cladding in the optical fiber can be scratched by only pressing the blade made of the resin material, without pulling or pushing in horizontal direction nor rotating the blade.

The coat removing blade is also made of resin material. When the coat removing blade is pressed on the coated optical fiber, the coat removing blade cuts through only the coating without damaging the cladding of the optical fiber, since the coating is softer than the optical fiber made of silica glass or the like.

The angle $\alpha$ at the tip end of the optical fiber cutting blade and the coat removing blade is within a range of from 10 to 45 degrees. With the angle $\alpha$ of the tip end of the blade to be less than 10 degrees, it is difficult to obtain necessary strength for the optical fiber cutting blade, in addition to that the blade is easily broken or it is hard to form. On the other hand, with the angle $\alpha$ of the tip end of the blade to be over 45 degrees, even though the blade is pushed onto the optical fiber, the optical fiber is hardly damaged and cut off. Furthermore, the degree of cutting into the coating is not satisfactory. The optical fiber 6 is bent in a reverse direction to the portion of getting scratched to result in the cleavage and removing the coating.

In one embodiment of the component of the invention for peeling the coating and breaking the optical fiber, the first member (i.e., lower member) and the second member (i.e., upper member) have respective convex portions to support the coated optical fiber on at least one corresponding position within the groove portion, where neither the optical fiber cutting blade nor the coat removing blade is formed.

Figure 12A:
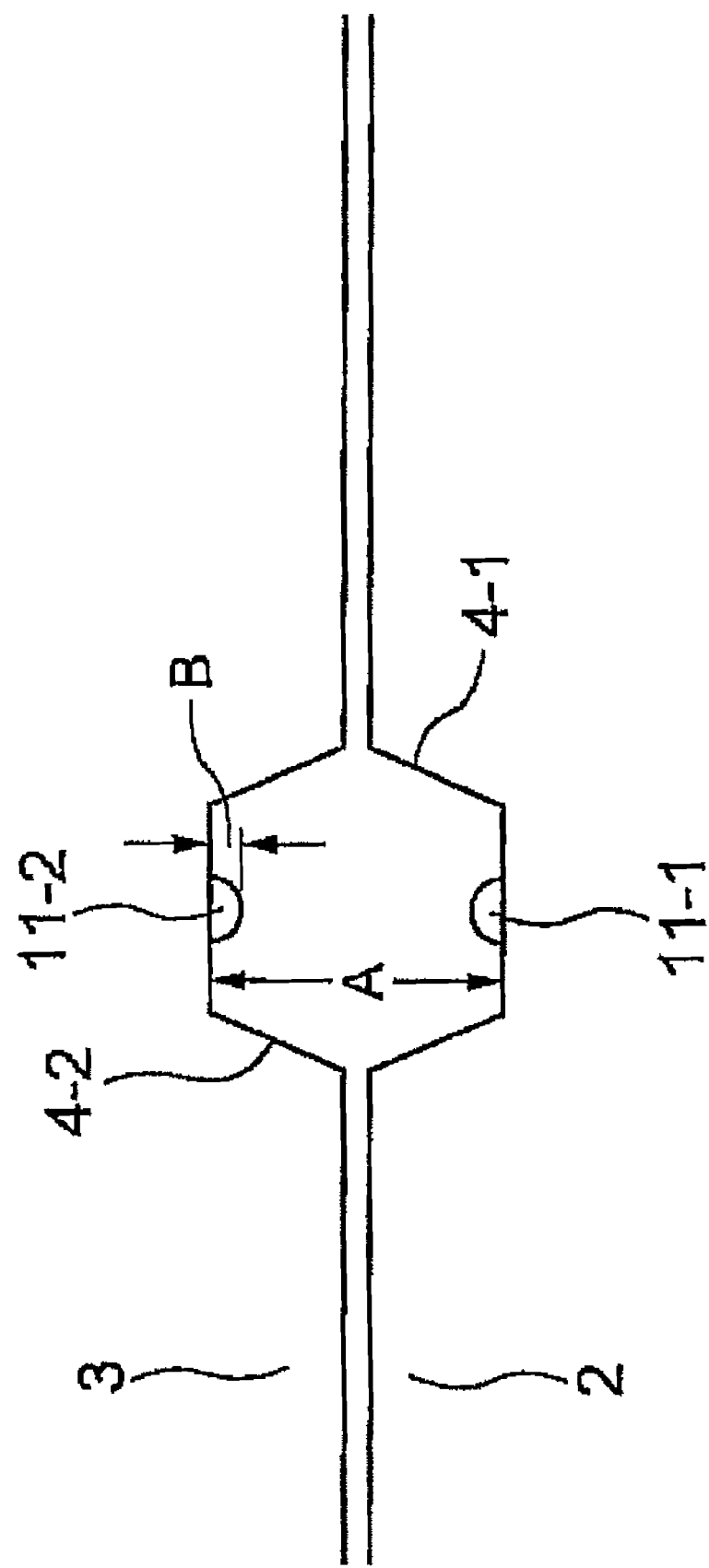
FIGS. 12(a) and 12(b) are cross sectional views to explain the convex portion formed within the groove portion.
Figure 12B:
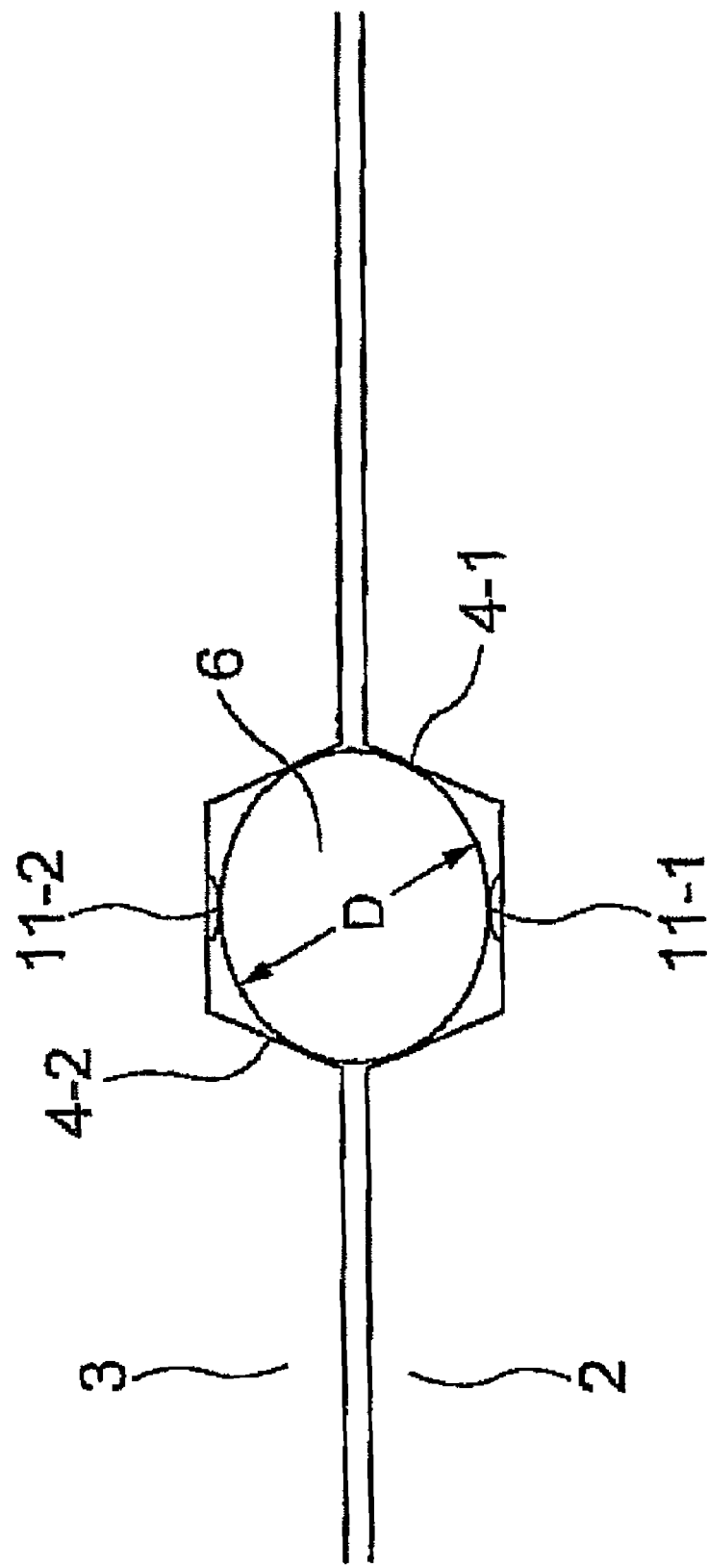

FIG. 12 is a cross sectional view to explain the convex portion formed within the groove portion. FIG. 12(a) is a cross sectional view showing the state in which the first member and the second member are arranged face to face without receiving the coated optical fiber. FIG. 12(b) is a cross sectional view showing the state in which the first member and the second member are arranged face to face with the coated optical fiber received therein. As depicted in FIG. 12(a), the convex portions 11-1, 11-2 with the tip end rounded as a doom are respectively formed at the corresponding parts within the groove portion 3 on the first member 2 and the second member 3 facing each other. As depicted in FIG. 12(b), the convex portions 11-1, 11-2 press parts of the outer surface of the coated optical fiber received within the groove portion to hold and fix the coated optical fiber therein. At least one pair of the convex portions are integrally formed within the respective groove portions with the corresponding first member and the second member. A plurality of pairs of convex portions may be formed with a prescribed interval.

The position of the convex portion is preferably at the corresponding location within the groove portion of the respective first member and the second member. With the above described convex portion, the coated optical fiber can be surely held within the groove portion where neither the optical fiber cutting blade nor the coat removing blade is formed. Thus, when the coat is removed and the optical fiber is cut off, the coated optical fiber does not displace within the groove portion, enabling the coat removing and fiber cutting to be easy.

The height of the convex portion from the bottom face of the groove portion is within a range of from 0.01 to 0.05 mm. With the height of the convex portion to be less than 0.01 mm, the coated optical fiber cannot be surely held so that satisfactory effect cannot be expected. On the other hand, with the height of the convex portion to be over 0.05 mm, the first member and the second member are not fitted to contact face to face so that the coated optical fiber is unstable within the groove portion, thus the coated optical fiber is not satisfactorily held.

Figure 13A:
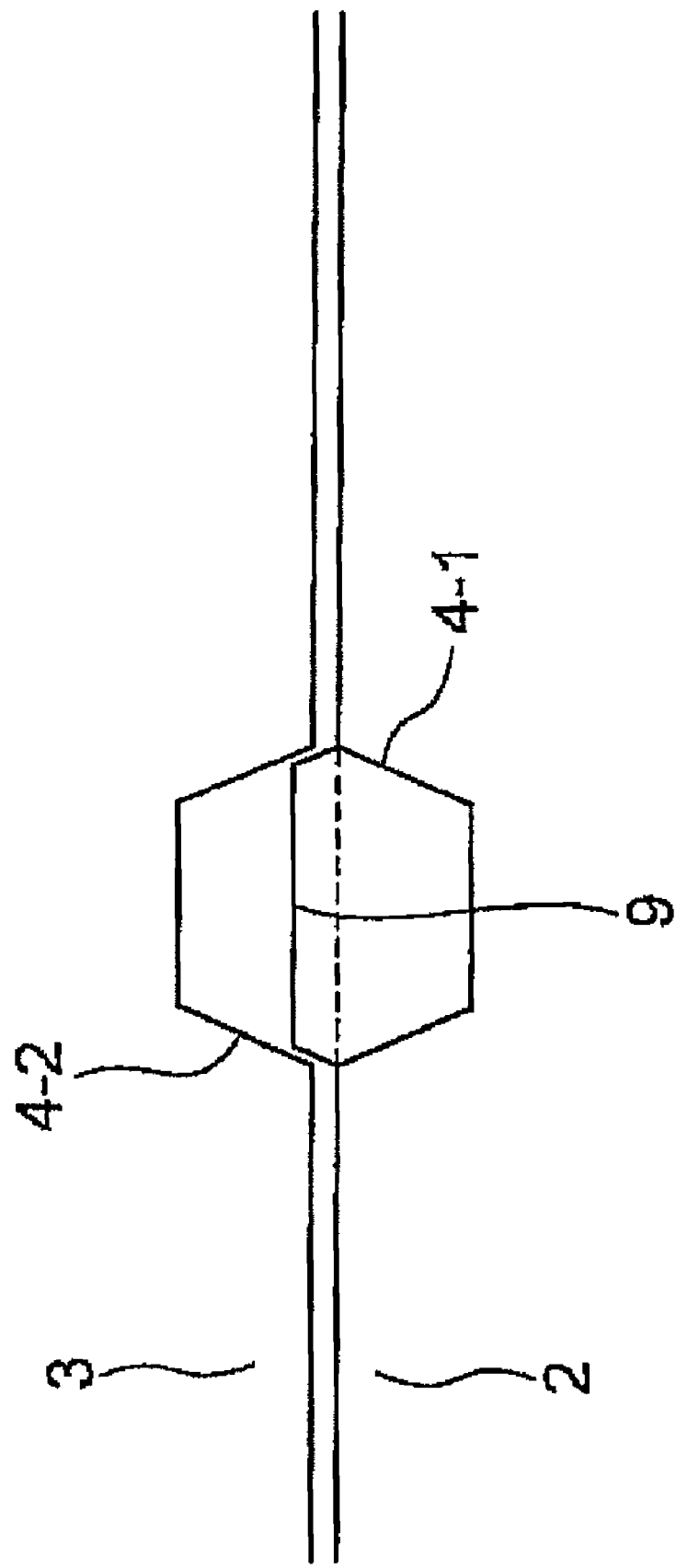
FIG. 13(a) is a view to explain the state in which the tip end of the optical fiber cutting blade is protruded into the groove portion of the second member.

In one embodiment of the component of the invention for peeling the coating and breaking the optical fiber, the groove portion comprises the flat bottom face and the both side faces slanted from the bottom face, and the optical fiber cutting blade is formed to be positioned in the groove portion with the tip end of the blade protruded into the groove portion of the second member. FIG. 13(a) is a view to explain the state in which the tip end of the optical fiber cutting blade is protruded into the groove portion of the second member. As depicted in FIG. 13(a), the tip end of the optical fiber cutting blade 9 integrally formed in the groove portion 4-1 with the first member 2 protrudes upward from the surface (depicted by dotted line in the drawing) of the first member and is positioned within the groove portion of the second member. With the optical fiber cutting blade thus protruded into the groove portion of the second member, the optical fiber cutting blade is surely pressed onto the optical fiber to enable to easily and surely cut the optical fiber.

Figure 13B:
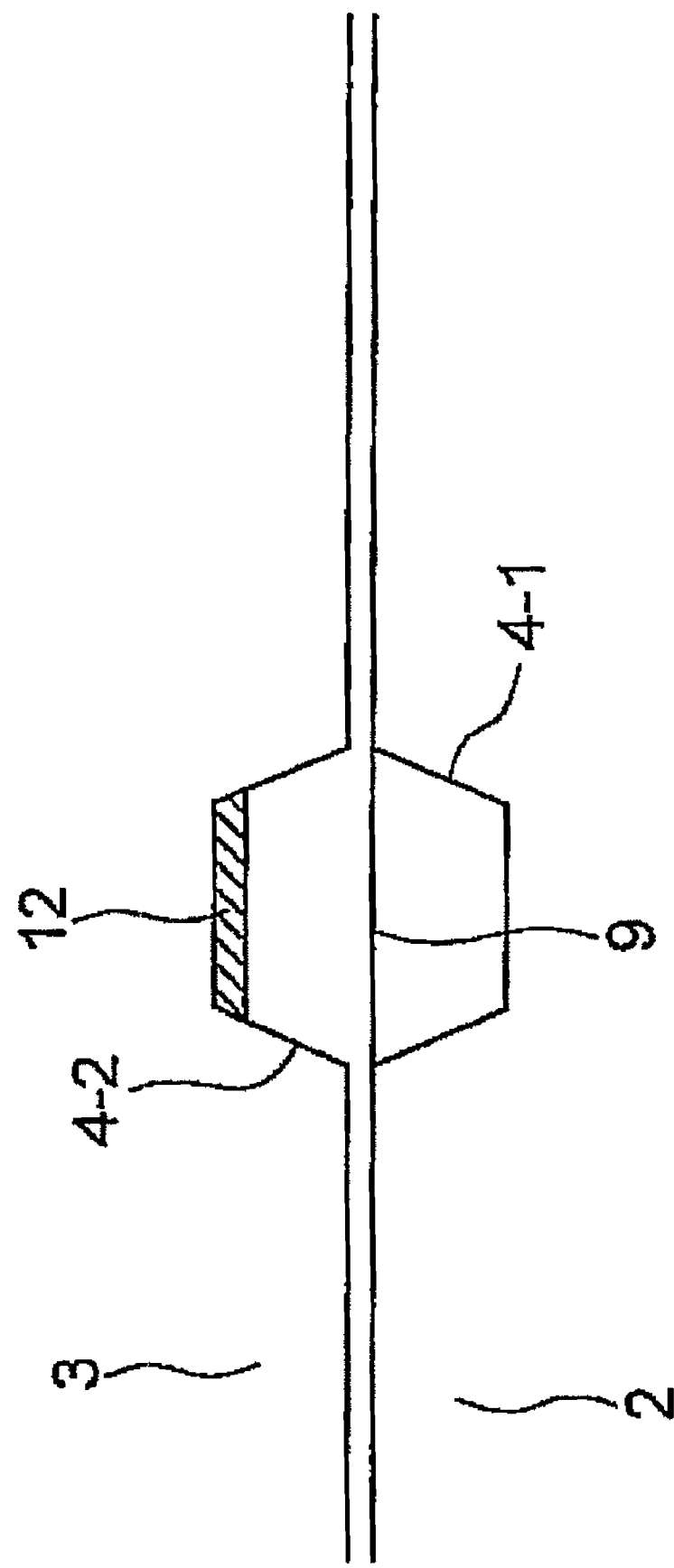
FIG. 13(b) is a view to explain the stage formed within the groove portion at the position corresponding to the optical fiber cutting blade.

In one embodiment of the component of the invention for peeling the coating and breaking the optical fiber, a stage is formed within the groove portion of the second member at the position corresponding to the optical fiber cutting blade. FIG. 13(b) is a view to explain the stage formed within the groove portion at the position corresponding to the optical fiber cutting blade. In the previously described embodiment, the tip end of the optical fiber cutting blade is protruded within the groove portion of the opposing member to shorten the distance between the tip end of the blade and the optical fiber, thus enabling to securely press the optical fiber cutting blade to the optical fiber. In this embodiment, the stage is formed within the groove portion of the second member to relatively shorten the distance between the tip end of the blade and the optical fiber, thus enabling to securely press the optical fiber cutting blade to the optical fiber. As depicted in FIG. 13(b), the stage 12 is formed within the groove portion 4-2 of the second member 3 at the corresponding position to the optical fiber cutting blade 9 which is integrally formed within the groove portion 4-1 of the first member 2. In this case, the tip portion of the optical fiber cutting blade 9 is formed to be in the same level as the surface of the first member 2. The stage is a rectangular member having a flat surface, and may be integrally formed with the second member 3. The shape of the surface of the stage 12 may be concave in corresponding to the outer peripheral of the coated optical fiber. With the above described stage, the distance between the tip end of the blade and the optical fiber is relatively shortened to enable to securely press the optical fiber cutting blade to the optical fiber.

The method of peeling the coating and breaking the optical fiber is described hereunder.

The method comprising the steps of: arranging to face the lower member and the upper member, the lower member made of resin material including a groove portion enabling to receive a coated optical fiber, an optical fiber cutting blade and a coat removing blade made of resin material integrally formed within the groove portion, and a breaking portion in a middle thereof, the upper member made of resin material, which is placed face to face to the lower member, including a groove portion corresponding to the groove in the lower member enabling to receive a coated optical fiber, a coat removing blade corresponding to the coat removing blade in the lower member, and a breaking portion in a middle thereof corresponding to the breaking portion in the lower member; receiving a coated optical fiber in the groove portion; pressing the lower member and the upper member in the middle portion thereof with a prescribed force to press the optical fiber cutting blade on the optical fiber until the blade itself is deformed, thus scratching the optical fiber; applying a tensile force to a portion where the optical fiber is scratched by the optical fiber cutting blade, and bending the breaking portion in a reverse direction to the scratch to cut off the optical fiber, at the same time to peel off the coating of the coated optical fiber by the coat removing blade.

Figure 14A:
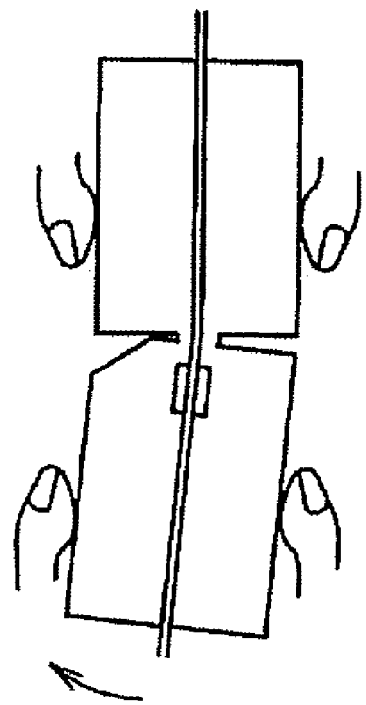

The method of peeling the coating and breaking the optical fiber is described with reference to FIG. 14. As depicted in FIG. 14(a), the lower member and the upper member are placed with the respective groove portions 4 facing each other. The single coated optical fiber is inserted from the optical fiber inserting portion formed at the end of the groove portion 4 of the lower member and the upper member until the tip end of the optical fiber passes over the optical fiber cutting blade. Then, the coated optical fiber is pinched between the lower member and the upper member, thus the coated optical fiber is fixed to the component 1 for peeling the coating and breaking the optical fiber.

In this situation, as depicted in the drawing, portions of the lower member and the upper member are pressed by the thumb and index fingers. Then, the portions corresponding to the optical fiber cutting blade and the coat removing blade in the left lower member and left upper member are pressed down by the fingers to cause the respective faces of the lower member and the upper member to be touched. At this right moment, the optical fiber cutting blade 9 breaks through the coating of the coated optical fiber and reaches the surface of the cladding of the optical fiber, and then is deformed to scratch the surface of the cladding, while the coat removing blade cut through the coating of the coated optical fiber.

Figure 14B:
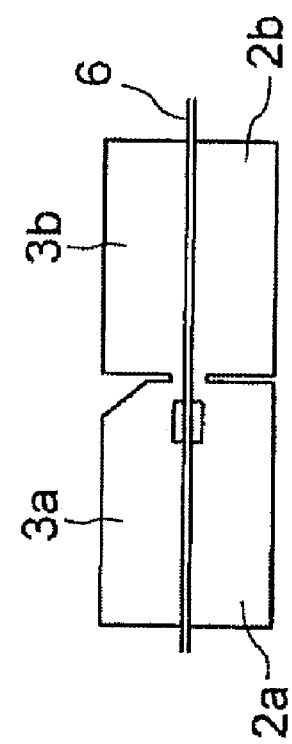
Figure 14C:
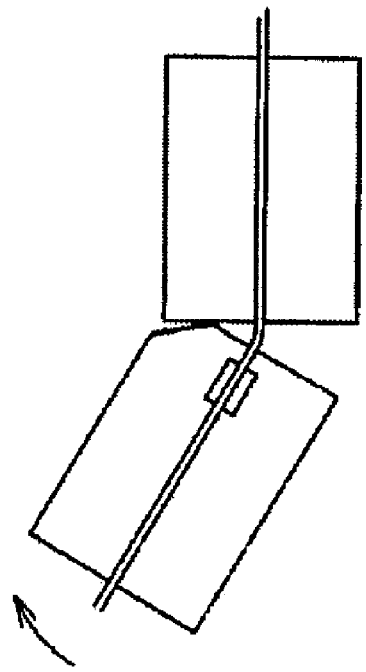
Figure 14D:
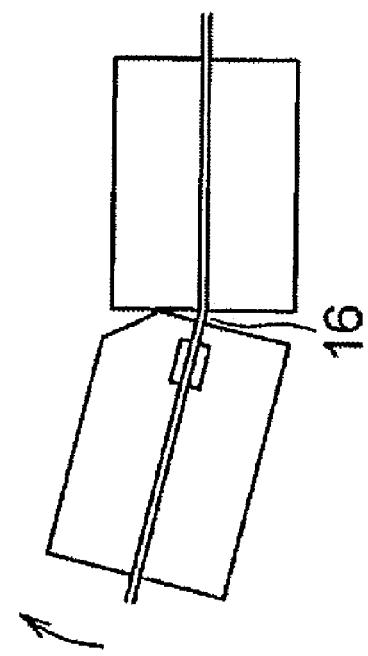

Then, as depicted in FIG. 14(b), the component is broken by hand in the reverse direction to the scratch made by the optical fiber cutting blade (upper side in the drawing). At this stage, the coating has been removed and the glass portion of the optical fiber is exposed at the connecting portion between the right side member and the left side member. Then, as depicted in FIGS. 14(c) to 14(e), the component is further bent. At this stage, the optical fiber is cut off at the portion scratched by the optical fiber cutting blade. At the stage depicted in FIG. 14(f), the cut off optical fiber is released, and then, as depicted in FIG. 14(g), the glass portion of the optical fiber is exposed with the coating removed.

The optical fiber with the coating thus removed and glass portion cut off as described above is used to assemble the optical connector, and the connecting end faces are connected with a refractive index matching agent applied thereto, to have realized the connecting loss of up to 1.0 dB.

According to the present invention, since the operation can be carried out by holding and pressing the lower member and the upper member with a prescribe force by means of fingers, the end portion of the coated optical fiber can be easily handled by hands, without specific tool.

Furthermore, since the blade is not moved in a direction perpendicular to the longitudinal direction of the optical fiber, any body can easily scratch and cut off the optical fiber.

According to the present invention, since the optical fiber cutting blade and the coat removing blade are integrally formed with resin material, the manufacturing cost can be reduced. In addition, since both blades are made of resin material and the cost thereof is low, the members with the blades can be discarded after being used. Furthermore, since the present invention can be applied to the coated optical fiber, and then the cut off optical fiber which is not used anymore is the coated optical fiber, it can be prevented that the invisible glass body of the optical fiber with the coating removed damages the hand by sticking.

One of the embodiments of the component of the invention for peeling the coating and breaking the optical fiber comprises: a first member (i.e., lower member) made of resin material including a groove portion extending in a longitudinal direction and enabling to receive a coated optical fiber, an optical fiber cutting blade made of resin material integrally formed within the groove portion, a pair of coat removing blades made of resin material integrally formed within the groove apart from the optical fiber cutting blade, which are arranged face to face apart from each other in the direction perpendicular to the longitudinal direction, and a breaking portion in a middle thereof; and a second member (i.e., upper member) made of resin material, which is placed face to face to the first member, including a groove portion corresponding to the groove in the first member enabling to receive a coated optical fiber, a pair of coat removing blades corresponding to the pair of coat removing blades in the first member, and a breaking portion in a middle thereof corresponding to the breaking portion in the first member. Incidentally, the respective blades formed on the lower (i.e. first) member and the upper (second) member are integrally formed when each of the lower and upper members is made of resin material.

Figure 15:
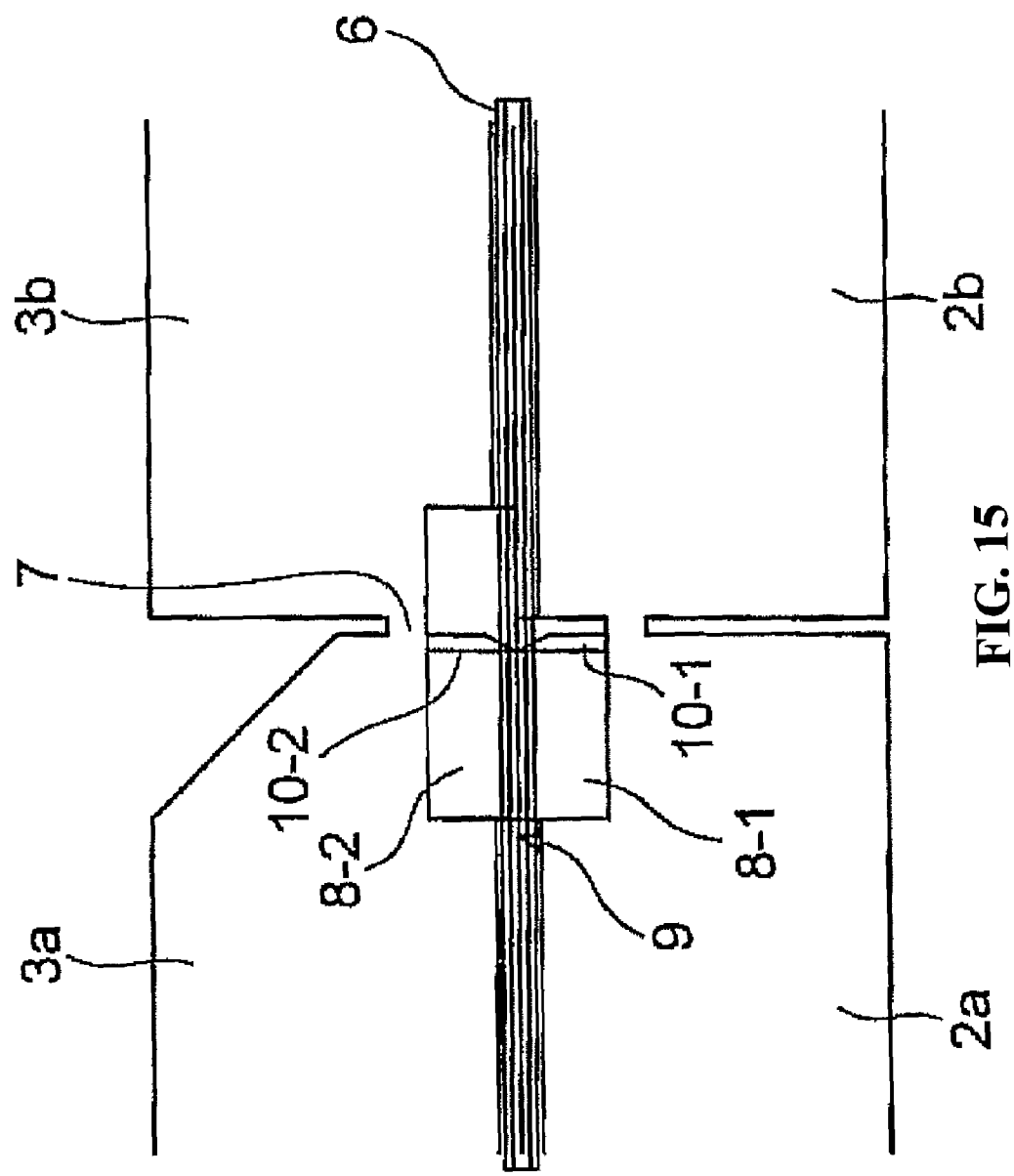
FIG. 15 is a schematic cross sectional view to explain the component of the invention for peeling the coating and breaking the optical fiber.

The optical fiber cutting blade made of resin material is pressed on the coated optical fiber 6 in the direction perpendicular to the axis of the coated optical fiber. The pair of coat removing blades formed with a specific space, respectively in the upper member and the lower member are pressed on the coating portions, which are positioned on both sides of the optical fiber, in the direction perpendicular thereto. Incidentally, a protruded portion 3c is formed on the respective ends of the upper member 3, and an engaging column 2c which is engaged with the protruded portion of the upper member 3 is formed on each of the four corners of the lower member 2, each of which is extended toward the upper member 3. When each of the protruded portion is engaged with the pair of the corresponding engaging columns so that the upper member 3 is arranged face to face with the lower member 2, the upper member and the lower member can be freely moved within the height of the engaging column in such manner that both members come relatively close or come off FIG. 15 is a schematic cross sectional view to explain the component of the invention for peeling the coating and breaking the optical fiber. As depicted in FIG. 15, the bottom face of the lower member 2 and the top face of the upper member 3 are formed not to contact the optical fiber between the blade 9 and the blade 10, respectively. The hollow portion in the lower member is formed approximately in the region from the optical fiber cutting blade to the coat removing blade, while the hollow portion in the upper member is formed in the region from the optical fiber cutting blade through the coat removing blade extending to a far ahead over the coat removing blade. The optical fiber cutting blade 9 and the coat removing blade 10-1 are formed in the left lower member 2a. The coat removing blade 10-2 is formed in the left upper member 3a at the location corresponding to the coat removing blade 10-1. More specifically, the optical fiber cutting blade 9 is provided only in the left lower member.

Figure 16:
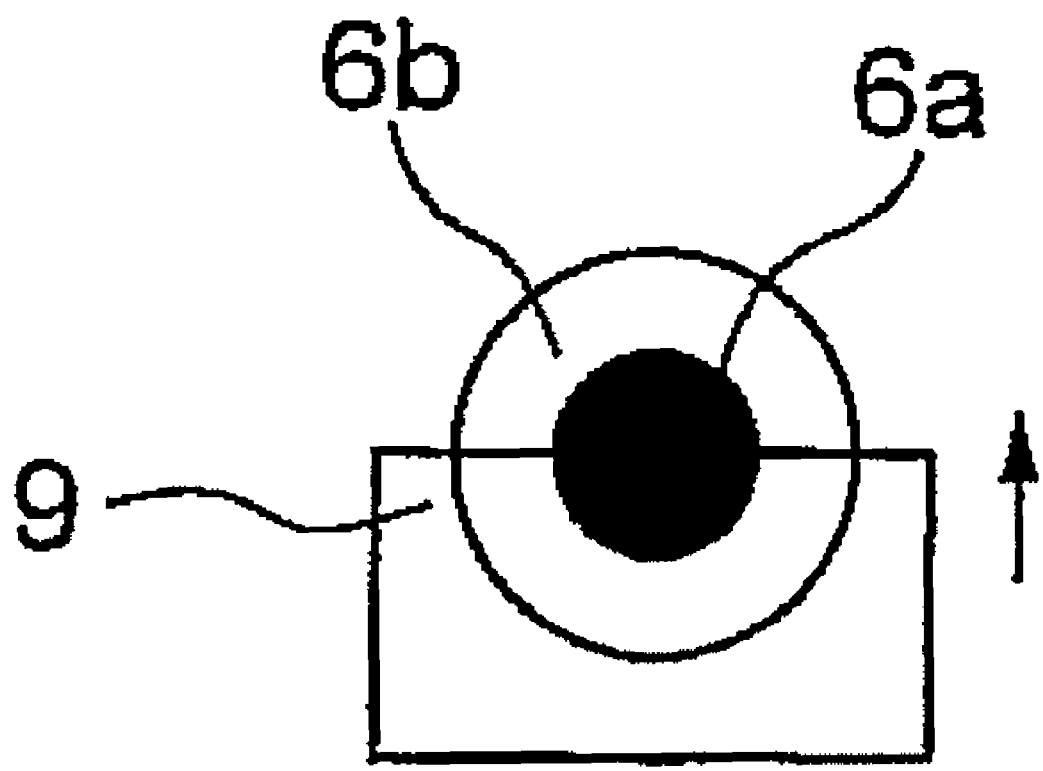
FIG. 16 is an enlarged view to explain the state in which the optical fiber cutting blade is pressed on the coated optical fiber.

FIG. 16 is an enlarged view to explain the state in which the optical fiber cutting blade is pressed on the coated optical fiber. As depicted in FIG. 16, the optical fiber cutting blade 9 is pressed from lower side on the coated optical fiber 6. At first, the coating 6b is cut off, and then the blade 9 is pressed on the surface of the cladding of the optical fiber 6a until the blade 9 itself is deformed, thus scratching the surface of the cladding.

Figure 17:
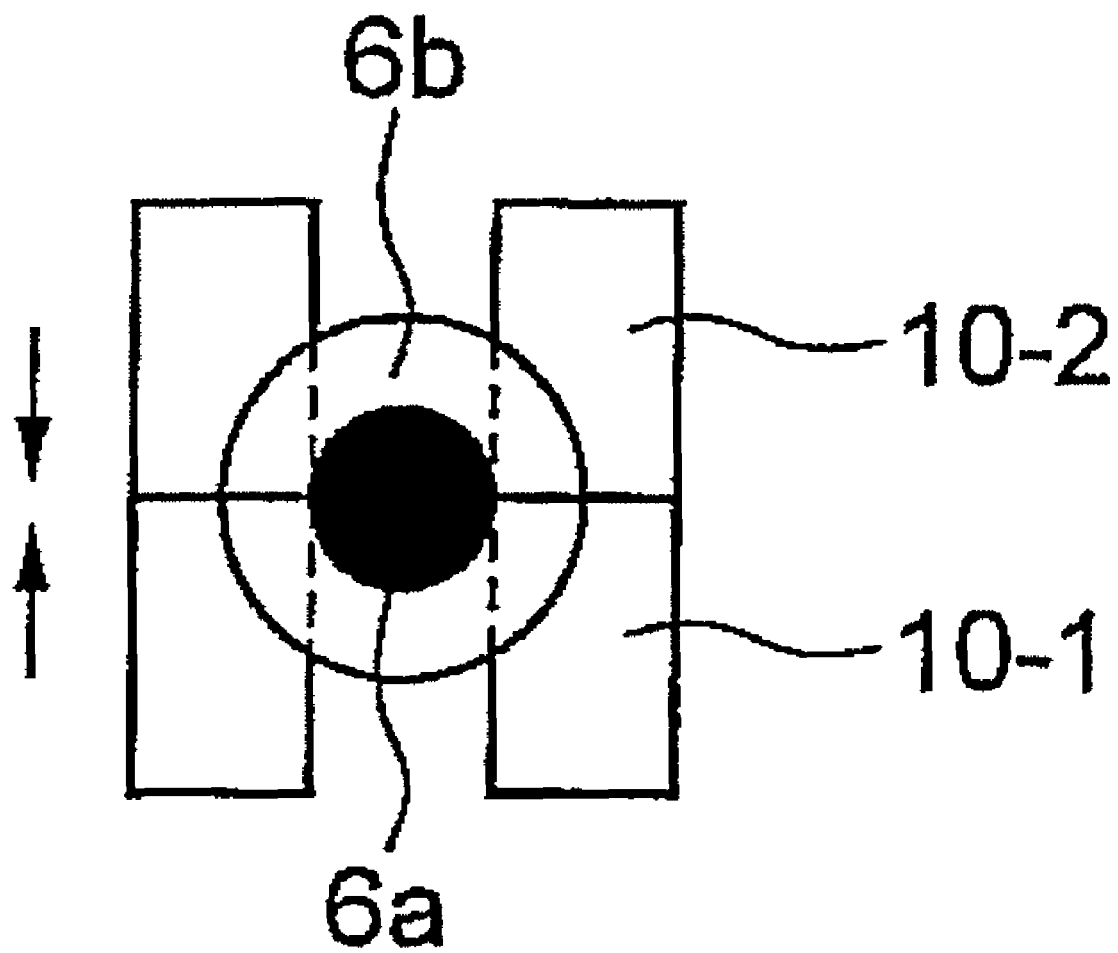
FIG. 17 is a view to explain the state in which each pair of the coat removing blades arranged face to face cut into the coating.

FIG. 17 is a view to explain the state in which each pair of the coat removing blades arranged face to face cut into the coating. The pair of the coat removing blades 10-1 are formed with a prescribed gap in the lower member in a perpendicular direction to the longitudinal direction of the lower member. The pair of the coat removing blades 10-2 are formed with a prescribed gap in the upper member corresponding to the pair of coat removing blade of the lower member, in a perpendicular direction to the longitudinal direction of the upper member. As depicted in FIG. 17, the coated optical fiber 6 is received in the groove portion. When the middle portions of the lower member 2 and the upper member 3 are pressed with a prescribed force, the pair of the coat removing blades 10-2 formed in the upper member and the pair of the coat removing blades 10-1 formed in the lower member cut into the coat 6b from the upper and lower sides until the tip ends of the respective blades hit each other. More specifically, the prescribed gap of the pairs of the coat removing blades 10-1, 10-2 arranged face to face is formed to be substantially identical to the diameter of the glass portion of the optical fiber. Thus, the coat removing blades are cut into the coating positioned at the both sides in the cross section of the glass portion of the optical fiber, so as not to scratch the surface of the cladding of the optical fiber.

Figure 18A:
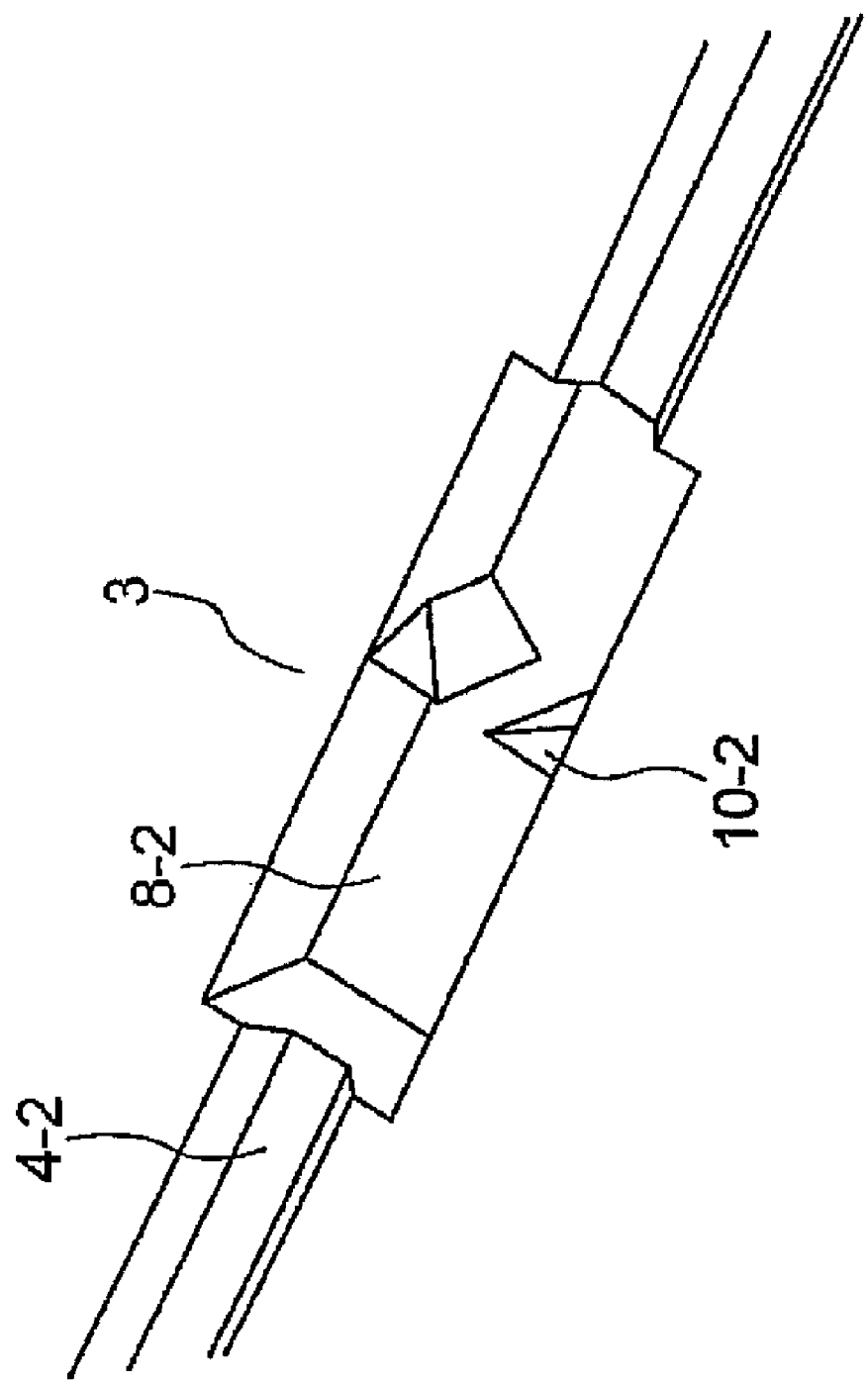
FIGS. 18(a) and 18(b) are enlarged views to explain the optical fiber cutting blade and the coat removing blade formed in the groove portion.
Figure 18B:
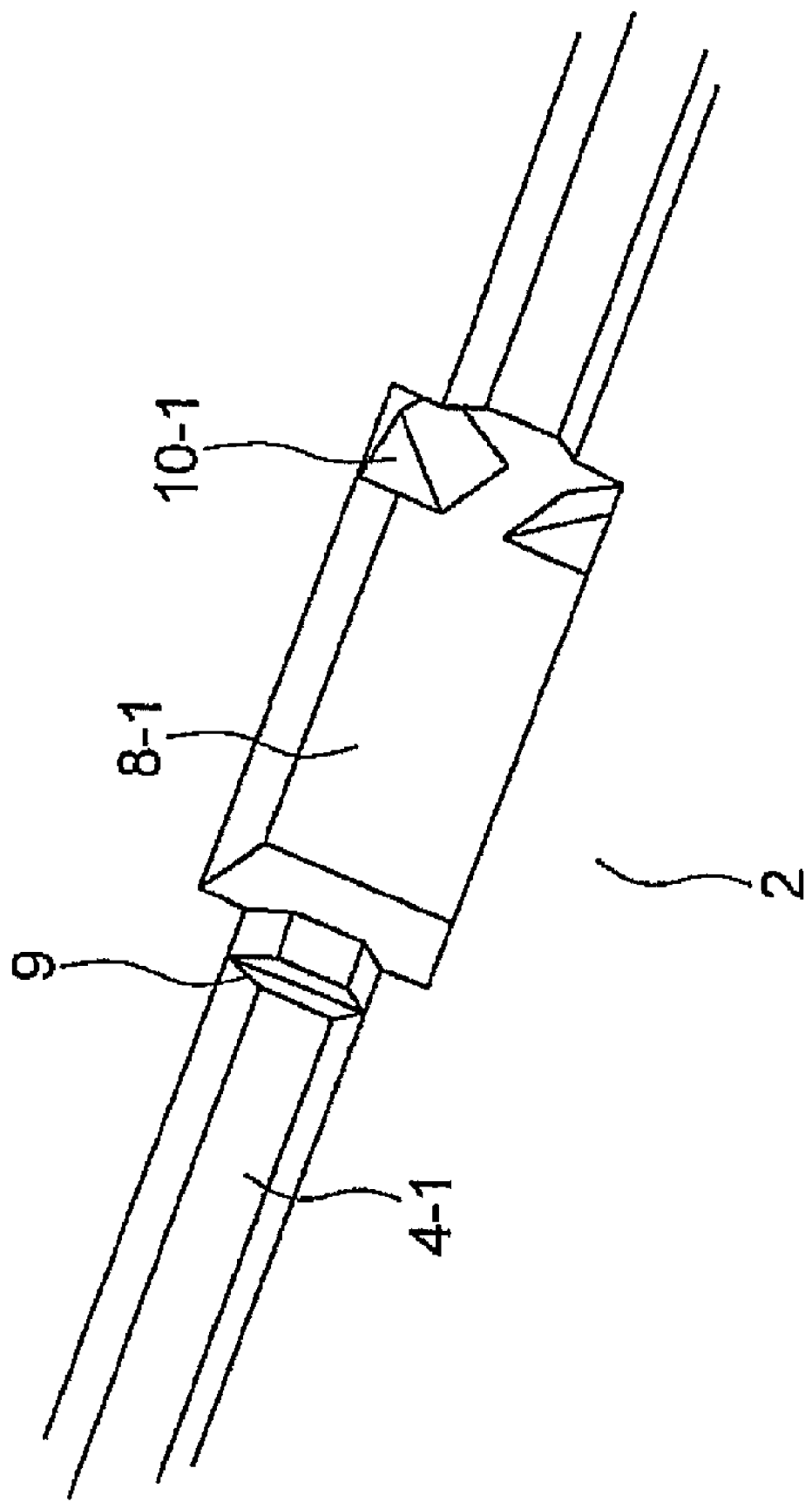

FIG. 18 is an enlarged view to explain the optical fiber cutting blade and the coat removing blade formed in the groove portion. FIG. 18(a) shows the pair of the coat removing blades with the prescribed gap formed face to face in the upper member. FIG. 18(b) shows the optical fiber cutting blade formed in the lower member and the pair of the coat removing blades with the prescribed gap formed face to face in the lower member. As depicted in FIG. 18(a), the hollow portion 8-2 is formed in contact with the groove portion 4-2 receiving the optical fiber on the face of the upper member which faces the lower member. The pair of the coat removing blades 10-2 with the prescribed gap arranged face to face are formed in the hollow portion. As described above, the prescribed gap is identical to the diameter of the glass portion of the optical fiber. The hollow portion 8-2 formed in the upper member is extended to the opposite side of the pair of the coat removing blades 10-2. Each tip end of the pair of the coat removing blades has a tapered portion to facilitate the cutting into the coating.

As depicted in FIG. 18(b), the groove portion 4-1 to receive the coated optical fiber is formed on the face of the lower member which faces the upper member, and the optical fiber cutting blade 9 is formed within the groove portion. The optical fiber cutting blade is integrally formed so as to hit the blade on the optical fiber in the perpendicular direction thereof. The hollow portion 8-1 is formed in contact with the groove portion 4-1. The hollow portion 8-1 is formed approximately between the optical fiber cutting blade and the coat removing blade. The pair of the coat removing blades 10-1 with the prescribed gap are formed face to face in the hollow portion 8-1 at the position corresponding to the pair of the coat removing blades 10-2. As describe above, the prescribed gap is identical to the diameter of the glass portion of the optical fiber. Each tip end of the pair of the coat removing blades 10-1 has a tapered portion to facilitate the cutting into the coating. The face depicted in FIG. 18(*a*) is combined face to face with the face depicted in FIG. 18(*b*).

As described with reference to FIGS. 16 and 17, the optical fiber cutting blade 9 is pressed from lower side on the coated optical fiber 6. At first, the coating 6b is cut off, and then the blade 9 is pressed on the optical fiber 6a until the blade 9 itself is deformed, thus scratching the optical fiber 6. The pair of the coat removing blades 10-2 formed in the upper member and the pair of the coat removing blades 10-1 formed in the lower member cut into the coat 6b from the upper and lower sides until the tip ends of the respective blades hit each other. The cladding of the optical fiber is never damaged by the coat removing blade.

The above described hollow portion has a function in which after the surface of the cladding of the optical fiber is scratched by the optical fiber cutting blade and the coat of the coated optical fiber is cut by the coat removing blade, the position of bending the optical fiber is shifted so that the optical fiber is prevented from being broken in the connecting portion between the left side member and the right side member. The gap between the pair of the coat removing blades is within a range of from 0.128 mm to 0.140 mm, when the upper member 3 and the lower member 2 are combined face to face. With the gap under 0.128 mm, the cladding of the optical fiber may be damaged. With the gap over 0.140 mm, the coat may likely not removed. The thickness of the connecting portion is within a range of from 0.4 mm to 2.0 mm. With the thickness under 0.4 mm, the connecting portion is possibly broken in the process of operation at any unexpected stage. With the thickness over 2.0 mm, the connecting portion is hardly broken to affect the operation.

As described with reference to FIG. 18, the groove portion 4-1 formed in the lower member is placed face to face with the groove portion 4-2 formed in the upper member. The optical fiber cutting blade 9 is integrally formed with the lower member within the groove portion 4-1, and the coat removing blade 10-1 is integrally formed with the lower member at the approximate end of the hollow portion 8-1. Furthermore, the coat removing blade 10-2 is integrally formed with the upper member in the hollow portion 8-2 formed in contact with the groove portion 4-2. The optical fiber cutting blade 9 is pressed to the coated optical fiber to break through the coating, and the tip end of the blade made of resin material itself is deformed and pressed on the surface of the cladding of the optical fiber, since the resin material is softer than the optical fiber made of silica glass, for example. When the blade 9 is pressed, the surface of the cladding of the optical fiber is scratched. Thus, the surface of the cladding in the optical fiber can be scratched by only pressing the blade made of the resin material, without pulling or pushing in horizontal direction nor rotating the blade.

The coat removing blade is also made of resin material. Since the coating is softer than the optical fiber of silica glass for example, the pair of the blades 10 are pressed on the coated optical fiber from the upper and lower sides to cut into the coating positioned on both sides of the optical fiber without damaging the cladding of the optical fiber.

The angle α at the tip end of the optical fiber cutting blade 9 and the coat removing blade 10 is within a range of from 10 to 45 degrees. With the angle α of the tip end of the blade under 10 degrees, it is difficult to obtain necessary strength for the optical fiber cutting blade, in addition to that the blade is easily broken or it is hard to form. On the other hand, with the angle α of the tip end of the blade over 45 degrees, even though the blade is pushed onto the optical fiber, the optical fiber is hardly damaged and cut off. Furthermore, the degree of cutting into the coating is not satisfactory. The optical fiber 6 is bent in a reverse direction to the portion of getting scratched to result in the cleavage and removing the coating.

In one embodiment of the component of the invention for peeling the coating and breaking the optical fiber, a prescribe hollow portion is formed in each of the first member and the second member between the optical fiber cutting blade and the coat removing blade, when the first member and the second member are arranged face to face. The above described hollow portion is formed across the first member and the second member. The hollow portion may be formed in only the second member.

Figure 19:
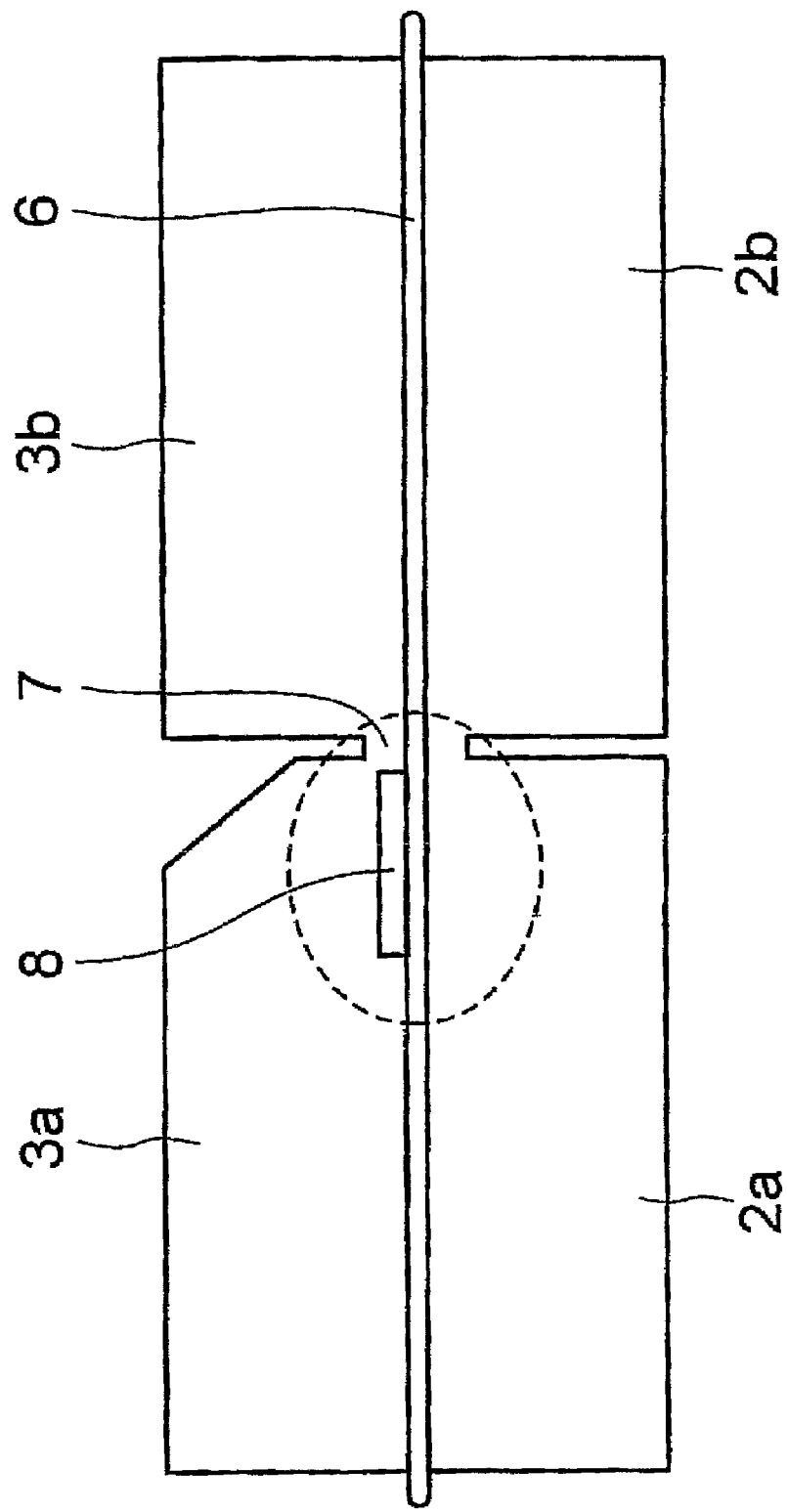
FIG. 19 is a cross sectional view to explain one embodiment of the hollow portion.
Figure 20:
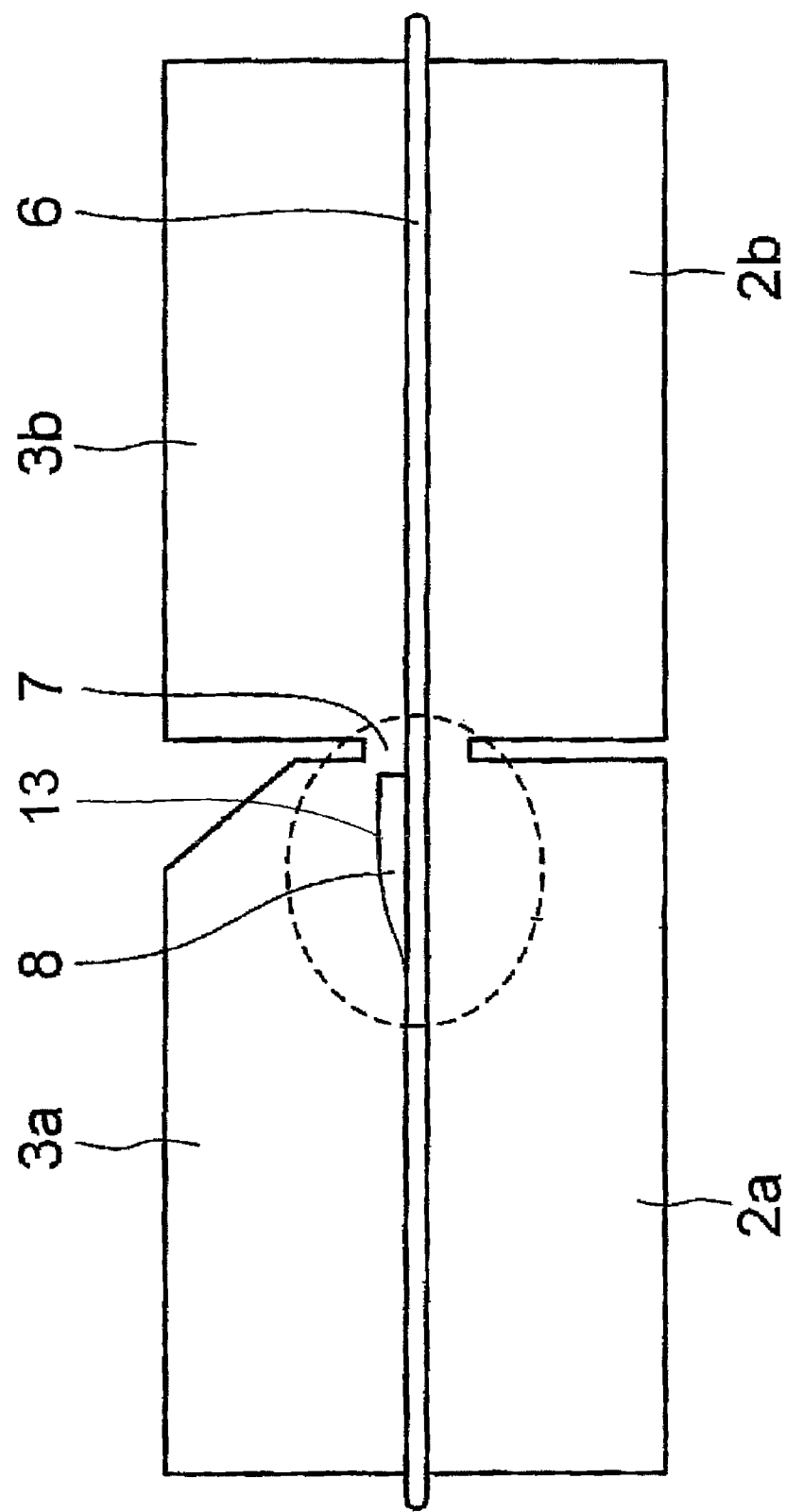
FIG. 20 is a cross sectional view to explain another embodiment of the hollow portion.

FIG. 19 is a cross sectional view to explain the hollow portion. In the embodiment as depicted in FIG. 19, the hollow portion 8 formed between the optical fiber cutting blade and the coat removing blade is formed only in the second member 3. Furthermore, as depicted in FIG. 20, the hollow portion 8 formed in the second member 3 may has a tapered portion 13 formed rising upwardly from the optical fiber cutting blade toward the coat removing blade. In the embodiment as depicted in FIG. 20, the hollow portion 8 is formed only in the second member, and has the above described tapered portion.

Figure 21:
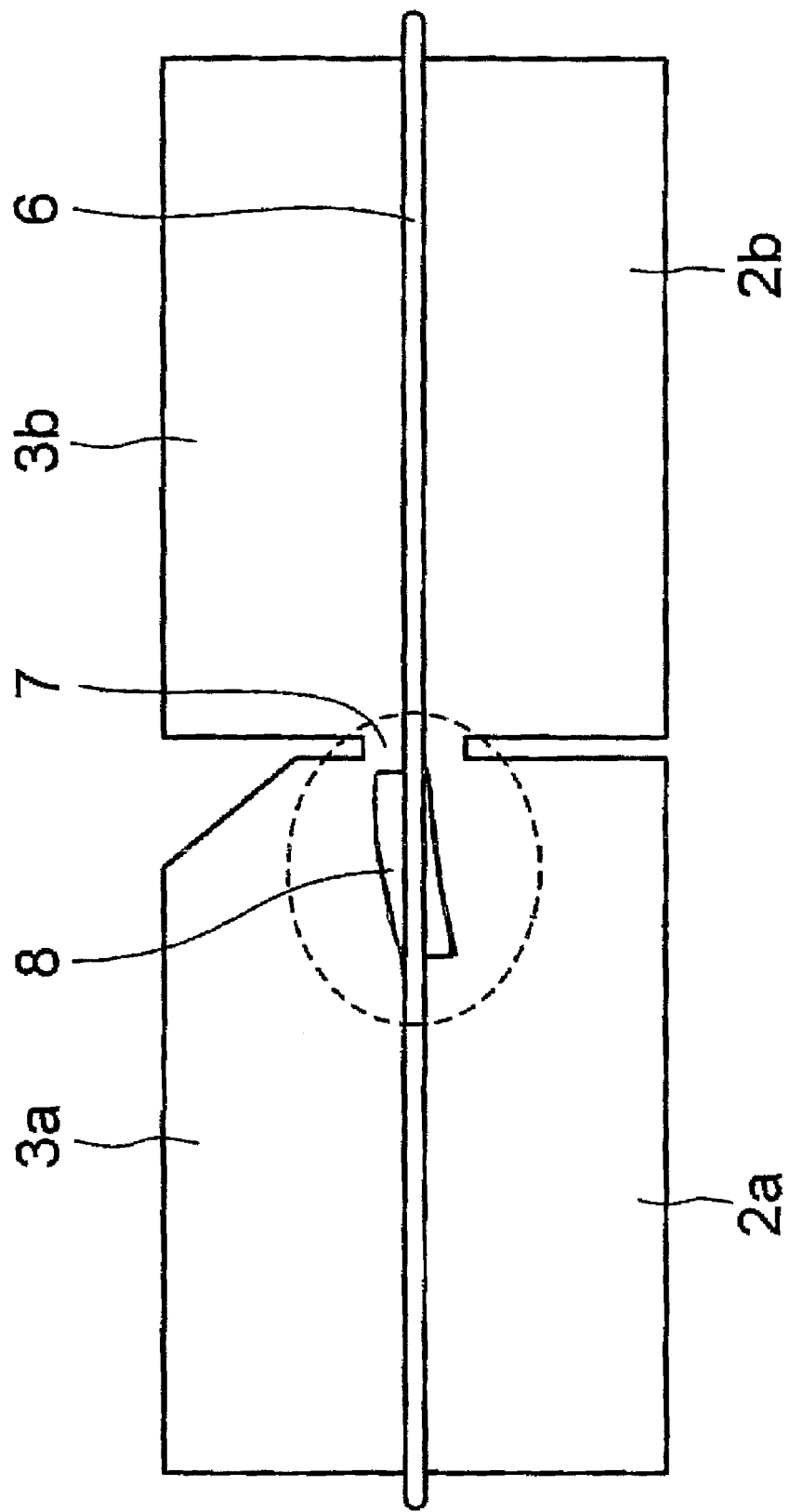
FIG. 21 is a cross sectional view to explain other embodiment of the hollow portion.

FIG. 21 is a cross sectional view to explain other embodiment of the hollow portion. As depicted in FIG. 21, the hollow portion is formed across the first member and the second member. The hollow portion formed in the second member has a tapered portion formed rising upwardly from the optical fiber cutting blade toward the coat removing blade. The hollow portion formed in the first member as well as the second member has a tapered portion formed rising upwardly from the optical fiber cutting blade toward the coat removing blade.

As described above, the coating is more easily removed after cutting off the optical fiber with the tapered portion formed in the hollow portion.

The method of peeling the coating and breaking the optical fiber is carried out in the same manner as described with reference to FIG. 14.

An optical connector of the invention is described with reference to the drawings. The optical connector of the invention comprises an optical fiber component with the optical fiber cut off and the coating removed, which is formed by bending a component for peeling the coating and breaking the optical fiber at a breaking portion to cut off the optical fiber and removing the coating, which component includes: a first member made of resin material including a groove portion enabling to receive a coated optical fiber, an optical fiber cutting blade and a coat removing blade made of resin material integrally formed within the groove, a breaking portion comprising a connecting portion with thin thickness in an intermediate portion and a hollow portion; and a second member made of resin material, which is placed face to face to the first member, including a groove portion corresponding to the groove in the first member enabling to receive a coated optical fiber, a coat removing blade corresponding to the coat removing blade in the first member, a breaking portion in an intermediate portion corresponding to the breaking portion in the first member and a hollow portion corresponding to the hollow portion in the first member; and a ferrule received in the thus formed hollow portion in the optical fiber component, ferrule receiving a portion with the coating removed and a coated portion therein.

As described above, the optical fiber component of the invention is formed by bending the component for peeling the coating and breaking the optical fiber at a breaking portion to cut off the optical fiber and removing the coating, thus separated as with the optical fiber cut off and the coating removed.

First of all, the component for peeling the coating and breaking the optical fiber as a base to form the optical fiber component is as described with reference to FIG. 1-1.

Figure 22:
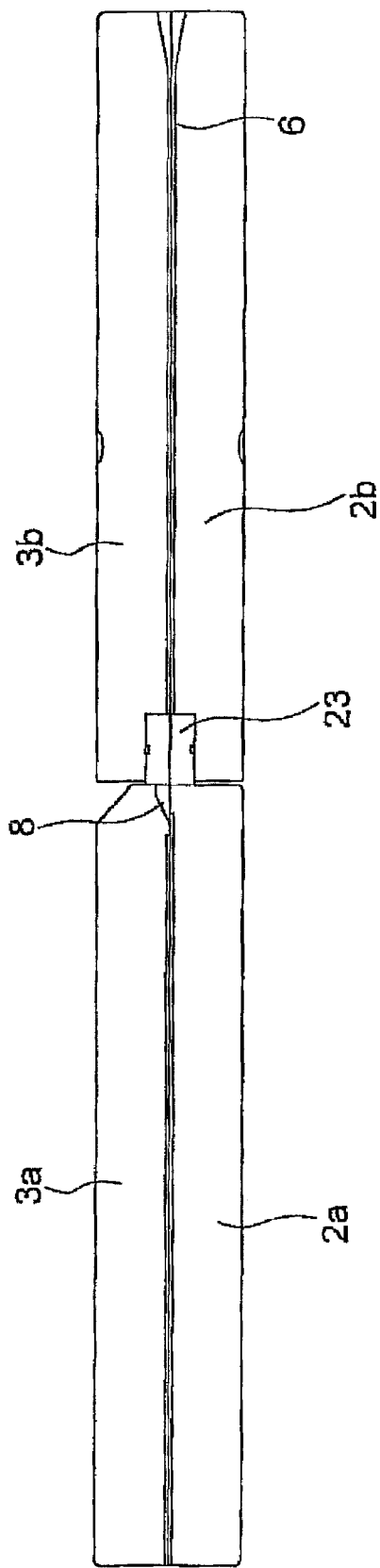
FIG. 22 is a cross sectional view along the longitudinal direction of the component for peeling the coating and breaking the optical fiber.

As depicted in FIG. 22, the groove portion to receive the coated optical fiber is formed at the middle portion of the upper surface of the lower member along the longitudinal direction. The optical fiber cutting blade made of resin material to scratch the surface of the cladding of the optical fiber (not shown) and the coat removing blade are integrally formed within the groove portion at the middle portion in the lower member. As depicted in FIG. 22, the upper member made of resin material has a breaking portion with a tapered portion on the surface of the middle portion in the upper member. The groove portion corresponding to the groove portion as depicted in FIG. 22 on the lower member is formed on the upper member which faces the lower member. The coat removing blade made of resin material to remove the coating of the coated optical fiber is integrally formed with the upper member within the groove portion.

Both of the optical fiber cutting blade and the coat removing blade with the blades made of resin material are pressed on to the coated optical fiber in the direction perpendicular to the axis of the coated optical fiber 4. A protruded portion 3c is formed on the respective ends of the upper member 3, and an engaging column 2c which is engaged with the protruded portion of the upper member 3 is formed on each of the four corners of the lower member 2, each of which is extended toward the upper member 3. When each of the protruded portion is engaged with the pair of the corresponding engaging columns so that the upper member 3 is arranged face to face with the lower member 2, the upper member 3 and the lower member 2 can be freely moved within the height of the engaging column in such manner that both members come relatively close or come off.

All of the lower member, upper member, optical fiber cutting blade and coat removing blade are made of resin material which comprises epoxy or pps (polyphenylene sulfide) based synthetic-resin. For example, a widely used synthetic-resin for a ferrule can be used. Furthermore, the above described synthetic-resin for a ferrule with the glass filler mixed therein can be used. When the optical fiber cutting blade is pressed on the optical fiber with the coating removed and deformed, the glass filler mixed into the resin material is pressed on the surface of the cladding of the optical fiber so that the prescribed portion of the optical fiber is scratched. When the glass filler is contained at least 60% in the resin material, satisfactory scratch is formed without fail on the surface of the cladding of the optical fiber, so that the condition of the cut face (i.e., cleavage plane) of the optical fiber is excellent and the optical connection is made with the connection loss further reduced.

The relation between the grove portion, optical fiber cutting blade and the coat removing blade formed in the lower member and the upper member is as described with reference to FIG. 1-6.

The method of forming the optical fiber component by bending the component for peeling the coating and breaking the optical fiber at a breaking portion and separated is substantially the same as described with reference to FIG. 12.

The optical fiber component thus removing the coating and cutting off by the optical fiber cutting blade is used to assemble the optical connector.

Figure 23:
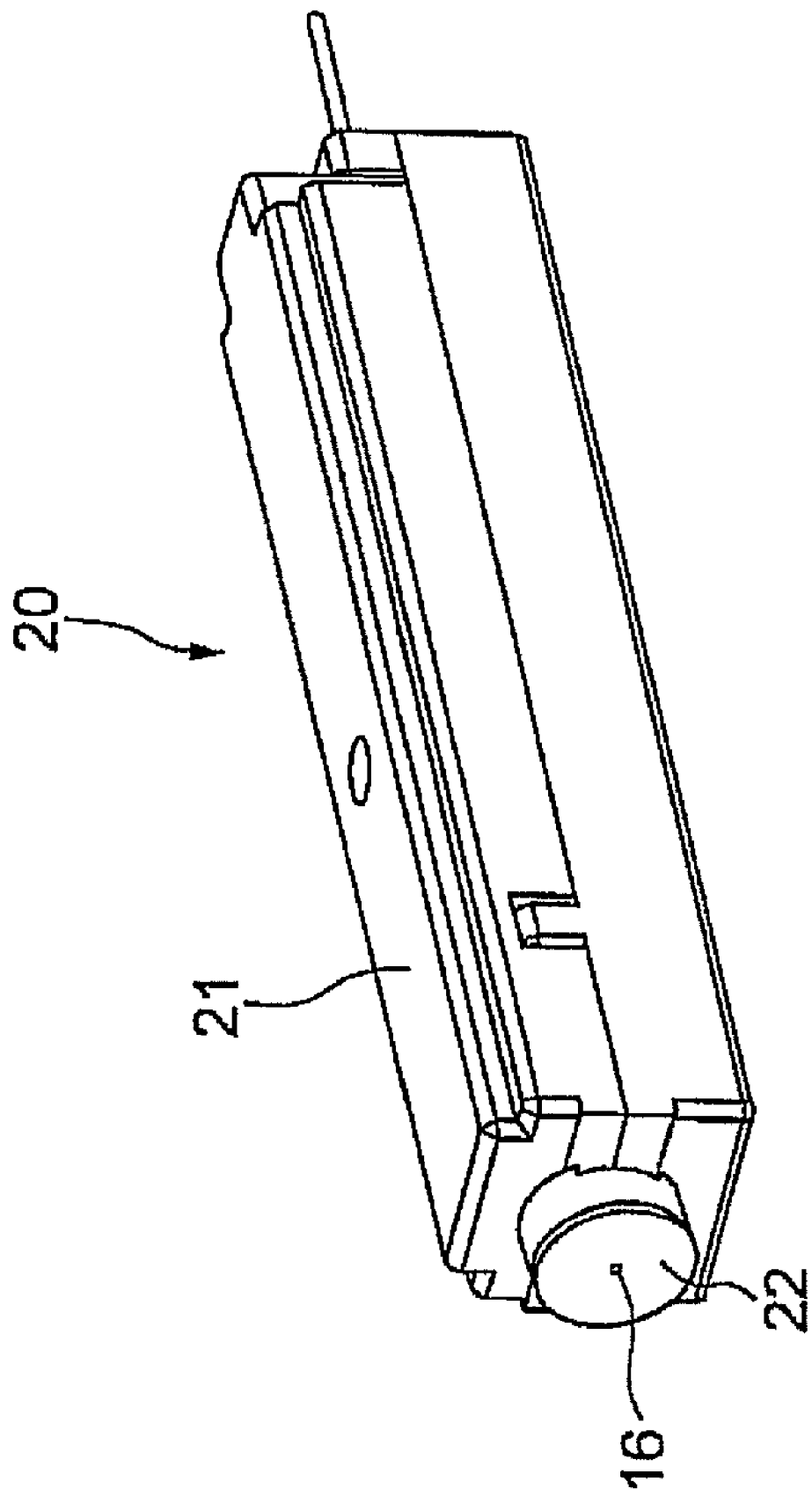
FIG. 23 is a schematic perspective view to show an optical fiber connector of the invention.

FIG. 23 is a schematic perspective view to show an optical fiber connector of the invention. As depicted in FIG. 23, the optical fiber connector 20 comprises the optical fiber component 21, which is formed by bending the component for peeling the coating and breaking the optical fiber at a breaking portion to cut off with the optical fiber cutting blade and to remove the coating with the coat removing blade, and separated, and the ferrule 22, which receives the portion 16 with the coating removed and the coated portion and is received in the hollow portion in the optical fiber component 21.

Figure 24:
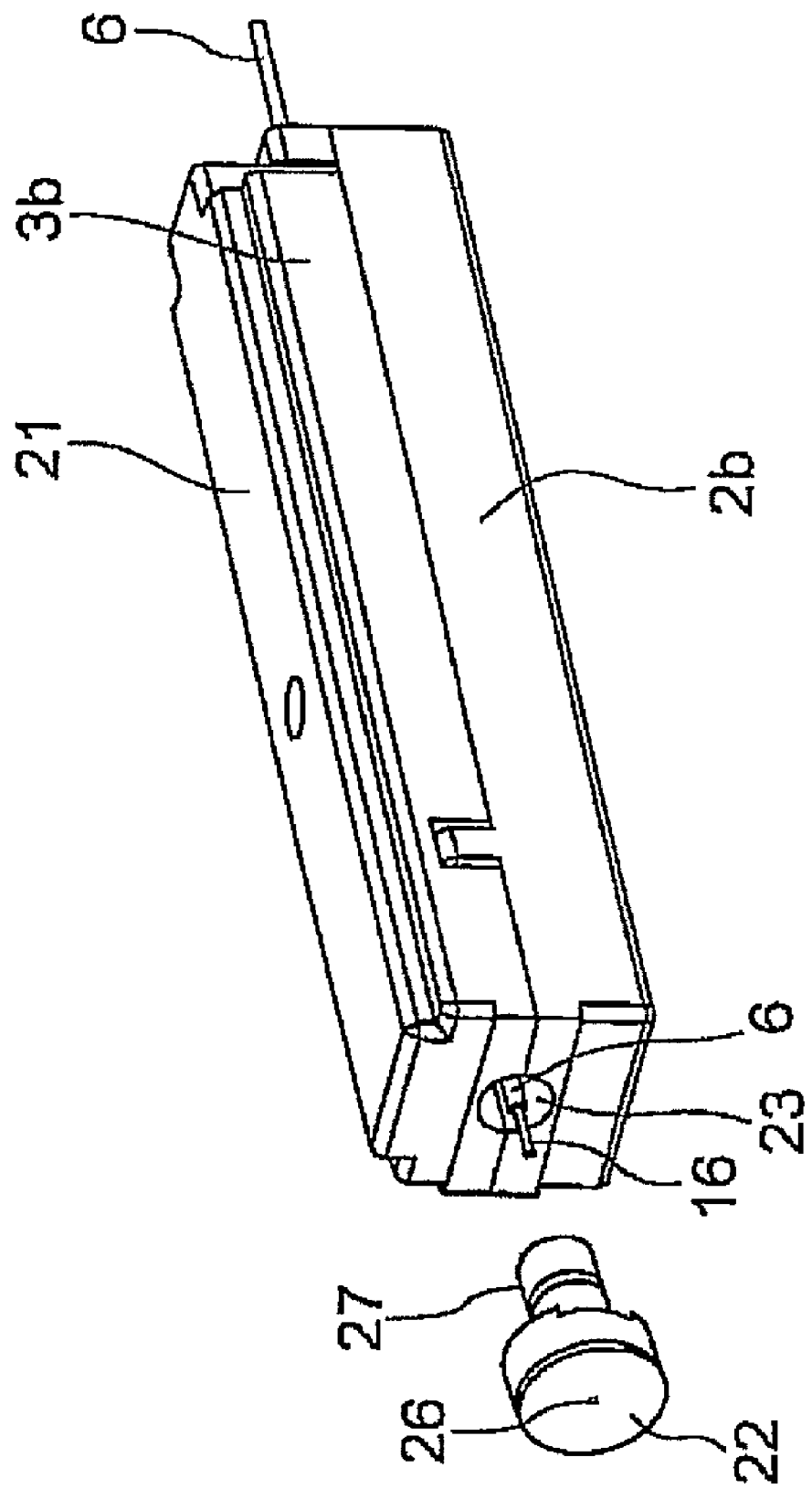
FIG. 24 is a schematic perspective view to show the state in which the optical fiber component 21 is separated from the ferrule 22.

FIG. 24 is a schematic perspective view to show the state in which the optical fiber component 21 is separated from the ferrule 22. The hollow portion 23 in which the ferrule is received is formed at the end portion of the optical fiber component as depicted in FIG. 24. The glass portion (i.e., naked optical fiber portion) 16 with the coating removed for a prescribed length and the coated portion 6 are arranged in within the hollow portion as a part thereof protrudes outward. The ferrule 22 comprises a head portion and a leg portion, and the leg portion has a ring-shaped groove portion 27. Through hole 26 is formed inside of the ferrule 22 in which the naked optical fiber 16 with the coating removed and coated optical fiber 6 are received.

As depicted in FIG. 24, the optical fiber component 21 comprises a right side member including the right side lower member 2b and the right side upper member 3b in which the component for peeling the coating and breaking the optical fiber is as bent at a breaking portion and separated.

Figure 25A:
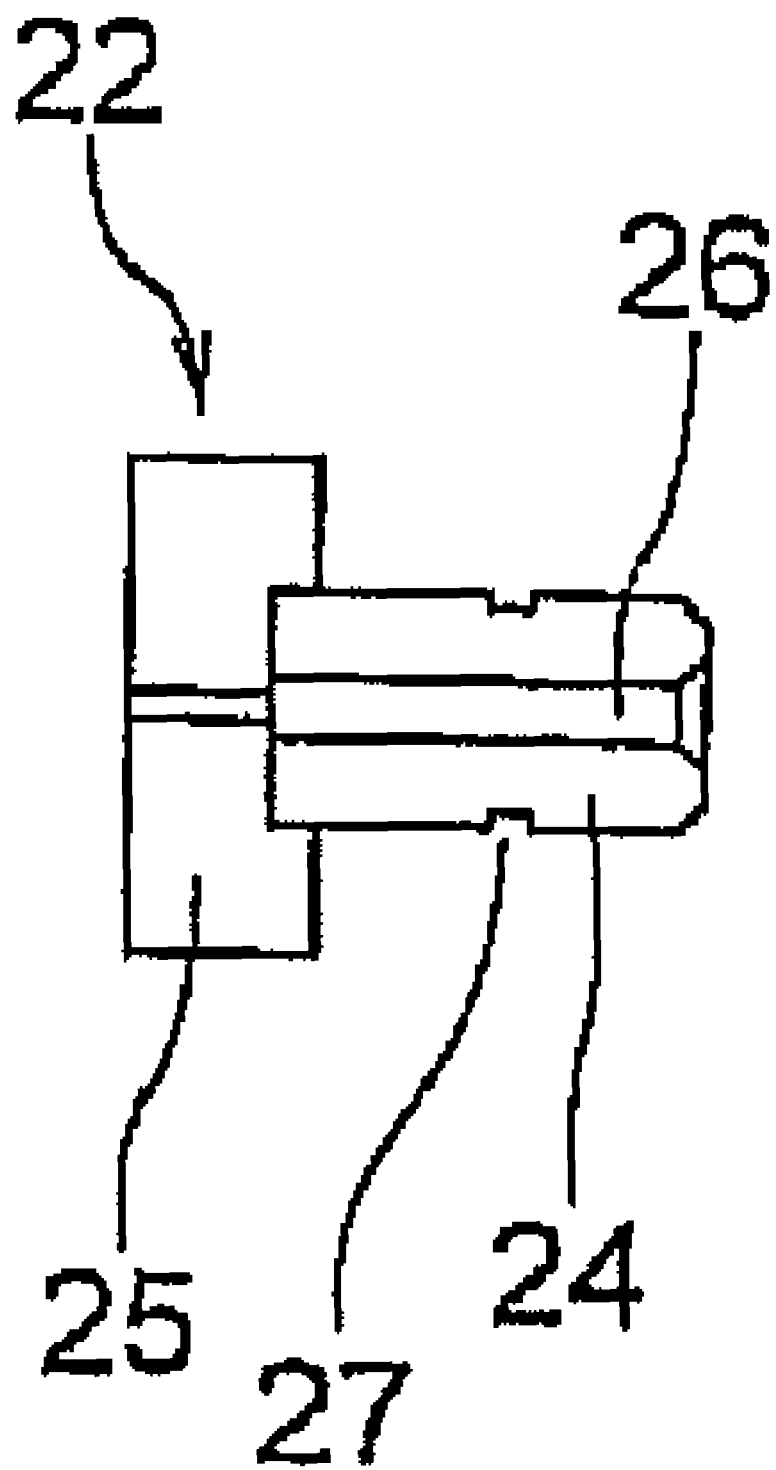
FIGS. 25(a) and 25(b) are cross sectional views along the longitudinal direction of the optical fiber component and the ferrule as depicted in FIG. 24.
Figure 25B:
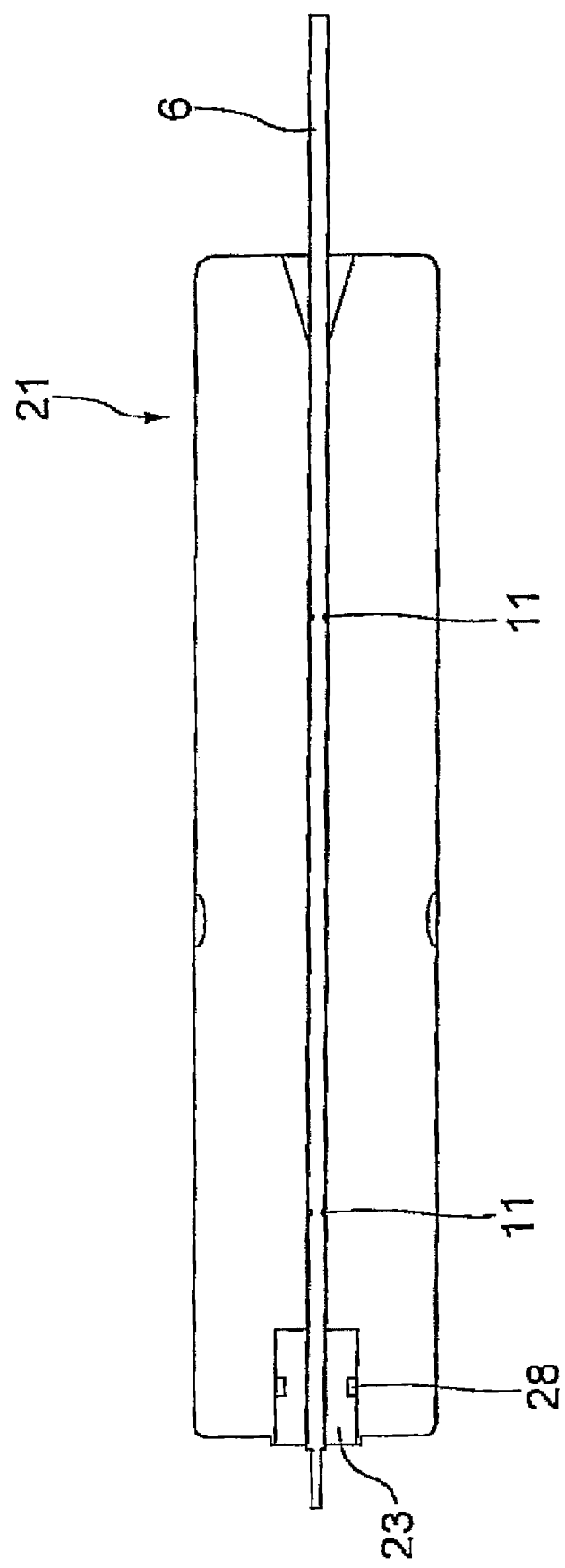

FIG. 25 is a cross sectional view along the longitudinal direction of the optical fiber component and the ferrule as depicted in FIG. 24. FIG. 25(a) shows the ferrule, and FIG. 25(b) shows the optical fiber component. As depicted in FIG. 25(a), the ferrule comprises the head portion 25 and the leg portion 24. Through hole 26 is formed inside of the ferrule 22 in which the naked optical fiber 16 with the coating removed and coated optical fiber 6 are received. As depicted in FIG. 25(a), the through hole 26 has two portions with different diameter respectively corresponding to the naked optical fiber 16 and the coated optical fiber 6. The leg portion 24 has a ring-shaped groove portion 27.

As depicted in FIG. 25(b), the coated optical fiber 6 is pressed from the lower and upper side by the convex portions formed in the groove portions in the upper member and the lower member and fixed in the groove portion in the optical fiber component 21 as bent and separated in the component for peeling the coating and breaking the optical fiber. The hollow portion 23 in which the ferrule is received is formed at the corresponding end portion to the ferrule of the optical fiber component 21. The hollow portion is formed by the wall of approximately cylindrical shape. An annular protruding portion 28 corresponding to the above described ring-shaped groove portion of the leg portion is formed on a part of the cylindrical shaped wall face.

Incidentally, as depicted in FIG. 25(b), the part of the breaking portion bent and separated remains in the end portion in the optical fiber component 21 corresponding to the ferrule. The naked optical fiber 16 and the coated optical fiber 6 which are to be received in the through hole are positioned in the center of the hollow portion without contacting with the wall face. When the ferrule 22 is received in the hollow portion of the optical component 21, the optical fiber 16 with the coating removed and the coated optical fiber 6 are received in the through hole of the ferrule. The naked optical fiber 16 protrudes only for a prescribed length from the end face of the head portion 25.

Figure 26:
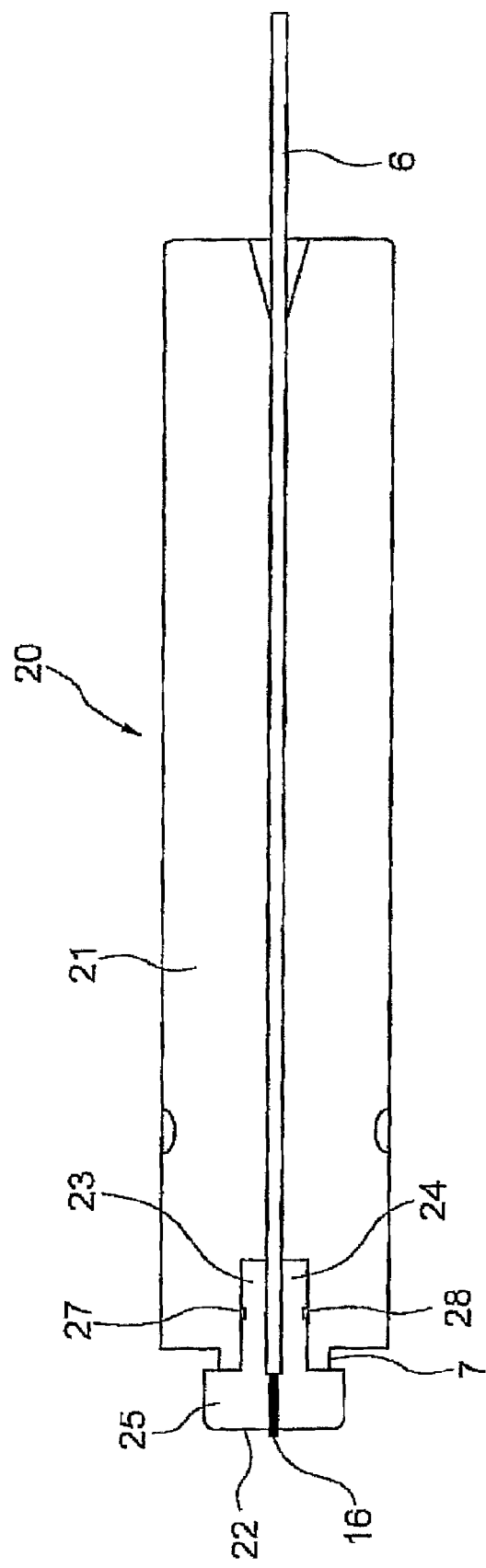
FIG. 26 is a cross sectional view along the longitudinal direction to show the optical fiber connector in the state in which the ferrule is received in the hollow portion of the optical fiber component 21.

FIG. 26 is a cross sectional view along the longitudinal direction to show the optical fiber connector in the state in which the ferrule is received in the hollow portion of the optical fiber component 21. As depicted in FIG. 26, the leg portion 24 of the ferrule is inserted in the hollow portion 23 in the optical fiber component 21. The annular protruding portion 28 formed on the wall face of the hollow portion is fit into the ring shaped groove portion formed on the leg portion so that the ferrule 22 is fixed to the optical fiber component 21. A part of the breaking portion of the component for peeling the coating and breaking the optical fiber which forms the end portion of the hollow portion 23 contacts with the head portion 25 of the ferrule 22. As described above, the optical fiber 16 with the coating removed and the coated optical fiber 6 are received in the through hole of the ferrule. The naked optical fiber 16 protrudes only for a prescribed length from the end face of the head portion 25.

Figure 27A:
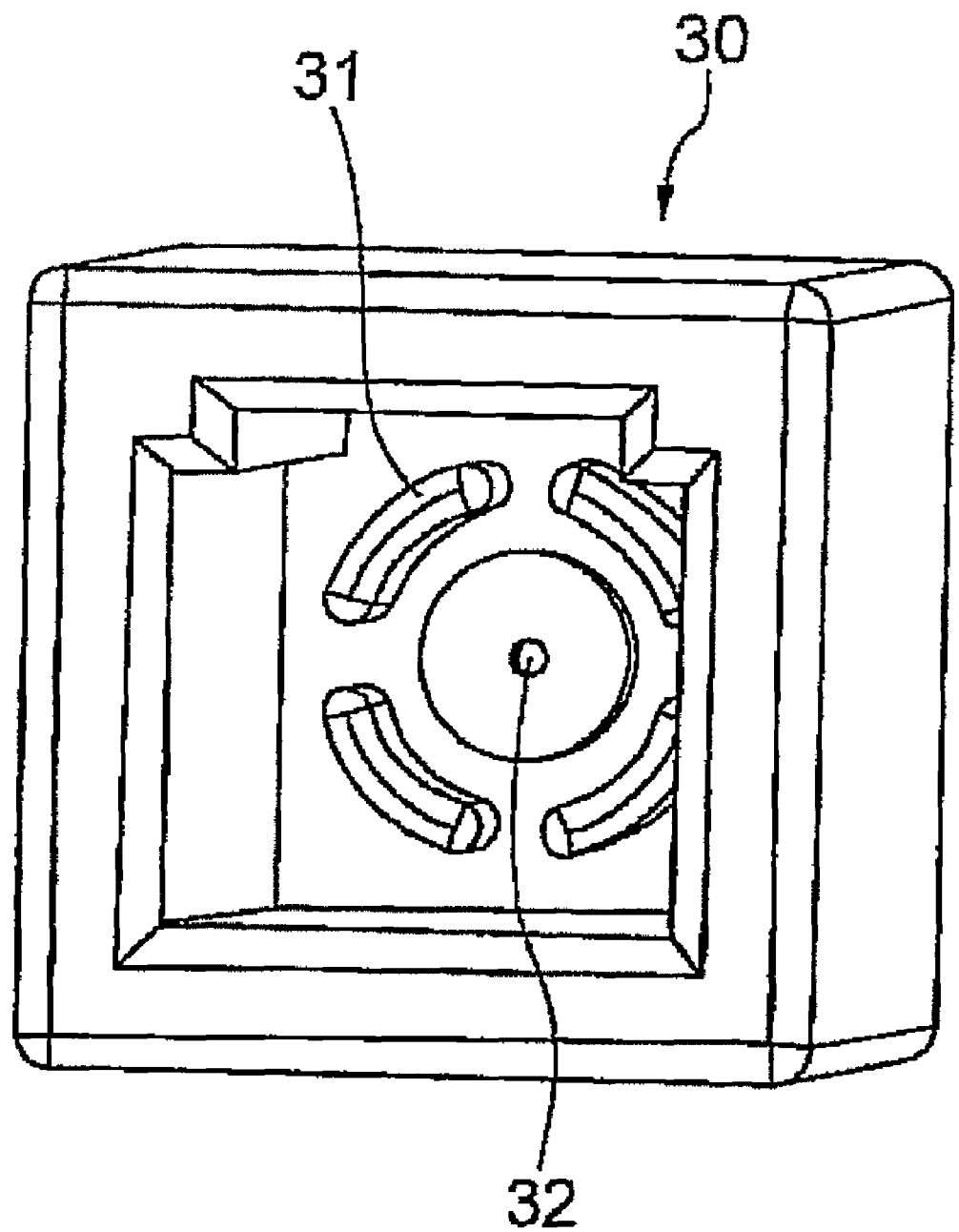
FIGS. 27(a) and 27(b) are views to show a holding jig for the ferrule.
Figure 27B:
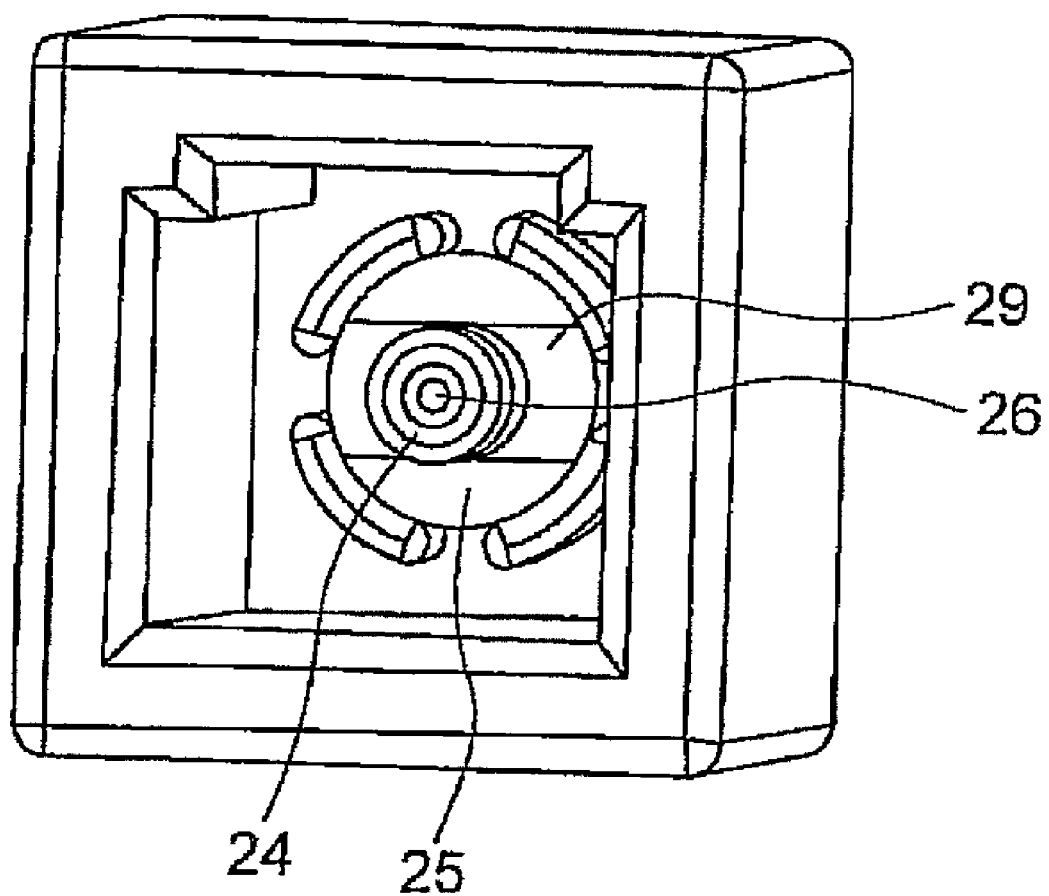

FIG. 27 is a view to show a holding jig for the ferrule. FIG. 27(a) shows the state in which the ferrule is removed. FIG. 27(b) show the state in which the ferrule is fixed thereon. As depicted in FIG. 27(a), the holding jig 30 for the ferrule includes a provisional catching portion 31 to provisionally catch the head portion of the ferrule. A hole portion 32 to receive the tip end portion of the optical fiber with the coating removed when the ferrule is fixed, is formed in the center of the plurality of the provisional catching portions 31. As depicted in FIG. 27(b), the head portion 25 having a recessed portion 29 to receive the part of the breaking portion is provisionally engaged by the provisional catching portions. The ferrule is received in the ferrule holding jig 30 in such manner that the leg portion 24 having the through hole 26 extends upward from the center of the head portion.

As depicted in FIG. 27(b), the ferrule as provisionally engaged in the ferrule holding jig is inserted in the hollow portion of the optical fiber component. When the annular protruding portion formed on the wall face of the hollow portion is fit into the ring shaped groove portion formed in the leg portion of the ferrule, the ferrule holding jig is pulled off so that the connecter as depicted in FIGS. 23 and 26 comes out.

Then, an optical fiber adaptor of the invention is described.

One embodiment of the optical fiber adaptor comprises a pair of optical fiber connectors facing each other comprising an optical fiber component made of resin material receiving a coated optical fiber in a groove portion provided therein and having a hollow portion, which is formed by bending a component for peeling a coating and breaking an optical fiber including a breaking portion to cut off and to remove the coating, and separated, and the ferrule, which receives a naked portion of the optical fiber with the coating removed and a coated portion and is received in the hollow portion in the optical fiber component, wherein the optical fiber adaptor includes a center portion to hold respective head portions of the ferrule having a head portion and a leg portion at a prescribed position, a pressure generating mechanism to press the pair of the optical fiber connectors toward a center portion and hold there, and respective ferrules are held face to face of the pair of the optical fiber connectors under a condition in which tip ends of the naked portion of the optical fiber protruded from the ferrule are contacted with a force.

The optical fiber adaptor of the invention connects the pair of the optical fiber connectors, as described above. The optical fiber connector comprises the optical fiber component and the ferrule. The optical fiber component is formed by bending the component for peeling the coating and breaking the optical fiber including a breaking portion to cut off and to remove the coating, and separated.

First of all, as described above, the optical fiber component of the invention is formed. Then, as described above, the pair of the optical fiber connectors are formed by the optical fiber component for peeling the coating and breaking the optical fiber.

Figure 28:
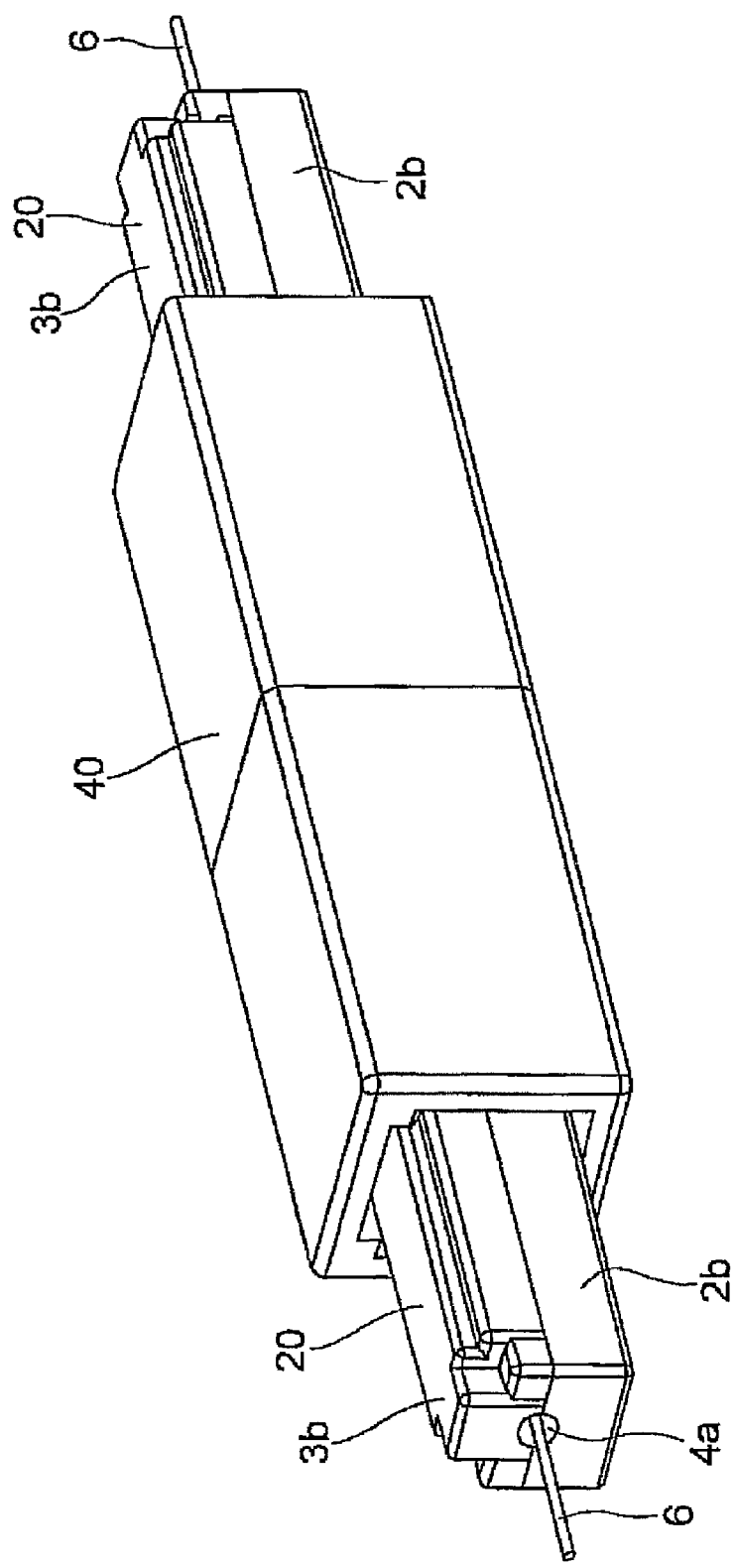
FIG. 28 is a schematic perspective view to show the state in which the pair of the optical fiber connectors are connected by the optical adaptor of the invention.

FIG. 28 is a schematic perspective view to show the state in which the pair of the optical fiber connectors are connected by the optical adaptor of the invention.

Figure 29:
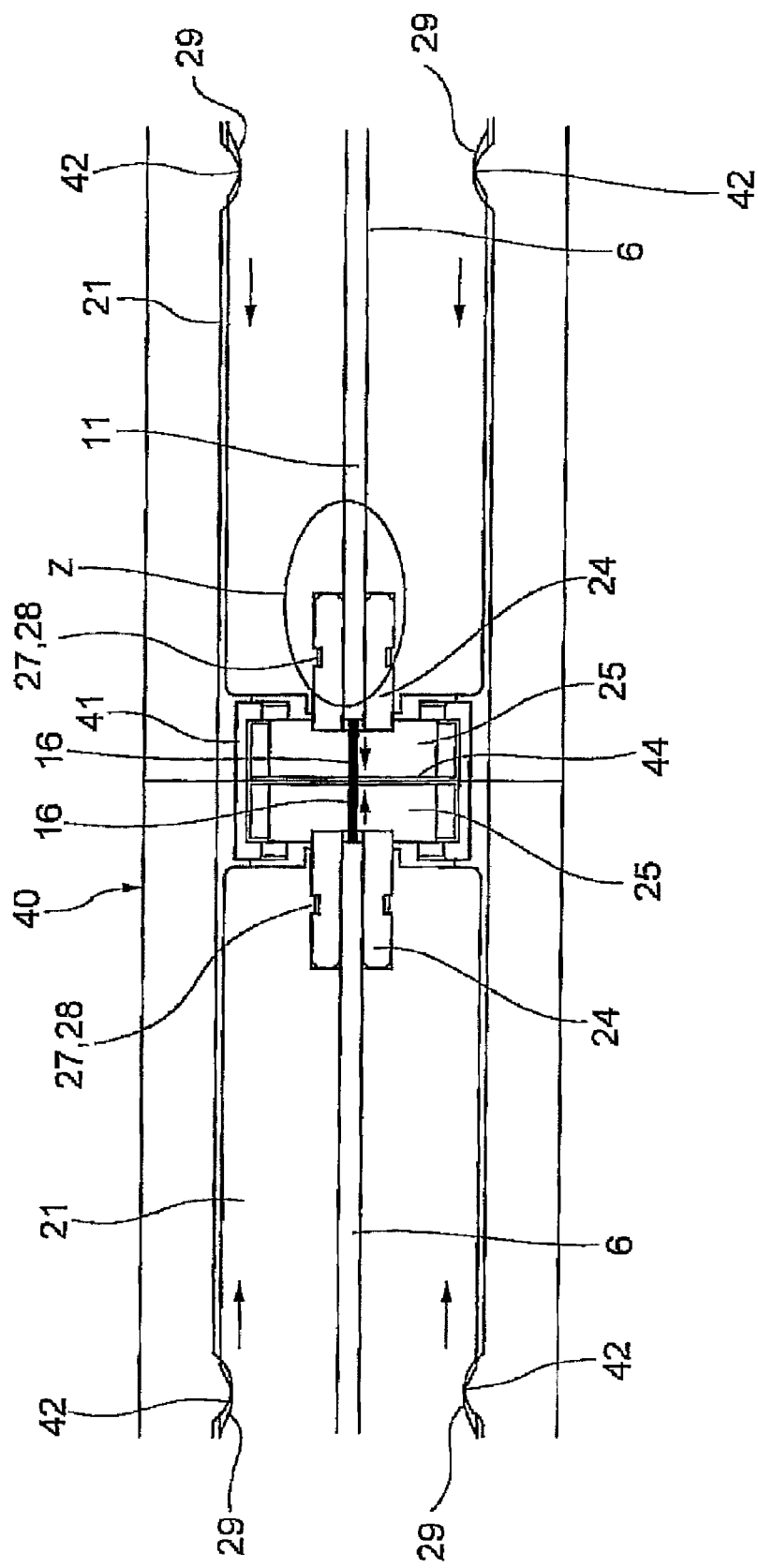
FIG. 29 is a cross sectional view along the longitudinal direction of the optical adaptor in which the pair of the optical fiber connectors are connected as depicted in FIG. 28.
Figure 30:
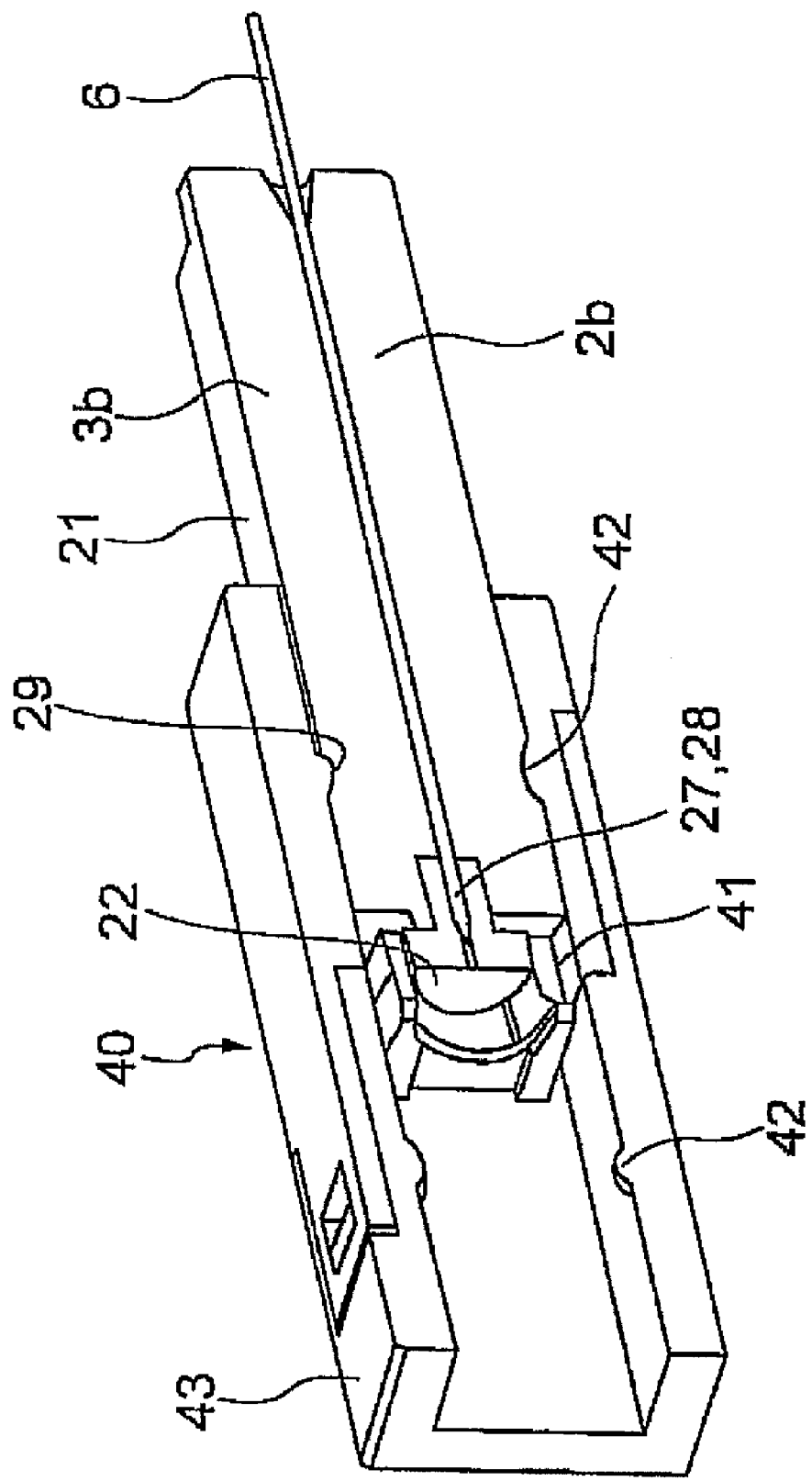
FIG. 30 is a partial cross sectional view to explain the optical fiber adaptor in which one optical fiber connector is inserted therein.
Figure 31:
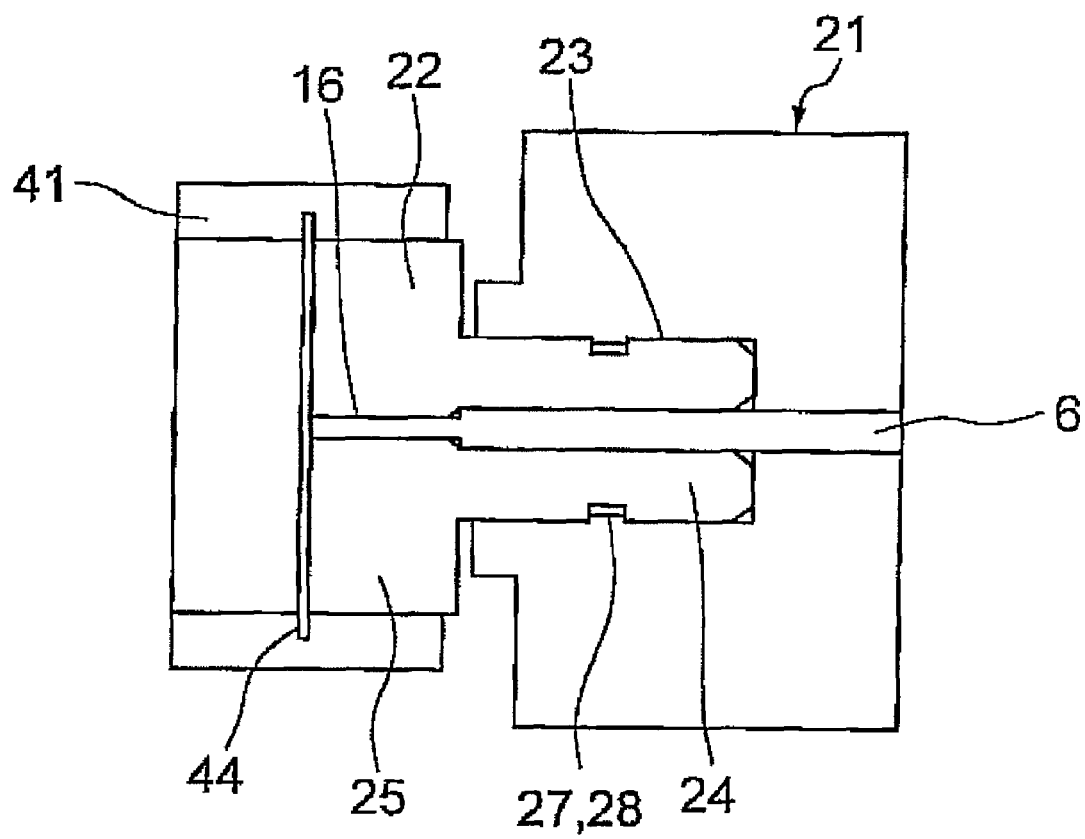
FIG. 31 is a partially enlarged view to explain the fitting condition between the center portion of the optical fiber adaptor and the ferrule in the optical fiber connector.

As depicted in FIG. 28, the pair of the optical connectors 20 are inserted in the both end portions of the optical fiber adaptor 40 to connect the above described optical fiber with the coating removed. FIG. 29 is a cross sectional view along the longitudinal direction of the optical adaptor in which the pair of the optical fiber connectors are connected as depicted in FIG. 28. FIG. 30 is a partial cross sectional view to explain the optical fiber adaptor in which one optical fiber connector is inserted therein. FIG. 31 is a partially enlarged view to explain the fitting condition between the center portion of the optical fiber adaptor and the ferrule in the optical fiber connector. The optical fiber adaptor is described with reference to FIGS. 28 to 31.

As depicted in FIG. 30, the optical fiber adaptor 40 of the invention includes a center portion 41 to hold face to face the respective head portions of the ferrules having a head portion and a leg portion at a prescribed position, and a pressure generating mechanism to press the pair of the optical fiber connectors toward the center portion and hold there.

More specifically, the optical fiber adaptor 40 comprises a rectangular cylindrical box 43 in which the optical fiber connectors are inserted from the respective ends. The center portion 41 is formed in the center of the box, and has a cylindrical shaped portion to hold the head portion of the ferrule by squeezing from the peripheral portion thereof. The center portion may apply a sleeve with a slit. Furthermore, the center portion has an aligning function to align the head portions of the ferrules in the pair of the optical fiber connectors so as to facilitate to connect the respective naked optical fibers.

The optical fiber adaptor 40 includes protruding portions on the inner wall of the box in symmetrical manner to the center portion. On the other hand, the optical fiber connector 21 has a recessed portion 29 at a position corresponding to the above described protruding portion on the peripheral portion thereof. The protruding portion 42 of the optical fiber adaptor in a specific relative position as described later and the recessed portion 29 of the optical fiber connecter form the above described pressure generating mechanism.

Incidentally, the pressure generating mechanism may be formed in such manner that the recessed portion is formed on the inner wall of the box in the optical fiber adaptor and the protruding portion is formed in the optical fiber connector.

As depicted in FIG. 31, the annular protruding portion 28 formed on the inner wall portion of the hollow portion 23 in the optical fiber connecter 21 is fit into the ring-shaped groove portion 27 formed on the peripheral portion of the head portion in the ferrule to fix the ferrule. The optical fiber with the coating removed and the coated optical fiber are received in the through hole of the ferrule. The naked optical fiber protrudes only for a prescribed length from the end face of the head portion. Under the above described condition, the optical fiber connecter 21 is inserted in the optical fiber adaptor 40 to fix the ferrule in such manner that the head portion 25 of the ferrule 22 is squeezed at the prescribed position in the center portion 41.

Figure 32:
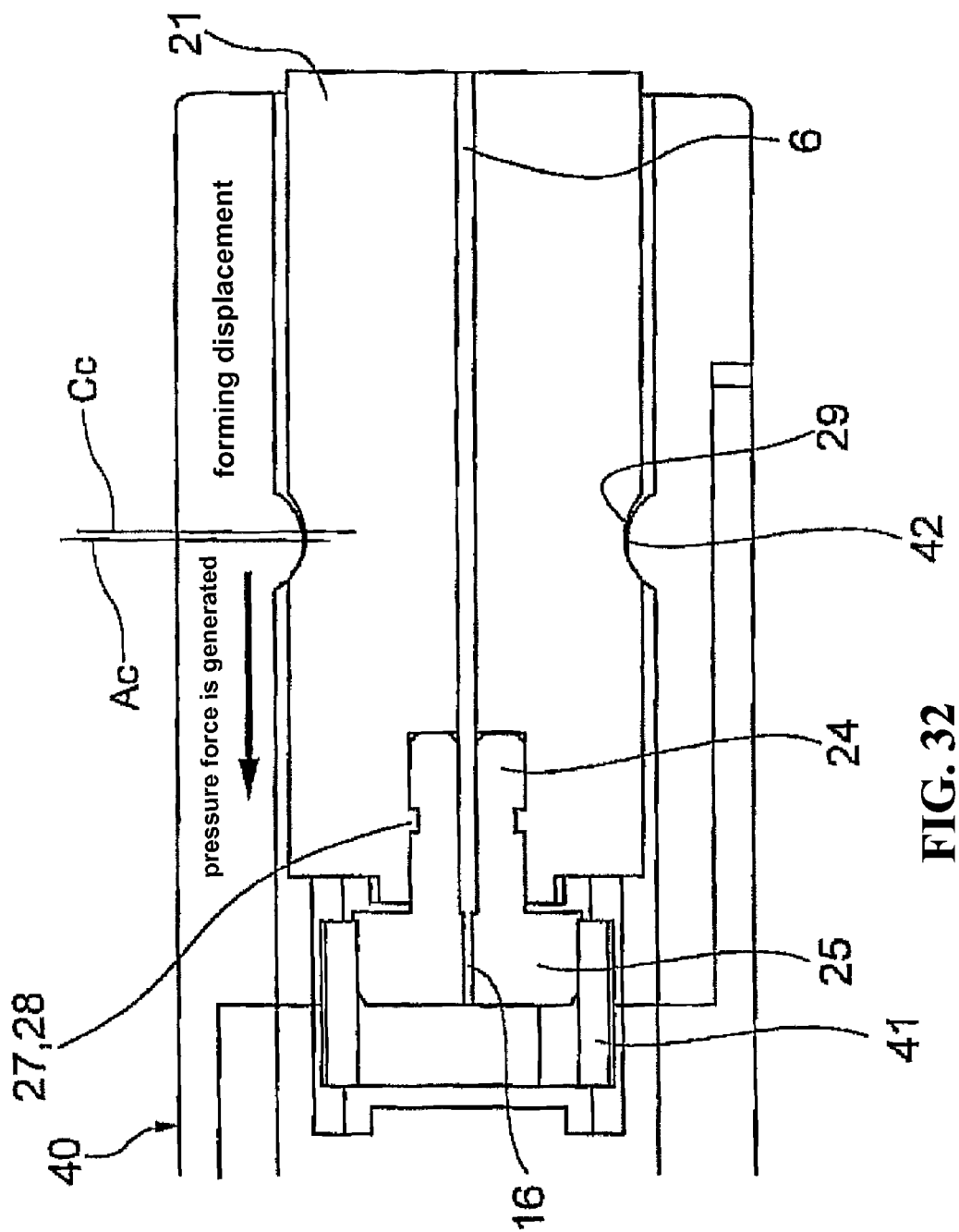
FIG. 32 is a view to explain the state in which the pressure force is generated by the pressure generating mechanism.
Figure 33:
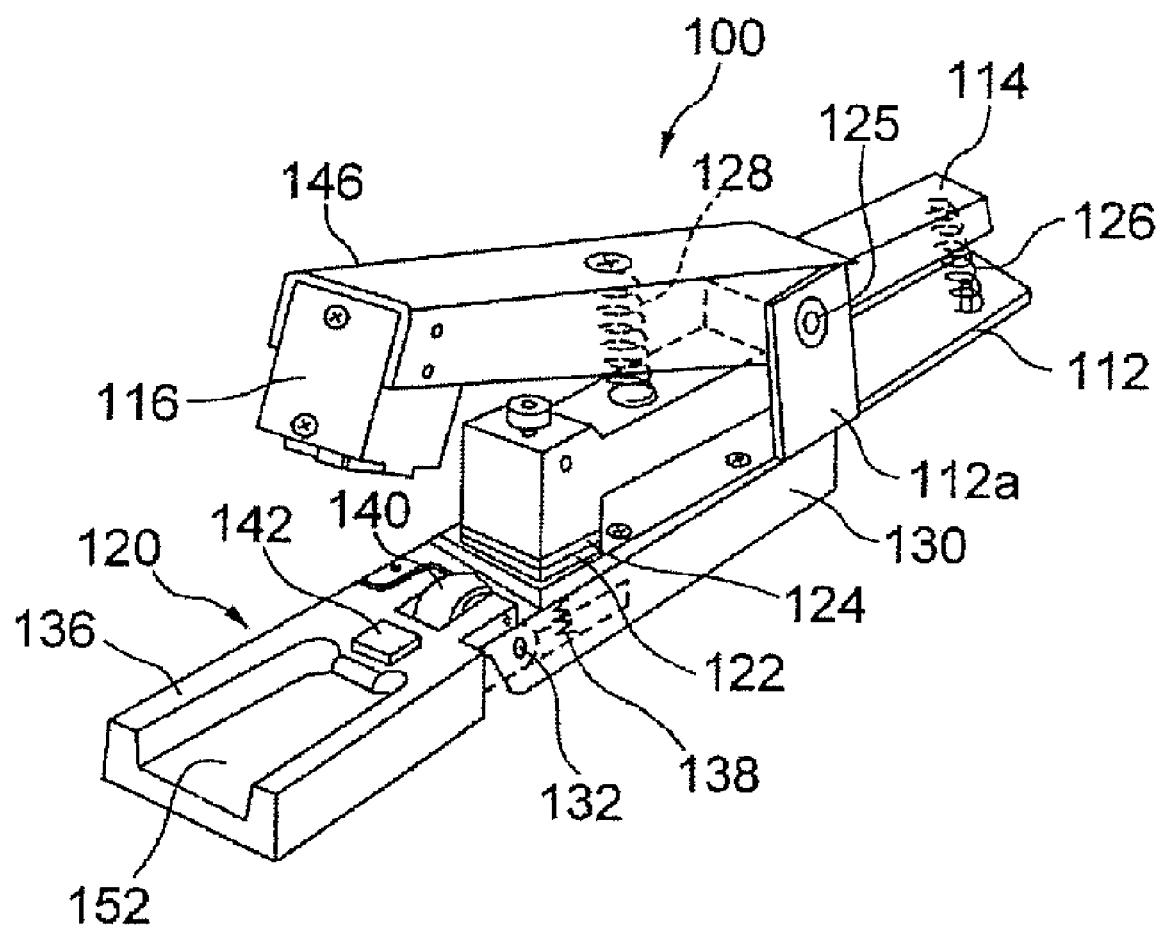
FIG. 33 is a schematic perspective view to show a conventional optical fiber cutting device.

The state in which the pressure force is generated by the pressure generating mechanism is described with reference to FIG. 32. As depicted in FIG. 32, the protruding portions 42 formed on the top and bottom of the inner wall in the optical fiber adaptor 40 are fit into the corresponding recessed portions formed on the top and bottom of the outer peripheral portion of the optical fiber connecter 21. The center position Ac of the protruding portion in the optical fiber adaptor and the center position Cc of the recessed portion in the optical fiber connecter are formed as displaced each other. More specifically, when the protruding portion is fit into the recessed portion, the slope of the protruding portion pushes the slope of the recessed portion to generate a pressing force in such manner that the optical fiber connecter moves toward the center of the optical fiber adaptor. With providing such the protruding portion and the recessed portion as functioning to be the spring, there is no need to arrange such a separate elastic part as a spring or the like. Thus, when each optical fiber connecter 21 is inserted in the optical fiber adaptor, the respective contact end faces of the optical fiber connecters 21 are pushed each other with the appropriate pressing force to realize an excellent connection.

In order to effectively generate the above described pressing force, the adaptor satisfies the followings: at room temperature, D2>D1, at high temperature environment (room temperature+70 degrees C.), D2+D2×α2×70 degrees C.<D1+D1×α1×70 degrees C. at low temperature environment (room temperature−70 degrees C.), D2−D2×α2×70 degrees C.<D1−D1×α1×70 degrees C. where, D2 is the distance between the center positions of two protruding portions symmetrically formed on the wall face of the optical fiber adaptor, D1 is the distance between the centers of two recessed portions symmetrically formed on the optical fiber connecters arranged facing each other within the optical fiber adaptor, α2 is an expansion coefficient of the material of the optical fiber adaptor, and α1 is an expansion coefficient of the material of the optical fiber connecter.

For example, when D1=8.2 mm, D2=8.0 mm, the expansion coefficient of the material of the optical fiber connecter (high filler-low contraction PPS) α1=2.0×10-5, and the expansion coefficient of the material of the optical fiber adaptor α2=4.0×10-5, at the room temperature (23 degrees C.), the pressure is generated. Incidentally, when D2=8.0224 mm, D1=8.2115 mm at the high temperature environment (about +93 degrees C.), it becomes D2<D1, thus the pressing force is not damaged. Also, when D2=7.9776 mm, D1=8.1885 mm at the low temperature environment (about −47 degrees C.), it becomes D2<D1, thus the pressing force is not damaged.

The pair of the optical fiber connecters connected to the optical fiber adaptor are described with reference to FIG. 29. As depicted in FIG. 29, the pair of the optical fiber connecters 21 are inserted from both ends of the optical fiber adaptor 40 to connect the naked optical fibers protruded from the head portions of the ferrules through the refractive index matching agent (sheet) with pressing force in center of the center portion 41. The protruding portions formed on the inner wall in the optical fiber adaptor are fit into the corresponding recessed portions in the optical fiber connecter 29. With the displaced center positions of the protruding portions and the recessed portions, the optical fiber connecters are pressed toward the center portion. The above described pressing force applied to the pair of the optical fiber connecters pushes the head portions of the ferrule to connect the naked optical fibers under compression. Since the diameter of the through hole of the ferrule is set to be slightly larger than the diameter of the coated optical fiber, the optical fiber is slightly buckled at the portion within the region z encircled to push the optical fiber, thus, the portion varied is absorbed while maintaining the center position of the naked optical fiber as it is.

The optical fiber connecter applicable to the optical fiber adaptor of the invention is any optical fiber connecter which uses the ferrule in which the coating in the end portion of the optical fiber is removed and the naked optical fiber is exposed. Thus, the optical fiber connecter formed without using the optical fiber component for peeling the coating and breaking the optical fiber may be applicable.

According to the invention, the optical fiber cutting blade which can obtain the excellent cut end of the optical fiber with the coating removed, the optical fiber cutting apparatus and the method of cutting the optical fiber, as well as the optical fiber component for peeling the coating and breaking the optical fiber and the method therefore can be provided, enabling to stably operate even under the poor operational condition such as darkness, without relying on the skilled expert. Thus the invention has a highly industrial value.

What is claimed is:

1. An component for peeling the coating and breaking the optical fiber comprising:
   a first member made of resin material including a groove portion extending in a longitudinal direction and enabling to receive a coated optical fiber,
   an optical fiber cutting blade made of resin material integrally formed within the groove portion,
   a coat removing blade made of resin material integrally formed within the groove portion apart from the optical fiber cutting blade, and a breaking portion in a middle thereof; and
   a second member made of resin material, which is placed face to face to the first member, including a groove portion corresponding to the groove portion in the first member enabling to receive a coated optical fiber,
   a coat removing blade corresponding to the coat removing blade in the first member, and a breaking portion in a middle thereof corresponding to the breaking portion in the first member.

2. The component for peeling the coating and breaking the optical fiber according to claim 1, wherein each breaking portion in a middle portion comprises a connecting portion with a small thickness, the connecting portion connects one member and other member in the first member, as well as one member and other member in the second member.

3. The component for peeling the coating and breaking the optical fiber according to claim 2, wherein a thickness of the connecting portion is within a range of from 0.4 mm to 2.0 mm.

4. The component for peeling the coating and breaking the optical fiber according to claim 3, wherein a prescribe hollow portion is formed between the optical fiber cutting blade and the coat removing blade in each of the one member in the first member and the second member, when the first member and the second member are arranged face to face.

5. The component for peeling the coating and breaking the optical fiber according to claim 4, wherein the optical fiber cutting blade has such a height that the optical fiber cutting blade is pressed on the optical fiber received in the groove portion until the blade itself is deformed to scratch the optical fiber, and a clearance between each of the coat removing blade in the first member and the second member is identical to a diameter of a glass portion of the optical fiber, when the first member and the second member are contacted face to face.

6. The component for peeling the coating and breaking the optical fiber according to claim 5, wherein the groove portion comprises a flat bottom face, and both slanted side faces which become wide from the bottom face toward the surface of the base, and a tip end of the blade is formed to protrude into the groove portion in the second member.

7. The component for peeling the coating and breaking the optical fiber according to claim 6, wherein the clearance between the coat removing blades is within a range of from 0.128 to 0.140 mm.

8. The component for peeling the coating and breaking the optical fiber according to claim 7, wherein the one member of the second member includes a tapered portion on a surface facing other member.

9. The component for peeling the coating and breaking the optical fiber according to claim 8, wherein the first member and the second member have respective convex portions to support the coated optical fiber on at least one corresponding position within the groove portion, where neither the optical fiber cutting blade nor the coat removing blade is formed.

10. The component for peeling the coating and breaking the optical fiber according to claim 9, wherein a height of the convex portion is within a range of from 0.01 mm to 0.05 mm.

11. The component for peeling the coating and breaking the optical fiber according to claim 10, wherein a stage is formed within the groove portion of the second member at a position corresponding to the optical fiber cutting blade.

12. A method of peeling a coating and breaking an optical fiber comprising the steps of:
arranging to face a first member and a second member, the first member made of resin material including a groove portion enabling to receive a coated optical fiber, an optical fiber cutting blade and a coat removing blade integrally formed within the groove portion, and a breaking portion in an intermediate portion, the second member made of resin material including a groove portion corresponding to the groove portion in the first member enabling to receive a coated optical fiber, a coat removing blade corresponding to the coat removing blade in the first member, and a breaking portion in an intermediate portion corresponding to the breaking portion in the first member;
receiving a coated optical fiber in the groove portion;
pressing the first member and the second member in the intermediate portion with a prescribed force to press the optical fiber cutting blade on the optical fiber until the blade itself is deformed, thus scratching the optical fiber;
applying a tensile force to a portion where the optical fiber is scratched by the optical fiber cutting blade, and bending the breaking portion in a reverse direction to a scratch to cut off the optical fiber, at a same time to peel off the coating of the coated optical fiber by the coat removing blade.

13. A component for peeling, coating and breaking an optical fiber comprising:
a first member made of resin material including a groove portion extending in a longitudinal direction and enabling to receive a coated optical fiber,
an optical fiber cutting blade made of resin material integrally formed within the groove portion, a pair of coat removing blades made of resin material integrally formed within the groove apart from the optical fiber cutting blade, which are arranged face to face apart from each other in a direction perpendicular to a longitudinal direction, and a breaking portion in a middle thereof; and
a second member made of resin material, which is placed face to face to the first member, including a groove portion corresponding to the groove in the first member enabling to receive a coated optical fiber, a pair of coat removing blades corresponding to the pair of coat removing blades in the first member, and a breaking portion in a middle thereof corresponding to the breaking portion in the first member.

14. The component for peeling the coating and breaking the optical fiber according to claim 13, wherein the pair of the coat removing blades in the first member has a tapered portion at an end portion thereof, and the pair of the coat removing blades in the second member has a tapered portion at a corresponding end portion to the tapered portion in the first member.

15. The component for peeling the coating and breaking the optical fiber according to claim 13, wherein the breaking portion in the intermediate portions comprises a connecting portion with a small thickness, and the connecting portion connects one member and other member in the first member, as well as one member and other member in the second member.

16. The component for peeling the coating and breaking the optical fiber according to claim 15, wherein the hollow portion is formed across the first member and the second member.

17. The component for peeling the coating and breaking the optical fiber according to claim 15, wherein the hollow portion is formed in only the second member.

18. The component for peeling the coating and breaking the optical fiber according to claim 17, wherein the hollow portion formed in the second member has a tapered portion rising upwardly from the optical fiber cutting blade toward the coat removing blade.

19. The component for peeling the coating and breaking the optical fiber according to claim 18, wherein the hollow portion formed in the first member has a tapered portion rising upwardly from the optical fiber cutting blade toward the coat removing blade.

20. The component for peeling the coating and breaking the optical fiber according to claim 19, wherein one member of the second member has a tapered portion on a side facing other member.

21. A method of peeling a coating and breaking an optical fiber comprising the steps of:
arranging to face a first member and a second member, the first member made of resin material including a groove portion enabling to receive a coated optical fiber, an optical fiber cutting blade and a pair of coat removing blades made of resin material integrally formed within the groove apart from the optical fiber cutting blade, which are arranged face to face apart from each other in a direction perpendicular to a longitudinal direction, and a breaking portion in an intermediate portion, the second member made of resin material including a groove portion corresponding to the groove portion in the first member enabling to receive a coated optical fiber, a pair of coat removing blades corresponding to the pair of coat removing blades in the first member, which are arranged face to face apart from each other in a direction perpendicular to a longitudinal direction, and a breaking portion in an intermediate portion corresponding to the breaking portion in the first member;
receiving a coated optical fiber in the groove portion;
pressing the first member and the second member in the intermediate portion with a prescribed force to press the optical fiber cutting blade on the optical fiber until the blade itself is deformed, thus scratching the optical fiber;
applying a tensile force to a portion where the optical fiber is scratched by the optical fiber cutting blade, and bending the breaking portion in a reverse direction to a scratch to cut off the optical fiber, at a same time to peel off the coating of the coated optical fiber by the pair of the coat removing blade.

22. An optical fiber connector comprising an optical fiber component with the optical fiber cut off and a coating removed, which is formed by bending a component for peeling the coating and breaking the optical fiber at a breaking portion to cut off the optical fiber and removing the coating, which component includes: a first member made of resin material including a groove portion enabling to receive a coated optical fiber, an optical fiber cutting blade and a coat removing blade made of resin material integrally formed within the groove, a breaking portion comprising a connecting portion with thin thickness in an intermediate portion and a hollow portion; and a second member made of resin material, which is placed face to face to the first member, including a groove portion corresponding to the groove portion in the first member enabling to receive a coated optical fiber, a coat removing blade corresponding to the coat removing blade in the first member, a breaking portion in an intermediate portion corresponding to the breaking portion in the first member and a hollow portion corresponding to the hollow portion in the first member; and a ferrule received in the thus formed hollow portion in the optical fiber component, ferrule receiving a portion with the coating removed and a coated portion therein.

23. The optical fiber connector according to claim 22, wherein the first member and the second member in the component for peeling the coating and breaking the optical fiber respectively comprise one member and other member combined with a connecting portion, and the member without the optical fiber cutting blade and the coat removing blade includes the hollow portion in contact with the breaking portion.

24. The optical fiber connector according to claim 22, wherein the ferrule comprises a head portion and a leg portion, the leg portion has a ring-shaped groove portion, the hollow portion in the optical fiber component is formed by the wall of approximately cylindrical shape, and an annular protruding portion corresponding to the ring-shaped groove portion of the leg portion is formed on a part of the cylindrical shaped wall face.

25. The optical fiber connector according to claim 23, wherein the ferrule includes a through hole to receive a portion of the optical fiber with the coating removed and the coated optical fiber, and the optical fiber is received in the through hole with a portion of the optical fiber with the coating removed which protrudes only for a prescribed length from the head portion.

26. The optical fiber connector according to claim 25, wherein the head portion of the ferrule is provisionally engaged to a ferrule holding jig, and when the leg portion is inserted in the hollow portion, the annular protruding portion is fit into the ring-shaped groove portion to be attached to the optical fiber component through one-touch operation with the ferrule holding jig released from the head portion.

27. An optical fiber adaptor comprising a pair of optical fiber connectors facing each other comprising:

an optical fiber component made of resin material receiving a coated optical fiber in a groove portion provided therein and having a hollow portion, which is formed by bending a component for peeling a coating and breaking an optical fiber including a breaking portion to cut off and to remove the coating, and separated; and a ferrule, which receives a naked portion of the optical fiber with the coating removed and a coated portion and is received in the hollow portion in the optical fiber component, wherein the optical fiber adaptor includes a center portion to hold respective head portions of the ferrule having a head portion and a leg portion at a prescribed position, a pressure generating mechanism to press the pair of the optical fiber connectors toward the center portion and hold there, and respective ferrules are held face to face of the pair of the optical fiber connectors under a condition in which tip ends of the naked portion of the optical fiber protruded from the ferrule are contacted with a force, and wherein the optical fiber adaptor comprises a rectangular cylindrical box in which the optical fiber connectors are inserted from the respective ends, the center portion is formed in a center of the box, and has a cylindrical shaped portion to hold the head portion of the ferrule by squeezing from a peripheral portion thereof, and the pressure generating mechanism includes a protruding portion formed on an inner wall of the optical fiber and a recessed portion corresponding to the protruding portion, formed on an peripheral portion of the optical fiber connector.

28. The optical fiber adaptor according to claim 27, wherein the pressure generating mechanism is formed in symmetric manner to the center portion, and a center position of the protruding portion in the optical fiber adaptor and a center position of the recessed portion in the optical fiber connecter are formed as displaced each other so as to press the pair of the optical fiber connectors toward the center portion.

29. The optical fiber adaptor according to claim 28, wherein the adaptor satisfies the followings:

at room temperature, $D2 > D1$, at high temperature environment (room temperature+70 degrees C.), $D2 + D2 \times \alpha 2 \times 70$ degrees C. $< D1 + D1 \times \alpha 1 \times 70$ degrees C. at low temperature environment (room temperature−70 degrees C.), $D2 - D2 \times \alpha 2 \times 70$ degrees C. $< D1 - D1 \times \alpha 1 \times 70$ degrees C. where, D2 is a distance between the center portions of two protruding portions symmetrically formed on the wall face of the optical fiber adaptor, D1 is a distance between the center portions of two recessed portions symmetrically formed on the optical fiber connecters arranged facing each other within the optical fiber adaptor, a 2 is an expansion coefficient of a material of the optical fiber adaptor, and a 1 is an expansion coefficient of a material of the optical fiber connecter.

30. The optical fiber adaptor according to claim 29, wherein the center portion has a refractive index matching agent between the tip ends of the respective naked portions of the optical fibers protruded from the ferrule.

31. The optical fiber adaptor according to claim 30, wherein the component for peeling the coating and breaking the optical fiber includes a first member made of resin material including a groove portion enabling to receive a coated optical fiber, an optical fiber cutting blade and a coat removing blade made of resin material integrally formed within the groove, a breaking portion comprising a connecting portion with thin thickness in an intermediate portion and a hollow portion; and a second member made of resin material, which is placed face to face to the first member, including a groove portion corresponding to the groove portion in the first member enabling to receive a coated optical fiber, a coat removing blade corresponding to the coat removing blade in the first member, a breaking portion in an intermediate portion corresponding to the breaking portion in the first member and a hollow portion corresponding to the hollow portion in the first member.

32. The optical fiber adaptor according to claim 31,
wherein the first member and the second member in the component for peeling the coating and breaking the optical fiber respectively comprise one member and other member combined with a connecting portion, and the member without the optical fiber cutting blade and the coat removing blade includes the hollow portion in contact with the breaking portion.

33. The optical fiber adaptor according to claim 32,
wherein the leg portion in the ferrule has a ring-shaped groove portion, the hollow portion in the optical fiber component is formed by a wall of approximately cylindrical shape, and an annular protruding portion corresponding to the ring-shaped groove portion of the leg portion is formed on a part of a cylindrical shaped wall face.

34. The optical fiber adaptor according to claim 33,
wherein the ferrule includes a through hole to receive a portion of the optical fiber with the coating removed and the coated optical fiber, and the optical fiber is received in the through hole with a portion of the optical fiber with the coating removed which protrudes only for a prescribed length from the head portion.

35. The optical fiber adaptor according to claim 34,
wherein the optical fiber cutting blade has such a height that the optical fiber cutting blade is pressed on the optical fiber received in the groove portion until the blade itself is deformed to scratch the optical fiber, and a clearance between each of the coat removing blade in the first member and the second member is identical to a diameter of a glass portion of the optical fiber, when the first member and the second member are contacted face to face.

* * * * *